US012695646B2

(12) United States Patent (10) Patent No.: US 12,695,646 B2
Wang et al. (45) Date of Patent: Jul. 28, 2026

(54) WIRELESS SENSING USING MEASUREMENT ENHANCEMENT

(71) Applicants:Wei-Hsiang Wang, College Park, MD (US); Beibei Wang, Clarksville, MD (US); Yuqian Hu, Greenbelt, MD (US); Guozhen Zhu, Greenbelt, MD (US); K. J. Ray Liu, Potomac, MD (US); Oscar Chi-Lim Au, Rockville, MD (US)

(72) Inventors: Wei-Hsiang Wang, College Park, MD (US); Beibei Wang, Clarksville, MD (US); Yuqian Hu, Greenbelt, MD (US); Guozhen Zhu, Greenbelt, MD (US); K. J. Ray Liu, Potomac, MD (US); Oscar Chi-Lim Au, Rockville, MD (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 0 days.

(21) Appl. No.: 18/991,629

(22) Filed: Dec. 22, 2024

(65) Prior Publication Data

US 2025/0141715 A1     May 1, 2025

Related U.S. Application Data

(63) Continuation-in-part of application No. 18/401,684, filed on Jan. 1, 2024, and a continuation-in-part of
(Continued)

(51) Int. Cl.
H04L 25/02        (2006.01)
H04B 17/391       (2015.01)
H04L 25/03        (2006.01)

(52) U.S. Cl.
CPC ....... *H04L 25/0204* (2013.01); *H04B 17/391* (2015.01); *H04L 25/03012* (2013.01)

(58) Field of Classification Search
CPC ....... H04W 4/029; H04W 84/12; H04W 4/33; H04W 24/08; H04W 4/021; H04W 4/027;
(Continued)

(56) References Cited

U.S. PATENT DOCUMENTS

2017/0090026 A1*  3/2017  Joshi ...................... G01S 13/87
2024/0381304 A1*  11/2024  Beg ..................... H04W 64/006

OTHER PUBLICATIONS

Beibei Wang et al., "The Promise of Radio Analytics: A Future Paradigm for Wireless Positioning, Tracking, and Sensing", IEEE Signal Processing Magazine, vol. 35, No. 3, pp. 59-80, May 2018.
(Continued)

*Primary Examiner* — Zhiyu Lu
(74) *Attorney, Agent, or Firm* — Slater Matsil, LLP

(57) ABSTRACT

Wireless sensing using measurement enhancement is described. In one example, a described method comprises: receiving a wireless signal transmitted by a transmitter through a wireless multipath channel of a venue, wherein the received wireless signal differs from the transmitted wireless signal due to the wireless multipath channel and a motion of an object in the venue; obtaining a time series of channel information (TSCI) of the wireless multipath channel based on the received wireless signal, wherein each channel information (CI) comprises N1 CI components (CIC); for each respective CI having N1 CIC of the TSCI, computing a respective enhanced CI (ECI) having N2 CIC; computing a motion information (MI) based on the ECI of the TSCI; and performing a sensing task based on the MI.

26 Claims, 15 Drawing Sheets

Related U.S. Application Data application No. 18/401,681, filed on Jan. 1, 2024, and a continuation-in-part of application No. 18/395,537, filed on Dec. 23, 2023, and a continuation-in-part of application No. 18/395,543, filed on Dec. 23, 2023, and a continuation-in-part of application No. 18/395,544, filed on Dec. 23, 2023, and a continuation-in-part of application No. 18/395,539, filed on Dec. 23, 2023, and a continuation-in-part of application No. 18/395,533, filed on Dec. 23, 2023, and a continuation-in-part of application No. 18/391,529, filed on Dec. 20, 2023, and a continuation-in-part of application No. 18/379,622, filed on Oct. 12, 2023, now Pat. No. 12,256,360, and a continuation-in-part of application No. 18/108,563, filed on Feb. 10, 2023, and a continuation-in-part of application No. 17/959,487, filed on Oct. 4, 2022, and a continuation-in-part of application No. PCT/US2022/045708, filed on Oct. 4, 2022, and a continuation-in-part of application No. 17/960,080, filed on Oct. 4, 2022, said application No. 17/959,487 is a continuation-in-part of application No. 17/891,037, filed on Aug. 18, 2022, now Pat. No. 12,078,510, and a continuation-in-part of application No. 17/888,429, filed on Aug. 15, 2022, now Pat. No. 11,771,366, application No. 18/991,629 is a continuation-in-part of application No. 17/838,231, filed on Jun. 12, 2022, and a continuation-in-part of application No. 17/838,244, filed on Jun. 12, 2022, now Pat. No. 12,216,190, and a continuation-in-part of application No. 17/838,228, filed on Jun. 12, 2022, said application No. 17/959,487 is a continuation-in-part of application No. 17/838,228, filed on Jun. 12, 2022, and a continuation-in-part of application No. 17/838,244, filed on Jun. 12, 2022, now Pat. No. 12,216,190, and a continuation-in-part of application No. 17/827,902, filed on May 30, 2022, application No. 18/991,629 is a continuation-in-part of application No. 17/827,902, filed on May 30, 2022, said application No. 17/959,487 is a continuation-in-part of application No. 17/540,156, filed on Dec. 1, 2021, and a continuation-in-part of application No. 17/539,058, filed on Nov. 30, 2021, now Pat. No. 12,066,572, and a continuation-in-part of application No. 17/537,432, filed on Nov. 29, 2021, application No. 18/991,629 is a continuation-in-part of application No. 17/537,432, filed on Nov. 29, 2021, said application No. 17/959,487 is a continuation-in-part of application No. 17/492,642, filed on Oct. 3, 2021, now Pat. No. 11,639,981, application No. 18/991,629 is a continuation-in-part of application No. 17/149,625, filed on Jan. 14, 2021.

(60) Provisional application No. 63/721,406, filed on Nov. 15, 2024, provisional application No. 63/651,921, filed on May 24, 2024, provisional application No. 63/614,621, filed on Dec. 24, 2023, provisional application No. 63/388,625, filed on Jul. 12, 2022, provisional application No. 63/354,184, filed on Jun. 21, 2022, provisional application No. 63/349,082, filed on Jun. 4, 2022, provisional application No. 63/332,658, filed on Apr. 19, 2022, provisional application No. 63/308,927, filed on Feb. 10, 2022, provisional application No. 63/300,042, filed on Jan. 16, 2022, provisional application No. 63/293,065, filed on Dec. 22, 2021, provisional application No. 63/281,043, filed on Nov. 18, 2021, provisional application No. 63/276,652, filed on Nov. 7, 2021.

(58) Field of Classification Search
CPC ....... H04W 64/00; H04W 88/08; H04W 4/30; H04W 24/04; H04W 24/10; H04W 28/22; H04W 4/023; H04W 4/21; H04W 4/90; H04W 52/04; H04W 72/542; H04W 72/543; H04W 16/18; H04W 16/26; H04W 24/02; H04W 4/70; H04W 72/0446; H04W 88/02; G06F 16/285; G06F 16/211; G06F 16/29; G06F 16/9024; G06F 16/176; G06F 16/2379; G06F 16/2477; G06F 16/288; G06F 16/36; G06F 16/4393; G06F 16/9027; G06F 16/904; G06F 16/906; G06F 16/93; G06F 16/9535; G06F 18/213; G06F 18/22; G06F 21/32; G06F 2218/04; G06F 2218/10; G06F 2218/12; G06F 2221/2111; G06F 30/13; G06F 40/166; G06F 9/451; H04L 67/306; H04L 5/0057; H04L 1/0026; H04L 25/022; H04L 5/0023; H04L 5/0048; H04L 65/4015; G01S 13/003; G01S 13/56; G01S 5/0236; G01S 7/415; G01S 13/72; G01S 13/886; G01S 5/017; G01S 5/0284; G01S 7/006; G01S 7/417; G06N 20/00; G06N 5/00; G06N 5/022; G06N 5/04; H04N 21/44218; H04N 21/812; H04N 21/26241; H04N 21/43615; H04N 21/43637; H04N 21/44204; H04N 21/4524; H04N 21/458; A61B 5/002; A61B 5/024; A61B 5/0816; A61B 5/1113; A61B 5/1118; A61B 5/1126; A61B 5/113; Y10S 707/921; B25J 9/163; G01P 13/00; G05B 15/02; G06Q 10/10; G06Q 10/103; G06Q 30/0205; G06Q 30/0246; G06Q 30/0255; G06Q 50/01; G06V 40/103; G06V 40/25; G08B 13/00; G08B 13/187; G08B 13/2491; G08B 21/02; G08B 21/182; G16H 15/00; G16H 40/63; G16H 40/67; G16H 50/30; G16H 50/70; G16H 80/00; H04B 17/19; H04B 17/26; H04B 17/318; H04B 7/0413; H04B 7/0626
See application file for complete search history.

(56) References Cited

OTHER PUBLICATIONS

Feng Zhang et al., "WiSpeed: A Statistical Electromagnetic Approach for Device-Free Indoor Speed Estimation", IEEE Internet of Things Journal, vol. 5, No. 3, pp. 2163-2177, Jun. 2018.

Feng Zhang et al., "WiBall: A Time-Reversal Focusing Ball Method for Decimeter-Accuracy Indoor Tracking", IEEE Internet of Things Journal, vol. 5, No. 5, pp. 4031-4041, Oct. 2018.

Chenshu Wu et al., "EasiTrack: Decimeter-Level Indoor Tracking with Graph-based Particle Filtering", IEEE Internet of Things Journal., vol. 7, No. 3, pp. 2397-2411, Mar. 2020.

Chenshu Wu et al., "RF-based Inertial Measurement", ACM SIGCOMM, Beijing, China, Aug. 19-24, 2019.

Wei-Hsiang Wang et al., "Device-Free Room-Level Localization with WiFi Utilizing Spatial-Frequency-Time Diversity," IEEE Internet of Things Journal, vol. 11, No. 21, pp. 35689-35698, Nov. 2024.

Chenshu Wu et al., "mmTrack: Passive Multi-Person Localization Using Commodity Millimeter Wave Radio", IEEE International Conference on Computer Communications, Beijing, China, Apr. 27-30, 2020.

(56) References Cited

OTHER PUBLICATIONS

Qinyi Xu et al., "Radio Biometrics: Human Recognition Through a Wall", IEEE Trans. on Information Forensics and Security, vol. 12, No. 5, pp. 1141-1155, May 2017.

Qinyi Xu et al., "TRIEDS: Wireless Events Detection Through the Wall", IEEE Internet of Things Journal, vol. 4, No. 3, pp. 723-735, Jun. 2017.

Chen Chen et al., "TR-BREATH: Time-Reversal Breathing Rate Estimation and Detection", IEEE Trans. on Biomedical Engineering, vol. 65, No. 3, pp. 489-501, Mar. 2018.

Fengyu Wang et al., "Respiration Tracking for People Counting and Recognition", IEEE Internet of Things Journal, vol. 7, No. 6, pp. 5233-5245, Jun. 2020.

Fengyu Wang et al., "ViMo: Multi-person Vital Sign Monitoring using Commodity Millimeter Wave Radio", IEEE Internet of Things Journal, vol. 8, No. 3, pp. 1294-1307, Feb. 2021.

Beibei Wang et al., "Green Wireless Communications: A Time-Reversal Paradigm", IEEE Journal of Selected Areas in Communications, special issue on Energy-Efficient Wireless Communications, vol. 29, No. 8, pp. 1698-1710, Sep. 2011.

Feng Zhang et al., "WiDetect: Robust Motion Detection with a Statistical Electromagnetic Model", Proceedings of the ACM on Interactive, Mobile, Wearable and Ubiquitous Technologies (IMWUT), vol. 3, No. 3, Article 122:1-24, Sep. 2019.

Yuqian Hu et al., Robust Passive Proximity Detection using Wi-Fi, IEEE Internet of Things Journal, vol. 10, No. 7, pp. 6221-6234, Apr. 2023.

Yuqian Hu et al., "DeFall: Environment-Independent Passive Fall Detection Using WiFi," IEEE Internet of Things Journal, vol. 9, No. 11, pp. 546-557, Jun. 2022.

Sai Deepika Regani et al., "FallAware: An Explainable Learning Approach to Robust Fall Detection with WiFi," IEEE Journal of Selected Areas in Sensors, vol. 2, pp. 71-83, Dec. 2024.

Feng Zhang et al., "SMARS: Sleep Monitoring via Ambient Radio Signals", IEEE Trans. on Mobile Computing, vol. 20, No. 1, pp. 217-231, Jan. 2021.

Wei-Hsiang Wang et al., "WiResP: A Robust Wi-Fi-Based Respiration Monitoring via Spectrum Enhancement," IEEE Sensors Journal, vol. 24, No. 13, pp. 20999-21011, Jul. 2024.

K. J. Ray Liu et al., "Wireless AI: Wireless Sensing, Positioning, IoT, and Communications," Cambridge University Press, 2019.

Chenshu Wu et al., "Wi-Fi Can Do More: Toward Ubiquitous Wireless Sensing," IEEE Communications Standards Magazine, vol. 6, No. 2, pp. 42-49, Jun. 2022.

K. J. Ray Liu et al., "Statistical Principles of Time Reversal [Perspectives]," IEEE Signal Processing Magazine, vol. 41, No. 1, pp. 31-37, Jan. 2024.

Fengyu Wang et al., "mmHRV: Contactless Heart Rate Variability Monitoring using Millimeter-Wave Radio", IEEE Internet of Things Journal, vol. 8, No. 22, pp. 16623-16636, Nov. 2021.

Yuqian Hu et al., "mmKey: Universal Virtual Keyboard using A Single Millimeter Wave Radio", IEEE Internet of Things Journal, vol. 9, No. 1, pp. 510-524, Jan. 2022.

Mohammed Zahid Ozturk et al., "GaitCube: Deep Data Cube Learning for Human Recognition with Millimeter-Wave Radio", IEEE Internet of Things Journal, vol. 9, No. 1, pp. 546-557, Jan. 2022.

Sai Deepika Regani et al., "GWrite: Enabling Through-the-Wall Gesture Writing Recognition Using WiFi," IEEE Internet of Things Journal, vol. 10, No. 7, pp. 5977-5991, Nov. 2022.

Mohammed Zahid Ozturk et al., "RadioMic: Sound Sensing via Radio Signals," IEEE Internet of Things Journal, vol. 10, No. 5, pp. 4431-4448, Oct. 2022.

Mohammed Zahid Ozturk et al., "RadioSES: mmWave-Based Audioradio Speech Enhancement and Separation System," IEEE/ACM Transactions on Audio Speech, and Language Processing, vol. 31, pp. 1333-1347, Mar. 2023.

Mohammed Zahid Ozturk et al., "RadioVAD: mmWave-Based Noise and Interference-Resilient Voice Activity Detection," IEEE Internet of Things Journal, vol. 11, No. 15, pp. 26005-26019, Aug. 2024.

Chenshu Wu et al., "GaitWay: Monitoring and Recognizing Gait Through the Walls", IEEE Trans. on Mobile Computing, vol. 20, No. 6, pp. 2186-2199, Jun. 2021.

Sai Deepika Regani et al., "Driver Authentication for Smart Car Using Wireless Sensing", IEEE Internet of Things Journal, vol. 7, No. 3, pp. 2235-2246, Mar. 2020.

Qinyi Xu et al., "Wireless AI in Smart Car: How Smart a Car Can Be?", IEEE Access.

Fengyu Wang et al., "Driver Vital Signs Monitoring Using Millimeter Wave Radio," IEEE Internet of Things Journal, vol. 9, No. 13, pp. 11283-11298, Jul. 2022.

Xiaolu Zeng et al., "WiCPD: Wireless Child Presence Detection System for Smart Cars," IEEE Internet of Things Journal, vol. 9, No. 24, pp. 24866-24881, Dec. 2022.

Guozhen Zhu et al., "Wi-MoID: Human and Nonhuman Motion Discrimination Using WiFi With Edge Computing," IEEE Internet of Things Journal, vol. 11, No. 8, pp. 13900-13912, Apr. 2024.

Guozhen Zhu et al., "SrcSense: Robust WiFi-based Motion Source Recognition via Signal-Informed Deep Learning," IEEE Journal of Selected Areas in Sensors, vol. 2, pp. 40-53, Dec. 2024.

Chenshu Wu et al., "mSense: Towards Mobile Material Sensing with a Single Millimeter-Wave Radio", PACM on Interactive, Mobile, Wearable and Ubiquitous Technologies (IMWUT), Virtual Online, Sep. 2020.

Feng Zhang et al., "mmEye: Super-Resolution Millimeter Wave Imaging", IEEE Internet of Things Journal, vol. 8, No. 8, pp. 6995-7008, Apr. 2021.

Sakila S. Jayaweera et al., "HRNet: High-Resolution Neural Network for Human Imaging Using mmWave Radar," IEEE Internet of Things Journal, vol. 12, No. 1, pp. 881-893, Jan. 2025.

Sai Deepika Regani et al., "mmWrite: Passive Handwriting Tracking using a Single Millimeter Wave Radio", IEEE Internet of Things Journal, vol. 8, No. 17, pp. 13291-13305, Sep. 2021.

* cited by examiner

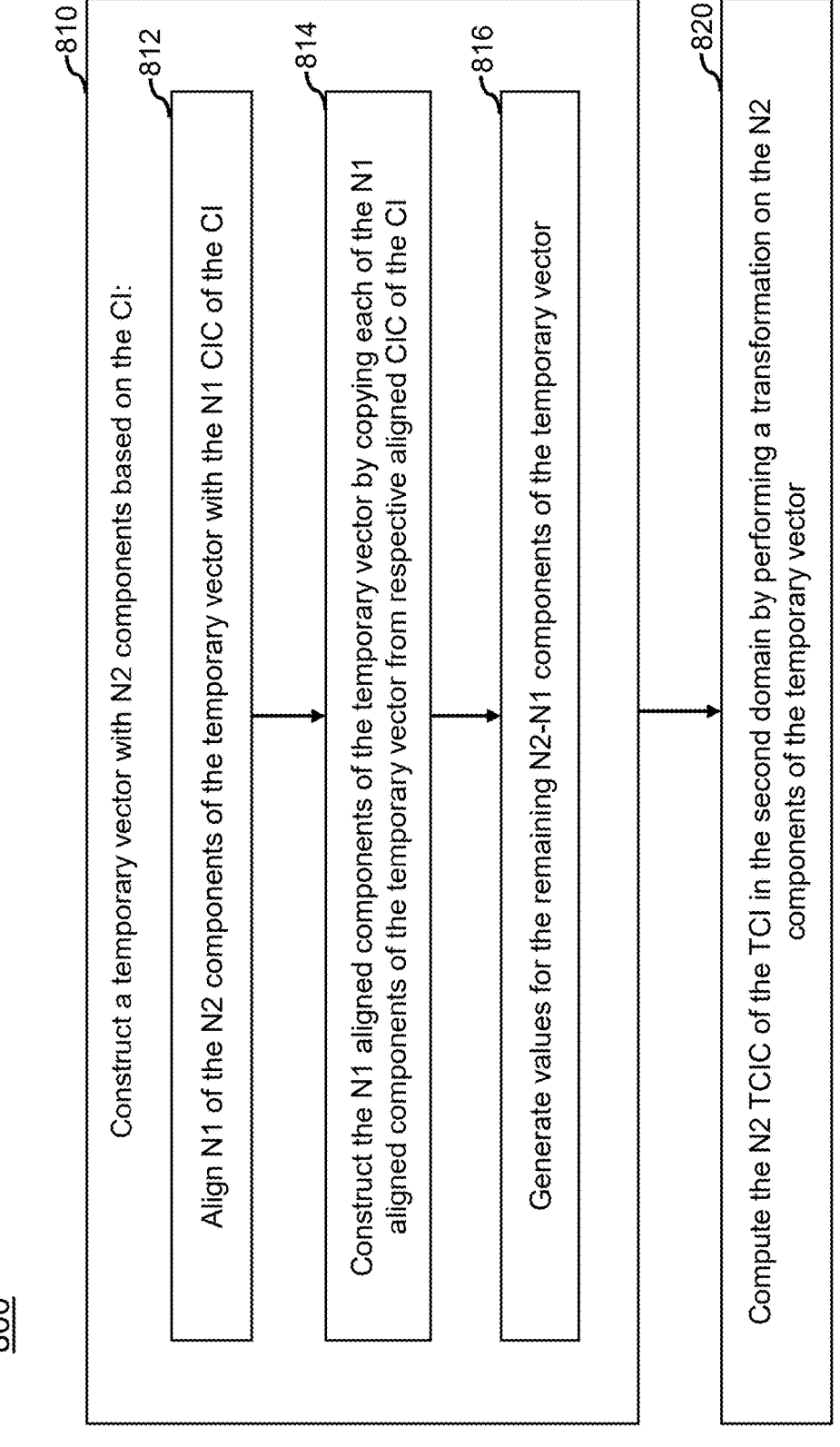

800

810 Construct a temporary vector with N2 components based on the CI:

812 Align N1 of the N2 components of the temporary vector with the N1 CIC of the CI 814 Construct the N1 aligned components of the temporary vector by copying each of the N1 aligned components of the temporary vector from respective aligned CIC of the CI 816 Generate values for the remaining N2-N1 components of the temporary vector 820 Compute the N2 TCIC of the TCI in the second domain by performing a transformation on the N2 components of the temporary vector

FIG. 8

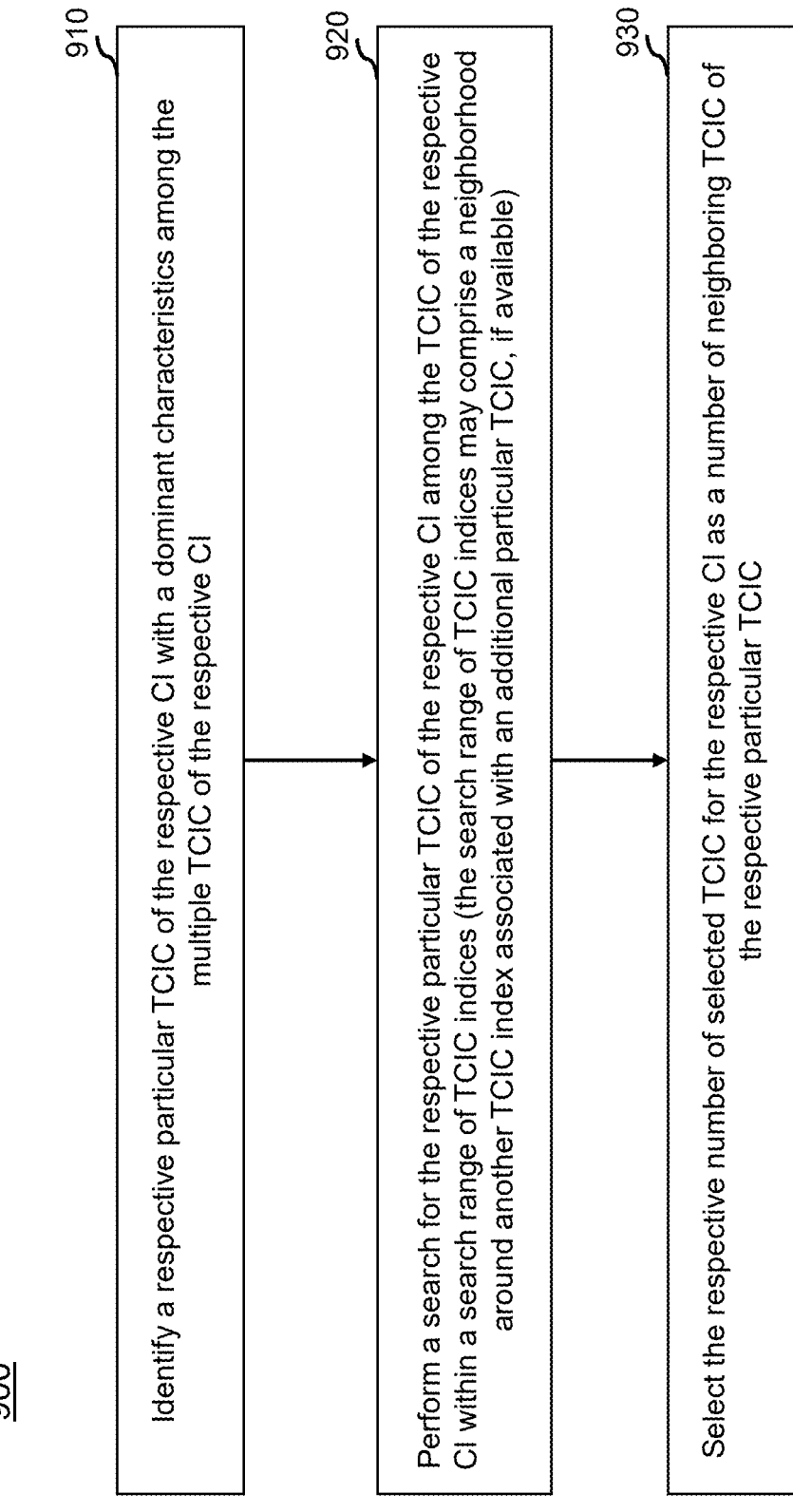

900

910   Identify a respective particular TCIC of the respective CI with a dominant characteristics among the multiple TCIC of the respective CI 920   Perform a search for the respective particular TCIC of the respective CI among the TCIC of the respective CI within a search range of TCIC indices (the search range of TCIC indices may comprise a neighborhood around another TCIC index associated with an additional particular TCIC, if available)

930   Select the respective number of selected TCIC for the respective CI as a number of neighboring TCIC of the respective particular TCIC

FIG. 9

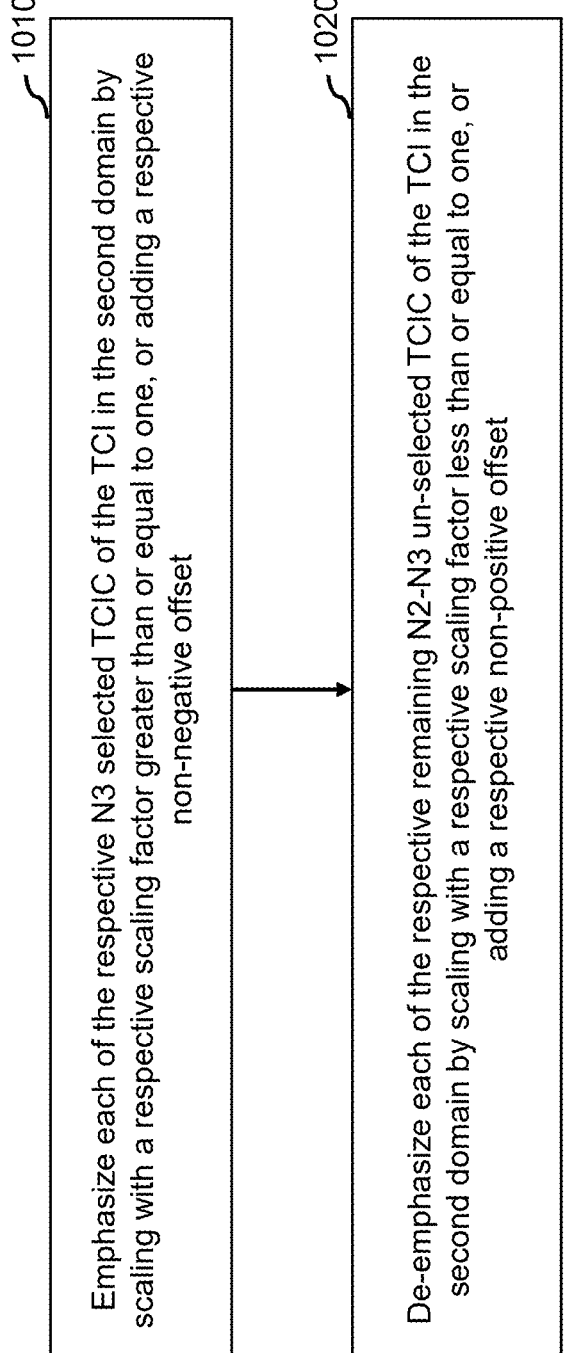

1000

1010 Emphasize each of the respective N3 selected TCIC of the TCI in the second domain by scaling with a respective scaling factor greater than or equal to one, or adding a respective non-negative offset 1020 De-emphasize each of the respective remaining N2-N3 un-selected TCIC of the TCI in the second domain by scaling with a respective scaling factor less than or equal to one, or adding a respective non-positive offset

FIG. 10

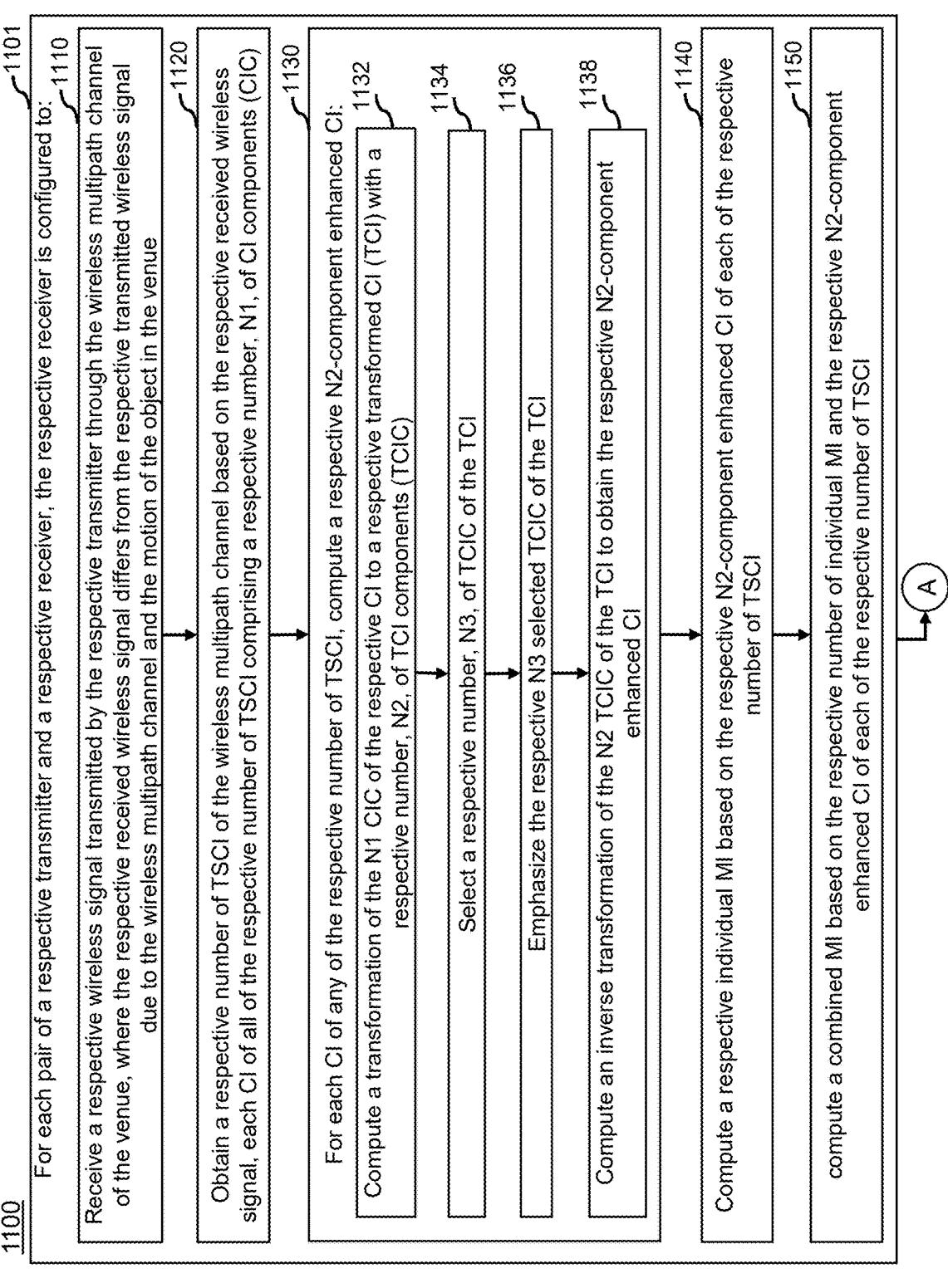

1100

1101 — For each pair of a respective transmitter and a respective receiver, the respective receiver is configured to:

1110 — Receive a respective wireless signal transmitted by the respective transmitter through the wireless multipath channel of the venue, where the respective received wireless signal differs from the respective transmitted wireless signal due to the wireless multipath channel and the motion of the object in the venue 1120 — Obtain a respective number of TSCI of the wireless multipath channel based on the respective received wireless signal, each CI of all of the respective number of TSCI comprising a respective number, N1, of CI components (CIC)

1130 — For each CI of any of the respective number of TSCI, compute a respective N2-component enhanced CI:

1132 — Compute a transformation of the N1 CIC of the respective CI to a respective transformed CI (TCI) with a respective number, N2, of TCI components (TCIC)

1134 — Select a respective number, N3, of TCIC of the TCI

1136 — Emphasize the respective N3 selected TCIC of the TCI

1138 — Compute an inverse transformation of the N2 TCIC of the TCI to obtain the respective N2-component enhanced CI 1140 — Compute a respective individual MI based on the respective N2-component enhanced CI of each of the respective number of TSCI 1150 — compute a combined MI based on the respective number of individual MI and the respective N2-component enhanced CI of each of the respective number of TSCI

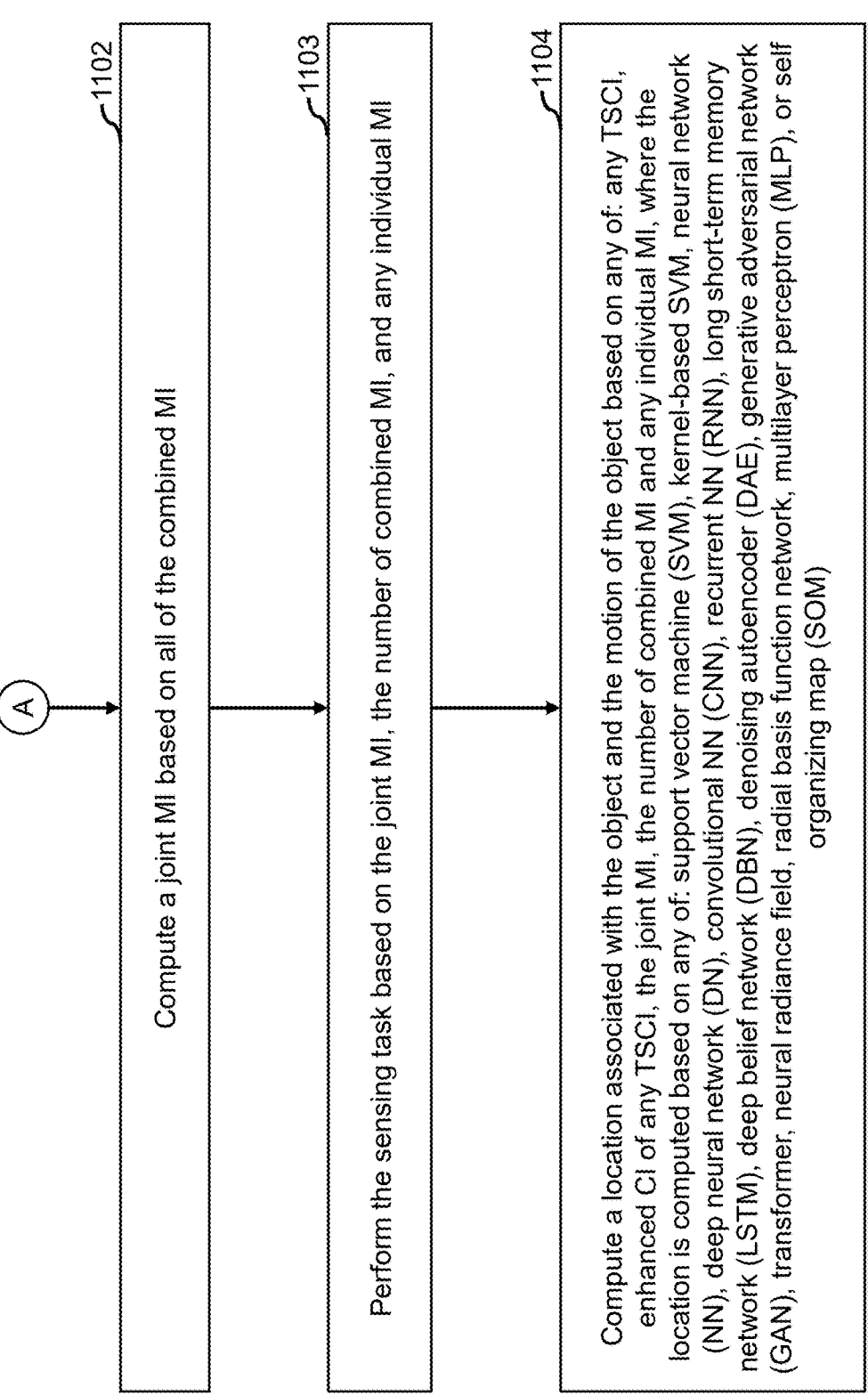

1102

Compute a joint MI based on all of the combined MI

1103

Perform the sensing task based on the joint MI, the number of combined MI, and any individual MI

1104

Compute a location associated with the object and the motion of the object based on any of: any TSCI, enhanced CI of any TSCI, the joint MI, the number of combined MI and any individual MI, where the location is computed based on any of: support vector machine (SVM), kernel-based SVM, neural network (NN), deep neural network (DN), convolutional NN (CNN), recurrent NN (RNN), long short-term memory network (LSTM), deep belief network (DBN), denoising autoencoder (DAE), generative adversarial network (GAN), transformer, neural radiance field, radial basis function network, multilayer perceptron (MLP), or self organizing map (SOM)

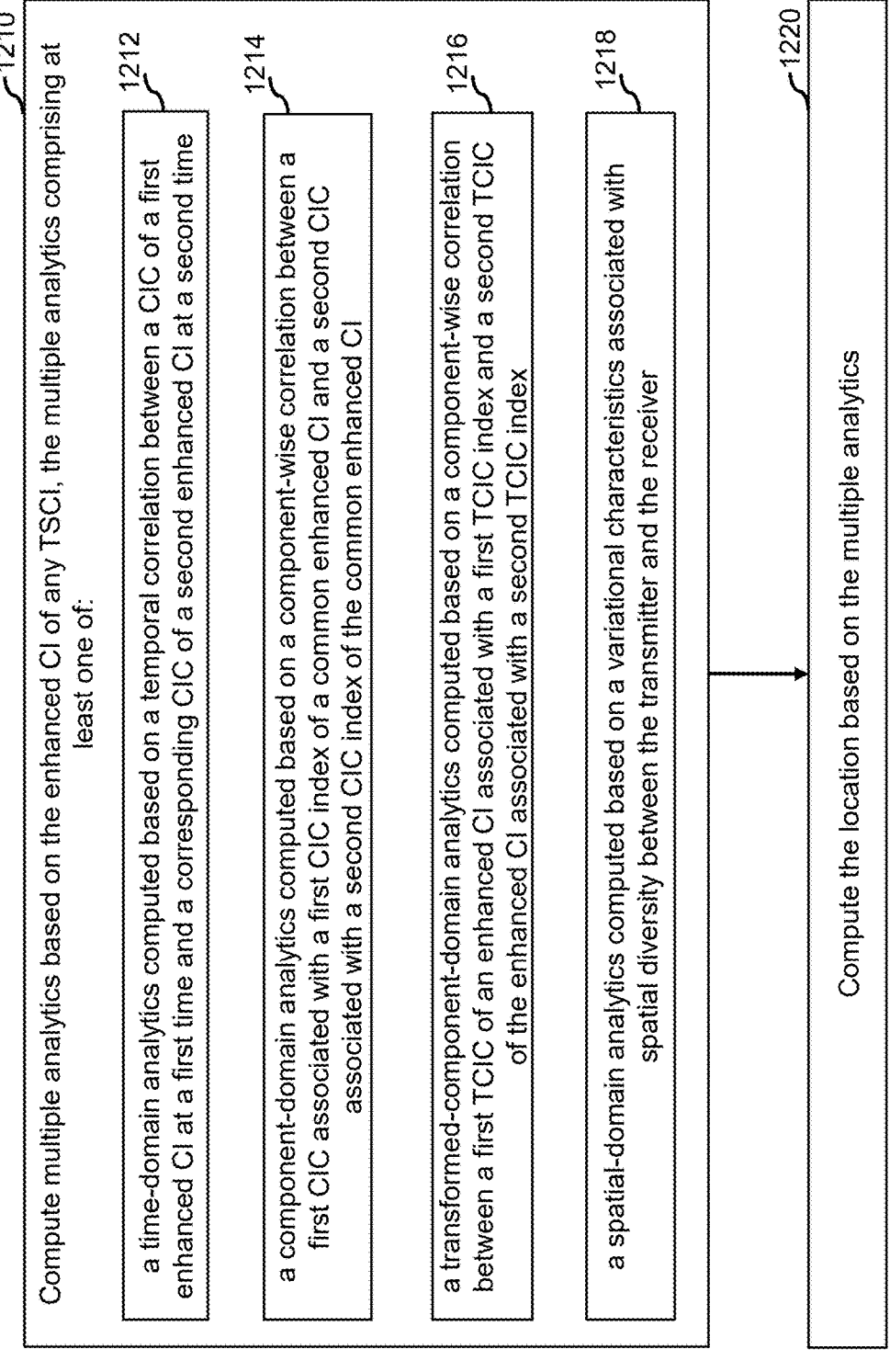

1210

Compute multiple analytics based on the enhanced CI of any TSCI, the multiple analytics comprising at least one of:

1212 a time-domain analytics computed based on a temporal correlation between a CIC of a first enhanced CI at a first time and a corresponding CIC of a second enhanced CI at a second time

1214 a component-domain analytics computed based on a component-wise correlation between a first CIC associated with a first CIC index of a common enhanced CI and a second CIC associated with a second CIC index of the common enhanced CI

1216 a transformed-component-domain analytics computed based on a component-wise correlation between a first TCIC of an enhanced CI associated with a first TCIC index and a second TCIC of the enhanced CI associated with a second TCIC index

1218 a spatial-domain analytics computed based on a variational characteristics associated with spatial diversity between the transmitter and the receiver

1220

Compute the location based on the multiple analytics

FIG. 12

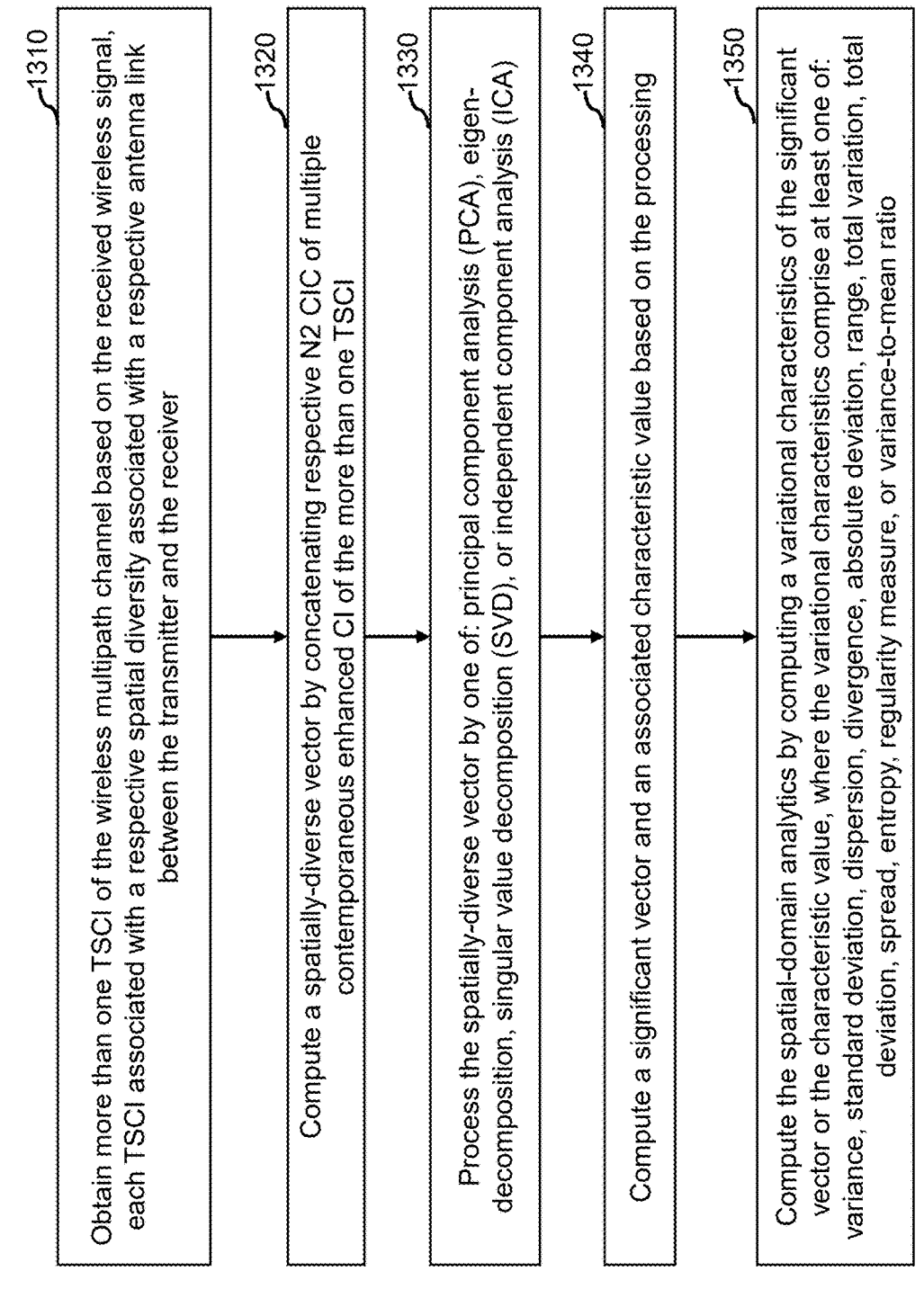

1300

1310 — Obtain more than one TSCI of the wireless multipath channel based on the received wireless signal, each TSCI associated with a respective spatial diversity associated with a respective antenna link between the transmitter and the receiver 1320 — Compute a spatially-diverse vector by concatenating respective N2 CIC of multiple contemporaneous enhanced CI of the more than one TSCI 1330 — Process the spatially-diverse vector by one of: principal component analysis (PCA), eigen-decomposition, singular value decomposition (SVD), or independent component analysis (ICA)

1340 — Compute a significant vector and an associated characteristic value based on the processing 1350 — Compute the spatial-domain analytics by computing a variational characteristics of the significant vector or the characteristic value, where the variational characteristics comprise at least one of: variance, standard deviation, dispersion, divergence, absolute deviation, range, total variation, total deviation, spread, entropy, regularity measure, or variance-to-mean ratio

FIG. 13

WIRELESS SENSING USING MEASUREMENT ENHANCEMENT

CROSS-REFERENCE TO RELATED APPLICATIONS

The present application hereby incorporates by reference the entirety of the disclosures of, and claims priority to, each of the following cases:

(a) U.S. Provisional Patent application 63/721,406, entitled "METHOD, APPARATUS, AND SYSTEM FOR WIRELESS SENSING", filed on Nov. 15, 2024, (b) U.S. Provisional Patent application 63/651,921, entitled "METHOD, APPARATUS, AND SYSTEM FOR WIRELESS SENSING IN NETWORK OF NETWORKS WITH INTER-NETWORK SOUNDING", filed on May 24, 2024, (c) U.S. Provisional Patent application 63/614,621, entitled "METHOD, APPARATUS, AND SYSTEM FOR WIRELESS SENSING", filed on Dec. 24, 2023, (d) U.S. patent application Ser. No. 17/149,625, entitled "METHOD, APPARATUS, AND SYSTEM FOR WIRELESS MONITORING WITH MOTION LOCALIZATION", filed on Jan. 14, 2021, (e) U.S. patent application Ser. No. 17/537,432, entitled "METHOD, APPARATUS, AND SYSTEM FOR AUTOMATIC AND ADAPTIVE WIRELESS MONITORING AND TRACKING", filed on Nov. 29, 2021, (f) U.S. patent application Ser. No. 17/827,902, entitled "METHOD, APPARATUS, AND SYSTEM FOR SPEECH ENHANCEMENT AND SEPARATION BASED ON AUDIO AND RADIO SIGNALS", filed on May 30, 2022, (g) U.S. patent application Ser. No. 17/838,228, entitled "METHOD, APPARATUS, AND SYSTEM FOR WIRELESS SENSING BASED ON CHANNEL INFORMATION", filed on Jun. 12, 2022, (h) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022, (i) U.S. patent application Ser. No. 17/838,244, entitled "METHOD, APPARATUS, AND SYSTEM FOR WIRELESS SENSING BASED ON LINKWISE MOTION STATISTICS", filed on Jun. 12, 2022, (j) U.S. patent application Ser. No. 17/959,487, entitled "METHOD, APPARATUS, AND SYSTEM FOR VOICE ACTIVITY DETECTION BASED ON RADIO SIGNALS", filed on Oct. 4, 2022, (k) U.S. patent application Ser. No. 17/960,080, entitled "METHOD, APPARATUS, AND SYSTEM FOR ENHANCED WIRELESS MONITORING OF VITAL SIGNS", filed on Oct. 4, 2022, (l) PCT Patent application PCT/US22/45708, entitled "METHOD, APPARATUS, AND SYSTEM FOR WIRELESS SENSING MEASUREMENT AND REPORTING", filed on Oct. 4, 2022, (m) U.S. patent application Ser. No. 18/108,563, entitled "METHOD, APPARATUS, AND SYSTEM FOR WIRELESS SENSING BASED ON MULTIPLE GROUPS OF WIRELESS DEVICES", filed on Feb. 10, 2023, (n) U.S. patent application Ser. No. 18/199,963, entitled "METHOD, APPARATUS, AND SYSTEM FOR WIRELESS SENSING MEASUREMENT AND REPORTING", filed on May 21, 2023, (o) U.S. patent application Ser. No. 18/379,622, entitled "METHOD, APPARATUS, AND SYSTEM FOR WIRELESS PROXIMITY DETECTION", filed on Oct. 12, 2023, (p) U.S. patent application Ser. No. 18/391,529, entitled "METHOD, APPARATUS, AND SYSTEM FOR WIRELESS HUMAN AND NON-HUMAN MOTIONDETECTION", filed on Dec. 20, 2023.

(q) U.S. patent application Ser. No. 18/395,533, entitled "METHOD, APPARATUS, AND SYSTEM FOR WIRELESS SENSING MEASUREMENT AND REPORTING", filed on Dec. 23, 2023.

(r) U.S. patent application Ser. No. 18/395,539, entitled "METHOD, APPARATUS, AND SYSTEM FOR WIRELESS SENSING MEASUREMENT AND REPORTING", filed on Dec. 23, 2023.

s) U.S. patent application Ser. No. 18/395,543, entitled "METHOD, APPARATUS, AND SYSTEM FOR WIRELESS SENSING MEASUREMENT AND REPORTING", filed on Dec. 23, 2023.

(t) U.S. patent application Ser. No. 18/395,537, entitled "METHOD, APPARATUS, AND SYSTEM FOR WIRELESS SENSING MEASUREMENT AND REPORTING", filed on Dec. 23, 2023.

(u) U.S. patent application Ser. No. 18/395,544, entitled "METHOD, APPARATUS, AND SYSTEM FOR WIRELESS SENSING MEASUREMENT AND REPORTING", filed on Dec. 23, 2023.

(v) U.S. patent application Ser. No. 18/401,684, entitled "METHOD, APPARATUS, AND SYSTEM FOR WIRELESS SENSING MEASUREMENT AND REPORTING", filed on Jan. 1, 2024.

(w) U.S. patent application Ser. No. 18/401,681, entitled "METHOD, APPARATUS, AND SYSTEM FOR WIRELESS SENSING BASED ON DEEP LEARNING", filed on Jan. 1, 2024.

TECHNICAL FIELD

The present teaching generally relates to wireless sensing. More specifically, the present teaching relates to wireless sensing using measurement enhancement.

BACKGROUND

With the proliferation of Internet of Things (IoT) applications, billions of household appliances, phones, smart devices, security systems, environment sensors, vehicles and buildings, and other radio-connected devices will transmit data and communicate with each other or people, and everything will be able to be measured and tracked all the time. Among the various approaches to measure what is happening in the surrounding environment, wireless sensing has received an increasing attention in recent years because of the ubiquitous deployment of wireless radio devices. In addition, human activities affect wireless signal propagations, therefore understanding and analyzing the way how wireless signals react to human activities can reveal rich information about the activities. As more bandwidth becomes available in the new generation of wireless systems, wireless sensing will make many smart IoT applications only imagined today possible in the near future. That is because when the bandwidth increases, one can see many more multipaths, in a rich-scattering environment such as in indoors or metropolitan area, which can be treated as hundreds of virtual antennas/sensors. Because there may be many IoT devices available for wireless sensing, an efficient and effective method for making use multiple devices for wireless sensing is desirable.

SUMMARY

The present teaching generally relates to wireless sensing. More specifically, the present teaching relates to wireless sensing using measurement enhancement.

In one embodiment, a method for wireless sensing with transformed component selection is described. The method comprises: receiving, by a receiver, a wireless signal transmitted by a transmitter through a wireless multipath channel of a venue, wherein the received wireless signal differs from the transmitted wireless signal due to the wireless multipath channel and a motion of an object in the venue; obtaining a time series of channel information (TSCI) of the wireless multipath channel based on the received wireless signal, wherein each channel information (CI) comprises N1 CI components (CIC); for each respective CI having N1 CIC of the TSCI, computing a respective enhanced CI (ECI) having N2 CIC by: computing a transformation of the N1 CIC of the respective CI in a first domain to a respective transformed CI (TCI) with N2 transformed CIC (TCIC) in a second domain, wherein N1<=N2, selecting a respective number, N3, of TCIC of the TCI, wherein N3<=N2 for any N3, wherein N1, N2 and N3 are all positive integers, computing an emphasized TCI (ETCI) having N2 TCIC by emphasizing the respective N3 selected TCIC of the TCI in the second domain, computing an inverse transformation of the ETCI from the second domain to the first domain to obtain the respective ECI with N2 CIC, wherein the inverse transformation is an inverse of the transformation; computing a motion information (MI) based on the ECI of the TSCI; and performing a sensing task based on the MI.

In another embodiment, a wireless device in a venue is described. The wireless device comprises: a receiver configured to receive a wireless signal transmitted by a transmitting device through a wireless multipath channel of the venue, wherein the received wireless signal differs from the transmitted wireless signal due to the wireless multipath channel and a motion of an object in the venue; a memory; and a processor communicatively coupled to the memory. The processor is configured to: obtain a time series of channel information (TSCI) of the wireless multipath channel based on the received wireless signal, wherein each channel information (CI) comprises N1 CI components (CIC); for each respective CI having N1 CIC of the TSCI, compute a respective enhanced CI (ECI) having N2 CIC by: computing a transformation of the N1 CIC of the respective CI in a first domain to a respective transformed CI (TCI) with N2 transformed CIC (TCIC) in a second domain, wherein N1<=N2, selecting a respective number, N3, of TCIC of the TCI, wherein N3<=N2 for any N3, wherein N1, N2 and N3 are all positive integers, computing an emphasized TCI (ETCI) having N2 TCIC by emphasizing the respective N3 selected TCIC of the TCI in the second domain, computing an inverse transformation of the ETCI from the second domain to the first domain to obtain the respective ECI with N2 CIC, wherein the inverse transformation is an inverse of the transformation; compute a motion information (MI) based on the ECI of the TSCI; and perform a sensing task based on the MI.

In yet another embodiment, a system for wireless sensing is described. The system comprises: a transmitter configured to transmit a wireless signal through a wireless multipath channel of a venue; and a receiver. The receiver is configured to: receive the wireless signal through the wireless multipath channel of the venue, wherein the received wireless signal differs from the transmitted wireless signal due to the wireless multipath channel and a motion of an object in the venue; obtain a time series of channel information (TSCI) of the wireless multipath channel based on the received wireless signal, wherein each channel information (CI) comprises N1 CI components (CIC); for each respective CI having N1 CIC of the TSCI, compute a respective enhanced CI (ECI) having N2 CIC by: computing a transformation of the N1 CIC of the respective CI in a first domain to a respective transformed CI (TCI) with N2 transformed CIC (TCIC) in a second domain, wherein N1<=N2, selecting a respective number, N3, of TCIC of the TCI, wherein N3<=N2 for any N3, wherein N1, N2 and N3 are all positive integers, computing an emphasized TCI (ETCI) having N2 TCIC by emphasizing the respective N3 selected TCIC of the TCI in the second domain, computing an inverse transformation of the ETCI from the second domain to the first domain to obtain the respective ECI with N2 CIC, wherein the inverse transformation is an inverse of the transformation; compute a motion information (MI) based on the ECI of the TSCI, and perform a sensing task based on the MI.

Other concepts relate to software for implementing the present teaching on wireless sensing using measurement enhancement. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of example embodiments. These example embodiments are described in detail with reference to the drawings. These embodiments are non-limiting example embodiments, in which like reference numerals represent similar structures throughout the several views of the drawings.

FIG. 8 illustrates a flow chart of an example method for transforming N1-component CI to N2-component TCI, according to some embodiments of the present disclosure.

FIG. 9 illustrates a flow chart of an example method for selecting N3 TCIC from N2 components of TCI, according to some embodiments of the present disclosure.

FIG. 10 illustrates a flow chart of an example method for emphasizing N3 selected TCIC and deemphasizing N2-N3 un-selected TCIC, according to some embodiments of the present disclosure.

FIG. 11A and FIG. 11B illustrate a flow chart of an example method for computing task results using enhanced CI, according to some embodiments of the present disclosure.

FIG. 12 illustrates a flow chart of an example method for computing task results based on multiple domain-based analytics, according to some embodiments of the present disclosure.

FIG. 13 illustrates a flow chart of an example method for constructing a spatially-diverse vector to generate spatial-domain analytics, according to some embodiments of the present disclosure.

DETAILED DESCRIPTION

Figure 1:
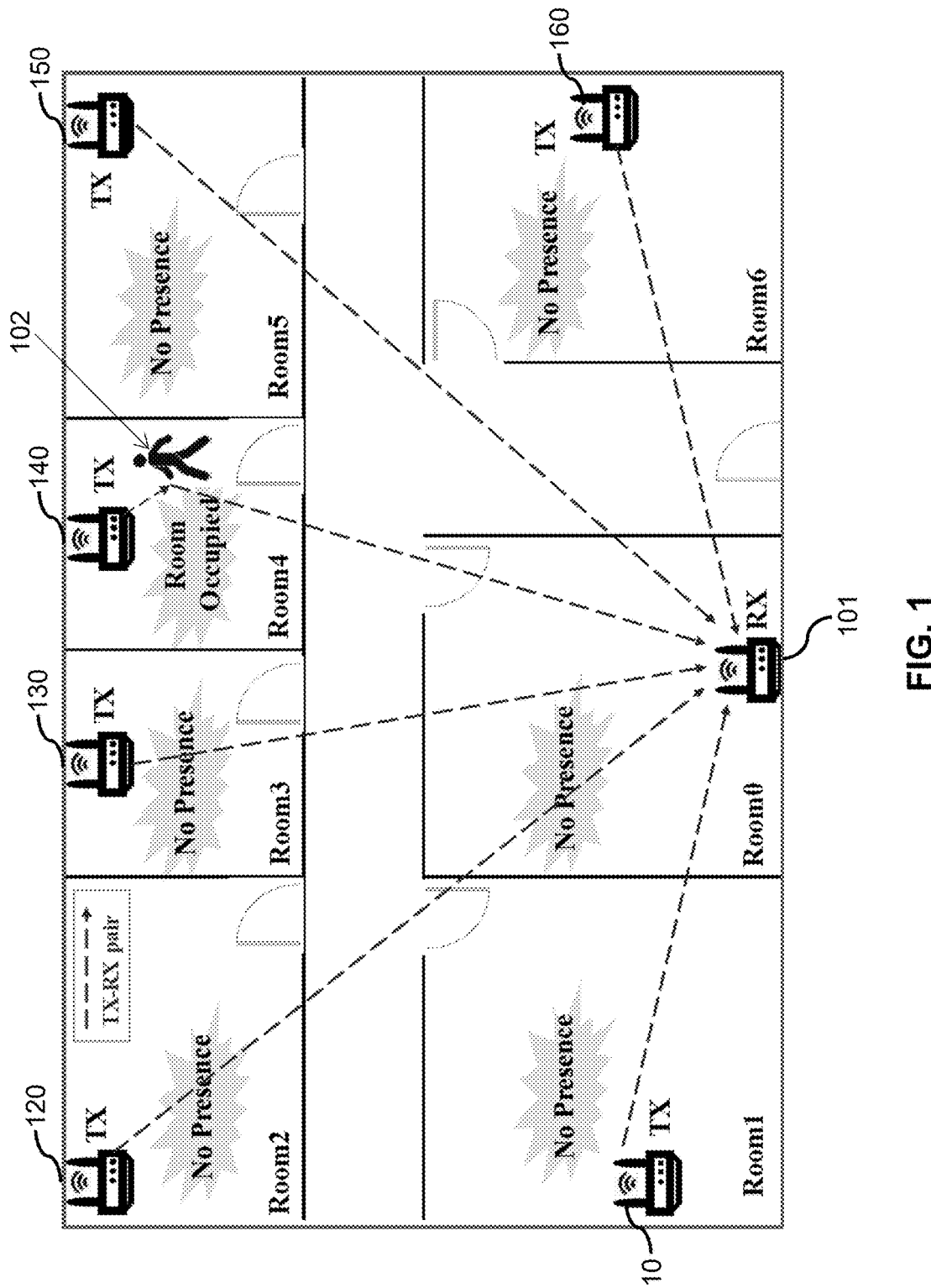
FIG. 1 illustrates an example scenario for wireless sensing in a venue, according to some embodiments of the present disclosure.

The symbol "/" disclosed herein means "and/or". For example, "A/B" means "A and/or B." In some embodiments, a method/device/system/software of a wireless monitoring system is disclosed. A time series of channel information (CI) of a wireless multipath channel is obtained using a processor, a memory communicatively coupled with processor and a set of instructions stored in memory. The time series of CI (TSCI) may be extracted from a wireless signal transmitted from a Type1 heterogeneous wireless device (e.g. wireless transmitter (TX), "Bot" device) to a Type2 heterogeneous wireless device (e.g. wireless receiver (RX), "Origin" device) in a venue through the channel. The channel is impacted by an expression/motion of an object in venue. A characteristics/spatial-temporal information (STI)/motion information (MI) of object/expression/motion may be computed/monitored based on the TSCI. A task may be performed based on the characteristics/STI/MI. A task-related presentation may be generated in a user-interface (UI) on a device of a user.

Expression may comprise placement, placement of moveable parts, location/speed/acceleration/position/orientation/direction/identifiable place/region/presence/spatial coordinate, static expression/presentation/state/size/length/width/height/angle/scale/curve/surface/area/volume/pose/posture/manifestation/body language, dynamic expression/motion/sequence/movement/activity/behavior/gesture/gait/extension/contraction/distortion/deformation, body expression (e.g. head/face/eye/mouth/tongue/hair/voice/neck/limbs/arm/hand/leg/foot/muscle/moveable parts), surface expression/shape/texture/material/color/electromagnetic (EM) characteristics/visual pattern/wetness/reflectance/translucency/flexibility, material property (e.g. living tissue/hair/fabric/metal/wood/leather/plastic/artificial material/solid/liquid/gas/temperature), expression change, and/or some combination.

Wireless multipath channel may comprise: communication channel, analog frequency channel (e.g. with carrier frequency near 700/800/900 MHz, or 1.8/1.9/2.4/3/5/6/27/60/70+ GHz), coded channel (e.g. in CDMA), and/or channel of wireless/cellular network/system (e.g. WLAN, WiFi, mesh, 4G/LTE/5G/6G/7G/8G, Bluetooth, Zigbee, UWB, RFID, microwave). It may comprise multiple channels, which may be consecutive (e.g. adjacent/overlapping bands) or non-consecutive (e.g. non-overlapping bands, 2.4 GHz/5 GHz). While channel is used to transmit wireless signal and perform sensing measurements, data (e.g. TSCI/feature/component/characteristics/STI/MI/analytics/task outputs, auxiliary/non-sensing data/network traffic) may be communicated/transmitted in channel.

Wireless signal may comprise a series of probe signals. It may be any of: EM radiation, radio frequency (RF)/light/bandlimited/baseband signal, signal in licensed/unlicensed/ISM band, wireless/mobile/cellular/optical communication/network/mesh/downlink/uplink/unicast/multicast/broadcast signal. It may be compliant to standard/protocol (e.g. WLAN, WWAN, WPAN, WBAN, international/national/industry/defacto, IEEE/802/802.11/15/16, WiFi, 802.11n/ac/ax/be/bf, 3G/4G/LTE/5G/6G/7G/8G, 3GPP/Bluetooth/BLE/Zigbee/NFC/RFID/UWB/WiMax). A probe signal may comprise any of: protocol/standard/beacon/pilot/sounding/excitation/illumination/handshake/synchronization/reference/source/motion probe/detection/sensing/management/control/data/null-data/beacon/pilot/request/response/association/reassociation/disassociation/authentication/action/report/poll/announcement/extension/enquiry/acknowledgement frame/packet/signal, and/or null-data-frame (NDP)/RTS/CTS/QoS/CF-Poll/CF-Ack/block acknowledgement/reference/training/synchronization. It may comprise line-of-sight (LOS)/non-LOS components (or paths/links). It may have data embedded. Probe signal may be replaced by (or embedded in) data signal. Each frame/packet/signal may comprise: preamble/header/payload. It may comprise: training sequence, short (STF)/long (LTF) training field, L-STF/L-LTF/L-SIG/HE-STF/HE-LTF/HE-SIG-A/HE-SIG-B, channel estimation field (CEF). It may be used to transfer power wirelessly from Type1 device to Type2 device. Sounding rate of signal may be adjusted to control amount of transferred power. Probe signals may be sent in burst.

TSCI may be extracted/obtained (e.g. by IC/chip) from wireless signal at a layer of Type2 device (e.g. layer of OSI reference model, PHY/MAC/data link/logical link control/network/transport/session/presentation/application layer, TCP/IP/internet/link layer). It may be extracted from received wireless/derived signal. It may comprise wireless sensing measurements obtained in communication protocol (e.g. wireless/cellular communication standard/network, 4G/LTE/5G/6G/7G/8G, WiFi, IEEE 802.11/11bf/15/16). Each CI may be extracted from a probe/sounding signal, and may be associated with time stamp. TSCI may be associated with starting/stopping time/duration/amount of CI/sampling/sounding frequency/period. A motion detection/sensing signal may be recognized/identified base on probe signal. TSCI may be stored/retrieved/accessed/preprocessed/processed/postprocessed/conditioned/analyzed/monitored. TSCI/features/components/characteristics/STI/MI/analytics/task outcome may be communicated to edge/cloud server/Type1/Type2/hub/data aggregator/another device/system/network.

Type1/Type2 device may comprise components (hardware/software) such as electronics/chip/integrated circuit (IC)/RF circuitry/antenna/modem/TX/RX/transceiver/RF interface (e.g. 2.4/5/6/27/60/70+ GHz radio/front/back haul radio)/network/interface/processor/memory/module/circuit/board/software/firmware/connectors/structure/enclosure/housing/structure. It may comprise access point (AP)/base-station/mesh/router/repeater/hub/wireless station/client/terminal/"Origin Satellite"/"Tracker Bot", and/or internet-of-things (IoT)/appliance/wearable/accessory/peripheral/ furniture/amenity/gadget/vehicle/module/wireless-enabled/unicast/multicast/broadcasting/node/hub/target/sensor/portable/mobile/cellular/communication/motion-detection/source/destination/standard-compliant device. It may comprise additional attributes such as auxiliary functionality/network connectivity/purpose/brand/model/appearance/form/shape/color/material/specification. It may be heterogeneous because the above (e.g. components/device types/additional attributes) may be different for different Type1 (or Type2) devices.

Type1/Type2 devices may/may not be authenticated/associated/collocated. They may be same device. Type1/Type2/portable/nearby/another device, sensing/measurement session/link between them, and/or object/expression/motion/characteristics/STI/MI/task may be associated with an identity/identification/identifier (ID) such as UUID, associated/unassociated STA ID (ASID/USID/AID/UID). Type2 device may passively observe/monitor/receive wireless signal from Type1 device without establishing connection (e.g. association/authentication/handshake) with, or requesting service from, Type1 device. Type1/Type2 device may move with object/another object to be tracked.

Type1 (TX) device may function as Type2 (RX) device temporarily/sporadically/continuously/repeatedly/interchangeably/alternately/simultaneously/contemporaneously/concurrently; and vice versa. Type1 device may be Type2 device. A device may function as Type1/Type2 device temporarily/sporadically/continuously/repeatedly/simultaneously/concurrently/contemporaneously. There may be multiple wireless nodes each being Type1/Type2 device. TSCI may be obtained between two nodes when they exchange/communicate wireless signals. Characteristics/STI/MI of object may be monitored individually based on a TSCI, or jointly based on multiple TSCI.

Motion/expression of object may be monitored actively with Type1/Type2 device moving with object (e.g. wearable devices/automated guided vehicle/AGV), or passively with Type1/Type2 devices not moving with object (e.g. both fixed devices).

Task may be performed with/without reference to reference/trained/initial database/profile/baseline that is trained/collected/processed/computed/transmitted/stored in training phase. Database may be re-training/updated/reset.

Presentation may comprise UI/GUI/text/message/form/webpage/visual/image/video/graphics/animation/graphical/symbol/emoticon/sign/color/shade/sound/music/speech/audio/mechanical/gesture/vibration/haptics presentation. Time series of characteristic/STI/MI/task outcome/another quantity may be displayed/presented in presentation. Any computation may be performed/shared by processor (or logic unit/chip/IC)/Type1/Type2/user/nearby/another device/local/edge/cloud server/hub/data/signal analysis subsystem/sensing initiator/response/SBP initiator/responder/AP/non-AP. Presentation may comprise any of: monthly/weekly/daily/simplified/detailed/cross-sectional/small/large/form-factor/color-coded/comparative/summary/web view, animation/voice announcement/another presentation related to periodic/repetition characteristics of repeating motion/expression.

Multiple Type1 (or Type 2) devices may interact with a Type2 (or Type1) device. The multiple Type1 (or Type2) devices may be synchronized/asynchronous, and/or may use same/different channels/sensing parameters/settings (e.g. sounding frequency/bandwidth/antennas). Type2 device may receive another signal from Type1/another Type1 device. Type1 device may transmit another signal to Type2/another Type2 device. Wireless signals sent (or received) by them may be sporadic/temporary/continuous/repeated/synchronous/simultaneous/concurrent/contemporaneous. They may operate independently/collaboratively. Their data (e.g. TSCI/feature/characteristics/STI/MI/intermediate task outcomes) may be processed/monitored/analyzed independently or jointly/collaboratively.

Any devices may operate based on some state/internal state/system state. Devices may communicate directly, or via another/nearby/portable device/server/hub device/cloud server. Devices/system may be associated with one or more users, with associated settings. Settings may be chosen/selected/pre-programmed/changed/adjusted/modified/varied over time. The method may be performed/executed in shown order/another order. Steps may be performed in parallel/iterated/repeated. Users may comprise human/adult/older adult/man/woman/juvenile/child/baby/pet/animal/creature/machine/computer module/software. Step/operation/processing may be different for different devices (e.g. based on locations/orientation/direction/roles/user-related characteristics/settings/configurations/available resources/bandwidth/power/network connection/hardware/software/processor/co-processor/memory/battery life/antennas/directional antenna/power setting/device parameters/characteristics/conditions/status/state). Any/all device may be controlled/coordinated by a processor (e.g. associated with Type1/Type2/nearby/portable/another device/server/designated source). Some device may be physically in/of/attached to a common device.

Type1 (or Type2) device may be capable of wirelessly coupling with multiple Type2 (or Type1) devices. Type1 (or Type2) device may be caused/controlled to switch/establish wireless coupling (e.g. association/authentication) from Type2 (or Type1) device to another Type2 (or another Type1) device. The switching may be controlled by server/hub device/processor/Type1 device/Type2 device. Radio channel may be different before/after switching. A second wireless signal may be transmitted between Type1 (or Type2) device and second Type2 (or second Type1) device through the second channel. A second TSCI of second channel may be extracted/obtained from second signal. The first/second signals, first/second channels, first/second Type1 device, and/or first/second Type2 device may be same/similar/co-located.

Type1 device may transmit/broadcast wireless signal to multiple Type2 devices, with/without establishing connection (association/authentication) with individual Type2 devices. It may transmit to a particular/common MAC address, which may be MAC address of some device (e.g. dummy receiver). Each Type2 device may adjust to particular MAC address to receive wireless signal. Particular MAC address may be associated with venue, which may be recorded in an association table of an Association Server (e.g. hub device). Venue may be identified by Type1 device/Type2 device based on wireless signal received at particular MAC address.

For example, Type2 device may be moved to a new venue. Type1 device may be newly set up in venue such that Type1 and Type2 devices are not aware of each other. During set up, Type1 device may be instructed/guided/caused/controlled (e.g. by dummy receiver, hardware pin setting/connection, stored setting, local setting, remote setting, downloaded setting, hub device, and/or server) to send wireless signal (e.g. series of probe signals) to particular MAC address. Upon power up, Type2 device may scan for probe signals according to a table of MAC addresses (e.g. stored in designated source, server, hub device, cloud server) that may be used for broadcasting at different locations (e.g.

different MAC address used for different venue such as house/office/enclosure/floor/multi-storey building/store/airport/mall/stadium/hall/station/subway/lot/area/zone/region/district/city/country/continent). When Type2 device detects wireless signal sent to particular MAC address, it can use the table to identify venue.

Channel may be selected from a set of candidate/selectable/admissible channels. Candidate channels may be associated with different frequency bands/bandwidth/carrier frequency/modulation/wireless standards/coding/encryption/payload characteristics/network/ID/SSID/characteristics/settings/parameters. Particular MAC address/selected channel may be changed/adjusted/varied/modified over time (e.g. according to time table/rule/policy/mode/condition/situation/change). Selection/change may be based on availability/collision/traffic pattern/co-channel/inter-channel interference/effective bandwidth/random selection/pre-selected list/plan. It may be done by a server (e.g. hub device). They may be communicated (e.g. from/to Type1/Type2/hub/another device/local/edge/cloud server).

Wireless connection (e.g. association/authentication) between Type1 device and nearby/portable/another device may be established (e.g. using signal handshake). Type1 device may send first handshake signal (e.g. sounding frame/probe signal/request-to-send RTS) to the nearby/portable/another device. Nearby/portable/another device may reply to first signal by sending second handshake signal (e.g. command/clear-to-send/CTS) to Type1 device, triggering Type1 device to transmit/broadcast wireless signal to multiple Type2 devices without establishing connection with the Type2 devices. Second handshake signals may be response/acknowledge (e.g. ACK) to first handshake signal. Second handshake signal may contain information of venue/Type1 device. Nearby/portable/another device may be a dummy device with purpose (e.g. primary purpose, secondary purpose) to establish wireless connection with Type1 device, to receive first signal, or send second signal. Nearby/portable/another device may be physically attached to Type1 device.

In another example, nearby/portable/another device may send third handshake signal to Type1 device triggering Type1 device to broadcast signal to multiple Type2 devices without establishing connection with them. Type1 device may reply to third signal by transmitting fourth handshake signal to the another device.

Nearby/portable/another device may be used to trigger multiple Type1 devices to broadcast. It may have multiple RF circuitries to trigger multiple transmitters in parallel. Triggering may be sequential/partially sequential/partially/fully parallel. Parallel triggering may be achieved using additional device(s) to perform similar triggering in parallel to nearby/portable/another device. After establishing connection with Type1 device, nearby/portable/another device may suspend/stop communication with Type1 device. It may enter an inactive/hibernation/sleep/stand-by/low-power/OFF/power-down mode. Suspended communication may be resumed. Nearby/portable/another device may have the particular MAC address and Type1 device may send signal to particular MAC address.

The (first) wireless signal may be transmitted by a first antenna of Type1 device to some first Type2 device through a first channel in a first venue. A second wireless signal may be transmitted by a second antenna of Type1 device to some second Type2 device through a second channel in a second venue. First/second signals may be transmitted at first/second (sounding) rates respectively, perhaps to first/second MAC addresses respectively. Some first/second channels/signals/rates/MAC addresses/antennas/Type2 devices may be same/different/synchronous/asynchronous. First/second venues may have same/different sizes/shape/multipath characteristics. First/second venues/immediate areas around first/second antennas may overlap. First/second channels/signals may be WiFi+LTE (one being WiFi, one being LTE), or WiFi+WiFi, or WiFi (2.4 GHz)+WiFi (5 GHz), or WiFi (5 GHz, channel=a1, BW=a2)+WiFi (5 GHz/channel=b1, BW=b2). Some first/second items (e.g. channels/signals/rates/MAC addresses/antennas/Type1/Type2 devices) may be changed/adjusted/varied/modified over time (e.g. based on time table/rule/policy/mode/condition/situation/another change).

Each Type1 device may be signal source of multiple Type2 devices (i.e. it sends respective probe signal to respective Type2 device). Each respective Type2 device may choose asynchronously the Type1 device from among all Type1 devices as its signal source. TSCI may be obtained by each respective Type2 device from respective series of probe signals from Type1 device. Type2 device may choose Type1 device from among all Type1 devices as its signal source (e.g. initially) based on identity/identification/identifier of Type1/Type2 device, task, past signal sources, history, characteristics, signal strength/quality, threshold for switching signal source, and/or information of user/account/profile/access info/parameters/input/requirement/criteria.

Database of available/candidate Type1 (or Type2) devices may be initialized/maintained/updated by Type2 (or Type1) device. Type2 device may receive wireless signals from multiple candidate Type1 devices. It may choose its Type1 device (i.e. signal source) based on any of: signal quality/strength/regularity/channel/traffic/characteristics/properties/states/task requirements/training task outcome/MAC addresses/identity/identifier/past signal source/history/user instruction/another consideration.

An undesirable/bad/poor/problematic/unsatisfactory/unacceptable/intolerable/faulty/demanding/undesirable/inadequate/lacking/inferior/unsuitable condition may occur when (1) timing between adjacent probe signals in received wireless signal becomes irregular, deviating from agreed sounding rate (e.g. time perturbation beyond acceptable range), and/or (2) processed/signal strength of received signal is too weak (e.g. below third threshold, or below fourth threshold for significant percentage of time), wherein processing comprises any lowpass/bandpass/highpass/median/moving/weighted average/linear/nonlinear/smoothing filtering. Any thresholds/percentages/parameters may be time-varying. Such condition may occur when Type1/Type2 device become progressively far away, or when channel becomes congested.

Some settings (e.g. Type1-Type2 device pairing/signal source/network/association/probe signal/sounding rate/scheme/channel/bandwidth/system state/TSCI/TSMA/task/task parameters) may be changed/varied/adjusted/modified. Change may be according to time table/rule/policy/mode/condition (e.g. undesirable condition)/another change. For example, sounding rate may normally be 100 Hz, but changed to 1000 Hz in demanding situations, and to 1 Hz in low power/standby situation.

Settings may change based on task requirement (e.g. 100 Hz normally and 1000 Hz momentarily for 20 seconds). In task, instantaneous system may be associated adaptively/dynamically to classes/states/conditions (e.g. low/normal/high priority/emergency/critical/regular/privileged/non-subscription/subscription/paying/non-paying). Settings (e.g. sounding rate) may be adjusted accordingly. Change may be controlled by: server/hub/Type1/Type2 device. Scheduled changes may be made according to time table. Changes may be immediate when emergency is detected, or gradual when developing condition is detected.

Characteristics/STI/MI may be monitored/analyzed individually based on a TSCI associated with a particular Type1/Type2 device pair, or jointly based on multiple TSCI associated multiple Type1/Type2 pairs, or jointly based on any TSCI associated with the particular Type2 device and any Type1 devices, or jointly based on any TSCI associated with the particular Type1 device and any Type2 devices, or globally based on any TSCI associated with any Type1/ Type2 devices.

A classifier/classification/recognition/detection/estimation/projection/feature extraction/processing/filtering may be applied (e.g. to CI/CI-feature/characteristics/STI/MI), and/or trained/re-trained/updated. In a training stage, training may be performed based on multiple training TSCI of some training wireless multipath channel, or characteristic/ STI/MI computed from training TSCI, the training TSCI obtained from training wireless signals transmitted from training Type1 devices and received by training Type2 devices. Re-training/updating may be performed in an operating stage based on training TSCI/current TSCI. There may be multiple classes (e.g. groupings/categories/events/motions/expression/activities/objects/locations) associated with venue/regions/zones/location/environment/home/office/building/warehouse/facility object/expression/motion/ movement/process/event/manufacturing/assembly-line/ maintenance/repairing/navigation/object/emotional/mental/ state/condition/stage/gesture/gait/action/motion/presence/ movement/daily/activity/history/event.

Classifier may comprise linear/nonlinear/binary/multi-class/Bayes classifier/Fisher linear discriminant/logistic regression/Markov chain/Monte Carlo/deep/neural network/ perceptron/self-organization maps/boosting/meta algorithm/ decision tree/random forest/genetic programming/kernel learning/KNN/support vector machine (SVM).

Feature extraction/projection may comprise any of: subspace projection/principal component analysis (PCA)/independent component analysis (ICA)/vector quantization/singular value decomposition (SVD)/eigen-decomposition/ eigenvalue/time/frequency/orthogonal/non-orthogonal decomposition, processing/preprocessing/postprocessing. Each CI may comprise multiple components (e.g. vector/ combination of complex values). Each component may be preprocessed to give magnitude/phase or a function of such.

Feature may comprise: output of feature extraction/projection, amplitude/magnitude/phase/energy/power/strength/ intensity, presence/absence/proximity/likelihood/histogram, time/period/duration/frequency/component/decomposition/ projection/band, local/global/maximum (max)/minimum (min)/zero-crossing, repeating/periodic/typical/habitual/ one-time/atypical/abrupt/mutually-exclusive/evolving/transient/changing/time/related/correlated feature/pattern/trend/ profile/events/tendency/inclination/behavior, cause-and-effect/short-term/long-term/correlation/statistics/frequency/ period/duration, motion/movement/location/map/ coordinate/height/speed/acceleration/angle/rotation/size/ volume, suspicious/dangerous/alarming event/warning/ belief/proximity/collision, tracking/breathing/heartbeat/gait/ action/event/statistical/hourly/daily/weekly/monthly/yearly parameters/statistics/analytics, well-being/health/disease/ medical statistics/analytics, an early/instantaneous/contemporaneous/delayed indication/suggestion/sign/indicator/ verifier/detection/symptom of a state/condition/situation/ disease/biometric, baby/patient/machine/device/ temperature/vehicle/parking lot/venue/lift/elevator/spatial/ road/fluid flow/home/room/office/house/building/ warehouse/storage/system/ventilation/fan/pipe/duct/people/ human/car/boat/truck/airplane/drone/downtown/crowd/ impulsive event/cyclo-stationary/environment/vibration/ material/surface/3D/2D/local/global, and/or another measurable quantity/variable. Feature may comprise monotonic function of feature, or sliding aggregate of features in sliding window.

Training may comprise AI/machine/deep/supervised/unsupervised/discriminative training/auto-encoder/linear discriminant analysis/regression/clustering/tagging/labeling/ Monte Carlo computation.

A current event/motion/expression/object in venue at current time may be classified by applying classifier to current TSCI/characteristics/STI/MI obtained from current wireless signal received by Type2 device in venue from Type1 devices in an operating stage. If there are multiple Type1/ Type2 devices, some/all (or their locations/antenna locations) may be a permutation of corresponding training Type1/Type2 devices (or locations/antenna locations). Type1/Type2 device/signal/channel/venue/object/motion may be same/different from corresponding training entity. Classifier may be applied to sliding windows. Current TSCI/ characteristics/STI/MI may be augmented by training TSCI/ characteristics/STI/MI (or fragment/extract) to bootstrap classification/classifier.

A first section/segment (with first duration/starting/ending time) of a first TSCI (associated with first Type1-Type2 device pair) may be aligned (e.g. using dynamic time warping/DTW/matched filtering, perhaps based on some mismatch/distance/similarity score/cost, or correlation/auto-correlation/cross-correlation) with a second section/segment (with second duration/starting/ending time) of a second TSCI (associated with second Type1-Type2 device pair), with each CI in first section mapped to a CI in second section. First/second TSCI may be preprocessed. Some similarity score (component/item/link/segment-wise) may be computed. The similarity score may comprise any of: mismatch/distance/similarity score/cost. Component-wise similarity score may be computed between a component of first item (CI/feature/characteristics/STI/MI) of first section and corresponding component of corresponding mapped item (second item) of second section. Item-wise similarity score may be computed between first/second items (e.g. based on aggregate of corresponding component-wise similarity scores). An aggregate may comprise any of: sum/ weighted sum, weighted average/robust/trimmed mean/ arithmetic/geometric/harmonic mean, median/mode. Link-wise similarity score may be computed between first/second items associated with a link (TX-RX antenna pair) of first/second Type1-Type2 device pairs (e.g. based on aggregate of corresponding item-wise similarity scores). Segment-wise similarity score may be computed between first/ second segments (e.g. based on aggregate of corresponding link-wise similarity scores). First/second segment may be sliding.

In DTW, a function of any of: first/second segment, first/second item, another first (or second) item of first (or second) segment, or corresponding timestamp/duration/difference/differential, may satisfy a constraint. Time difference between first/second items may be constrained (e.g. upper/lower bounded). First (or second) section may be entire first (or second) TSCI. First/second duration/starting/ ending time may be same/different.

In one example, first/second Type1-Type2 device pairs may be same and first/second TSCI may be same/different. When different, first/second TSCI may comprise a pair of current/reference, current/current or reference/reference TSCI. For "current/reference", first TSCI may be current TSCI obtained in operating stage and second TSCI may be reference TSCI obtained in training stage. For "reference/reference", first/second TSCI may be two TSCI obtained during training stage (e.g. for two training events/states/classes). For "current/current", first/second TSCI may be two TSCI obtained during operating stage (e.g. associated with two different antennas, or two measurement setups). In another example, first/second Type1-Type2 device pairs may be different, but share a common device (Type1 or Type2).

Aligned first/second segments (or portion of each) may be represented as first/second vectors. Portion may comprise all items (for "segment-wise"), or all items associated with a TX-RX link (for "link-wise"), or an item (for "item-wise"), or a component of an item (for "component-wise"). Similarity score may comprise combination/aggregate/function of any of: inner product/correlation/autocorrelation/correlation indicator/covariance/discriminating score/distance/Euclidean/absolute/L_k/weighted distance (between first/second vectors). Similarity score may be normalized by vector length. A parameter derived from similarity score may be modeled with a statistical distribution. A scale/location/another parameter of the statistical distribution may be estimated.

Recall there may be multiple sliding segments. Classifier may be applied to a sliding first/second segment pair to obtain a tentative classification result. It may associate current event with a particular class based on one segment pair/tentative classification result, or multiple segment pairs/tentative classification results (e.g. associate if similarity scores prevail (e.g. being max/min/dominant/matchless/most significant/excel) or significant enough (e.g. higher/lower than some threshold) among all candidate classes for N consecutive times, or for a high/low enough percentage, or most/least often in a time period).

Channel information (CI) may comprise any of: signal strength/amplitude/phase/timestamp, spectral power measurement, modem parameters, dynamic beamforming information, transfer function components, radio state, measurable variables, sensing data/measurement, coarse/fine-grained layer information (e.g. PHY/MAC/datalink layer), digital gain/RF filter/frontend-switch/DC offset/correction/IQ-compensation settings, environment effect on wireless signal propagation, channel input-to-output transformation, stable behavior of environment, state profile, wireless channel measurements/received signal strength indicator (RSSI)/channel state information (CSI)/channel impulse response (CIR)/channel frequency response (CFR)/characteristics of frequency components (e.g. subcarriers)/channel characteristics/channel filter response, auxiliary information, data/meta/user/account/access/security/session/status/supervisory/device/network/household/neighborhood/environment/real-time/sensor/stored/encrypted/compressed/protected data, identity/identifier/identification.

Each CI may be associated with timestamp/arrival time/frequency band/signature/phase/amplitude/trend/characteristics, frequency-like characteristics, time/frequency/time-frequency domain element, orthogonal/non-orthogonal decomposition characteristics of signal through channel. Timestamps of TSCI may be irregular and may be corrected (e.g. by interpolation/resampling) to be regular, at least for a sliding time window.

TSCI may be/comprise a link-wise TSCI associated with an antenna of Type1 device and an antenna of Type2 device. For Type1 device with M antennas and Type2 device with N antennas, there may be MN link-wise TSCI.

CI/TSCI may be preprocessed/processed/postprocessed/stored/retrieved/transmitted/received. Some modem/radio state parameter may be held constant. Modem parameters may be applied to radio subsystem and may represent radio state. Motion detection signal (e.g. baseband signal, packet decoded/demodulated from it) may be obtained by processing (e.g. down-converting) wireless signal (e.g. RF/WiFi/LTE/5G/6G signal) by radio subsystem using radio state represented by stored modem parameters. Modem parameters/radio state may be updated (e.g. using previous modem parameters/radio state). Both previous/updated modem parameters/radio states may be applied in radio subsystem (e.g. to process signal/decode data). In the disclosed system, both may be obtained/compared/analyzed/processed/monitored.

Each CI may comprise N1 CI components (CIC) (e.g. time/frequency domain component, decomposition components), each with corresponding CIC index. Each CIC may comprise a real/imaginary/complex quantity, magnitude/phase/Boolean/flag, and/or some combination/subset. Each CI may comprise a vector/matrix/set/collection of CIC. CIC of TSCI associated with a particular CIC index may form a CIC time series. TSCI may be divided into N1 time series of CIC (TSCIC), each associated with respective CIC index. Characteristics/STI/MI may be monitored based on TSCIC. Some TSCIC may be selected based on some criteria/cost function/signal quality metric (e.g. SNR, interference level) for further processing.

Multi-component characteristics/STI/MI of multiple TSCIC (e.g. two components with indices 6 and 7, or three components indexed at 6, 7, 10) may be computed. In particular, k-component characteristics may be a function of k TSCIC with k corresponding CIC indices. With k=1, it is single-component characteristics which may constitute/form a one-dimensional (1D) function as CIC index spans all possible values. For k=2, two-component characteristics may constitute/form a 2D function. In special case, it may depend only on difference between the two indices. In such case, it may constitute 1D function. A total characteristics may be computed based on one or more multi-component characteristics (e.g. weighted average/aggregate). Characteristics/STI/MI of object/motion/expression may be monitored based on any multi-component characteristics/total characteristics.

Characteristics/STI/MI may comprise: instantaneous/short-/long-term/historical/repetitive/repeated/repeatable/recurring/periodic/pseudoperiodic/regular/habitual/incremental/average/initial/final/current/past/future/predicted/changing/deviational/change/time/frequency/orthogonal/non-orthogonal/transform/decomposition/deterministic/stochastic/probabilistic/dominant/key/prominent/representative/characteristic/significant/insignificant/indicative/common/averaged/shared/typical/prototypical/persistent/abnormal/abrupt/impulsive/sudden/unusual/unrepresentative/atypical/suspicious/dangerous/alarming/evolving/transient/one-time quantity/characteristics/analytics/feature/information, cause-and-effect, correlation indicator/score, auto/cross correlation/covariance, autocorrelation function (ACF), spectrum/spectrogram/power spectral density, time/frequency function/transform/projection, initial/final/temporal/change/trend/pattern/tendency/inclination/behavior/activity/history/profile/event, location/position/localization/spatial coordinate/change on map/path/navigation/tracking, linear/rotational/horizontal/vertical/location/distance/displacement/height/speed/velocity/acceleration/change/angular speed, direction/orientation, size/length/width/height/azimuth/area/volume/capacity, deformation/transformation, object/motion direction/angle/ shape/form/shrinking/expanding, behavior/activity/movement, occurrence, fall-down/accident/security/event, period/ frequency/rate/cycle/rhythm/count/quantity, timing/ duration/interval, starting/initiating/ending/current/past/next time/quantity/information, type/grouping/classification/ composition, presence/absence/proximity/approaching/receding/entrance/exit, identity/identifier, head/mouth/eye/ breathing/heart/hand/handwriting/arm/body/gesture/leg/ gait/organ characteristics, tidal volume/depth of breath/ airflow rate/inhale/exhale time/ratio, gait/walking/tool/ machine/complex motion, signal/motion characteristic/ information/feature/statistics/parameter/magnitude/phase/ degree/dynamics/anomaly/variability/detection/estimation/ recognition/identification/indication, slope/derivative/ higher order derivative of function/feature/mapping/ transformation of another characteristics, mismatch/ distance/similarity score/cost/metric, Euclidean/statistical/ weighted distance, L1/L2/Lk norm, inner/outer product, tag, test quantity, consumed/unconsumed quantity, state/physical/health/well-being/emotional/mental state, output responses, any composition/combination, and/or any related characteristics/information/combination.

Test quantities may be computed. Characteristics/STI/MI may be computed/monitored based on CI/TSCI/features/ similarity scores/test quantities. Static (or dynamic) segment/profile may be identified/computed/analyzed/monitored/extracted/obtained/marked/presented/indicated/ highlighted/stored/communicated by analyzing CI/TSCI/ features/functions of features/test quantities/characteristics/ STI/MI (e.g. target motion/movement presence/detection/ estimation/recognition/identification). Test quantities may be based on CI/TSCI/features/functions of features/characteristics/STI/MI. Test quantities may be processed/tested/ analyzed/compared.

Test quantity may comprise any/any function of: data/ vector/matrix/structure, characteristics/STI/MI, CI information (CII, e.g. CI/CIC/feature/magnitude/phase), directional information (DI, e.g. directional CII), dominant/representative/characteristic/indicative/key/archetypal/example/paradigmatic/prominent/common/shared/typical/prototypical/ averaged/regular/persistent/usual/normal/atypical/unusual/ abnormal/unrepresentative data/vector/matrix/structure, similarity/mismatch/distance score/cost/metric, auto/cross correlation/covariance, sum/mean/average/weighted/ trimmed/arithmetic/geometric/harmonic mean, variance/deviation/absolute/square deviation/averaged/median/total/ standard deviation/derivative/slope/variation/total/absolute/ square variation/spread/dispersion/variability, divergence/ skewness/kurtosis/range/interquartile range/coefficient of variation/dispersion/L-moment/quartile coefficient of dispersion/mean absolute/square difference/Gini coefficient/ relative mean difference/entropy/maximum (max)/minimum (min)/median/percentile/quartile, variance-to-mean ratio, max-to-min ratio, variation/regularity/similarity measure, transient event/behavior, statistics/mode/likelihood/histogram/probability distribution function (pdf)/moment generating function/expected function/value, behavior, repeatedness/periodicity/pseudo-periodicity, impulsiveness/ suddenness/occurrence/recurrence, temporal profile/ characteristics, time/timing/duration/period/frequency/ trend/history, starting/initiating/ending time/quantity/count, motion classification/type, change, temporal/frequency/ cycle change, etc.

Identification/identity/identifier/ID may comprise: MAC address/ASID/USID/AID/UID/UUID, label/tag/index, web link/address, numeral/alphanumeric ID, name/password/account/account ID, and/or another ID. ID may be assigned (e.g. by software/firmware/user/hardware, hardwired, via dongle). ID may be stored/retrieved (e.g. in database/ memory/cloud/edge/local/hub server, stored locally/remotely/permanently/temporarily). ID may be associated with any of: user/customer/household/information/data/address/phone number/social security number, user/customer number/record/account, timestamp/duration/timing. ID may be made available to Type1/Type2 device/sensing/SBP initiator/responder. ID may be for registration/initialization/ communication/identification/verification/detection/recognition/authentication/access control/cloud access/ networking/social networking/logging/recording/ cataloging/classification/tagging/association/pairing/ transaction/electronic transaction/intellectual property control (e.g. by local/cloud/server/hub, Type1/Type2/ nearby/user/another device, user).

Object may be person/pet/animal/plant/machine/user, baby/child/adult/older person, expert/specialist/leader/commander/manager/personnel/staff/officer/doctor/nurse/ worker/teacher/technician/serviceman/repairman/passenger/patient/customer/student/traveler/inmate/high-value person/, object to be tracked, vehicle/car/AGV/drone/robot/ wagon/transport/remote-controlled machinery/cart/moveable objects/goods/items/material/parts/components/machine/lift/elevator, merchandise/goods/cargo/people/items/ food/package/luggage/equipment/cleaning tool in/on workflow/assembly-line/warehouse/factory/store/supermarket/distribution/logistic/transport/manufacturing/retail/ wholesale/business center/facility/hub, phone/computer/laptop/tablet/dongle/plugin/companion/tool/peripheral/ accessory/wearable/furniture/appliance/amenity/gadget, IoT/networked/smart/portable devices, watch/glasses/ speaker/toys/stroller/keys/wallet/purse/handbag/backpack, goods/cargo/luggage/equipment/motor/machine/utensil/ table/chair/air-conditioner/door/window/heater/fan, light/ fixture/stationary object/television/camera/audio/video/surveillance equipment/parts, ticket/parking/toll/airplane ticket, credit/plastic/access card, object with fixed/changing/ no form, mass/solid/liquid/gas/fluid/smoke/fire/flame, signage, electromagnetic (EM) source/medium, and/or another object.

Object may have multiple parts, each with different movement (e.g. position/location/direction change). Object may be a person walking forward. While walking, his left/right hands may move in different directions, with different instantaneous motion/speed/acceleration.

Object may/may not be communicatively coupled with some network, such as WiFi, MiFi, 4G/LTE/5G/6G/7G/8G, Bluetooth/NFC/BLE/WiMax/Zigbee/mesh/adhoc network. Object may be bulky machinery with AC power supply that is moved during installation/cleaning/maintenance/renovation. It may be placed on/in moveable platforms such as elevator/conveyor/lift/pad/belt/robot/drone/forklift/car/boat/ vehicle. Type1/Type2 device may attach to/move with object. Type 1/Type2 device may be part of/embedded in portable/another device (e.g. module/device with module, which may be large/sizeable/small/heavy/bulky/light, e.g. coin-sized/cigarette-box-sized). Type 1/Type2/portable/another device may/may not be attached to/move with object, and may have wireless (e.g. via Bluetooth/BLE/Zigbee/ NFC/WiFi) or wired (e.g. USB/micro-USB/Firewire/ HDMI) connection with a nearby device for network access (e.g. via WiFi/cellular network). Nearby device may be object/phone/AP/IoT/device/appliance/peripheral/amenity/ furniture/vehicle/gadget/wearable/networked/computing device. Nearby device may be connected to some server (e.g. cloud server via network/internet). It may/may not be portable/moveable, and may/may not move with object. Type1/Type2/portable/nearby/another device may be powered by battery/solar/DC/AC/other power source, which may be replaceable/non-replaceable, and rechargeable/non-rechargeable. It may be wirelessly charged.

Type1/Type2/portable/nearby/another device may comprise any of: computer/laptop/tablet/pad/phone/printer/monitor/battery/antenna, peripheral/accessory/socket/plug/charger/switch/adapter/dongle, internet-of-thing (IoT), TV/sound bar/HiFi/speaker/set-top box/remote control/panel/gaming device, AP/cable/broadband/router/repeater/extender, appliance/utility/fan/refrigerator/washer/dryer/microwave/oven/stove/range/light/lamp/tube/pipe/tap/lighting/air-conditioner/heater/smoke detector, wearable/watch/glasses/goggle/button/bracelet/chain/jewelry/ring/belt/clothing/garment/fabric/shirt/pant/dress/glove/handwear/shoe/footwear/ha t/headwear/bag/purse/wallet/makeup/cosmetic/ornament/book/magazine/paper/stationary/signage/poster/display/printed matter, furniture/fixture/table/desk/chair/sofa/bed/cabinet/shelf/rack/storage/box/bucket/basket/packaging/carriage/tile/shingle/brick/block/mat/panel/curtain/cushion/pad/carpet/material/building material/glass, amenity/sensor/clock/pot/pan/ware/container/bottle/can/utensil/plate/cup/bowl/toy/ball/tool/pen/racket/lock/bell/camera/microphone/painting/frame/mirror/coffee-maker/door/window, food/pill/medicine, embeddable/implantable/gadget/instrument/equipment/device/apparatus/machine/controller/mechanical tool, garage-opener, key/plastic/payment/credit card/ticket, solar panel, key tracker, fire-extinguisher, garbage can/bin, WiFi-enabled device, smart device/machine/machinery/system/house/office/building/warehouse/facility/vehicle/car/bicycle/motorcycle/boat/vessel/airplane/cart/wagon, home/vehicle/office/factory/building/manufacturing/production/computing/security/another device.

One/two/more of Type1/Type2/portable/nearby/another device/server may determine an initial characteristics/STI/MI of object, and/or may share intermediate information. One of Type1/Type2 device may move with object (e.g. "Tracker Bot"). The other one of Type1/Type2 device may not move with object (e.g. "Origin Satellite", "Origin Register"). Either may have known characteristics/STI/MI. Initial STI/MI may be computed based on known STI/MI.

Venue may be any space such as sensing area, room/house/home/office/workplace/building/facility/warehouse/factory/store/vehicle/property, indoor/outdoor/enclosed/semi-enclosed/open/semi-open/closed/over-air/floating/underground space/area/structure/enclosure, space/area with wood/glass/metal/material/structure/frame/beam/panel/column/wall/floor/door/ceiling/window/cavity/gap/opening/reflection/refraction medium/fluid/construction material/fixed/adjustable layout/shape, human/animal/plant body/cavity/organ/bone/blood/vessel/air-duct/windpipe/teeth/soft/hard/rigid/non-rigid tissue, manufacturing/repair/maintenance/mining/parking/storage/transportation/shipping/logistic/sports/entertainment/amusement/public/recreational/government/community/seniors/elderly care/geriatric/space facility/terminal/hub, distribution center/store, machine/engine/device/assembly line/workflow, urban/rural/suburban/metropolitan area, staircase/escalator/elevator/hallway/walkway/tunnel/cave/cavern/channel/duct/pipe/tube/lift/well/pathway/roof/basement/den/alley/road/path/highway/sewage/ventilation system/network, car/truck/bus/van/container/ship/boat/submersible/train/tram/airplane/mobile home, stadium/city/playground/park/field/track/court/gymnasium/hall/mart/market/supermarket/ plaza/square/construction site/hotel/museum/school/hospital/university/garage/mall/airport/train/bus station/terminal/hub/platform, valley/forest/wood/terrain/landscape/garden/park/patio/land, and/or gas/oil/water pipe/line. Venue may comprise inside/outside of building/facility. Building/facility may have one/multiple floors, with a portion underground.

A event may be monitored based on TSCI. Event may be object/motion/gesture/gait related, such as fall-down, rotation/hesitation/pause, impact (e.g. person hitting sandbag/door/bed/window/chair/table/desk/cabinet/box/another person/animal/bird/fly/ball/bowling/tennis/soccer/volley ball/football/baseball/basketball), two-body action (e.g. person releasing balloon/catching fish/molding clay/writing paper/typing on computer), car moving in garage, person carrying smart phone/walking around venue, autonomous/moveable object/machine moving around (e.g. vacuum cleaner/utility/self-driving vehicle/car/drone).

Task may comprise: (a) sensing task, any of: monitoring/sensing/detection/recognition/estimation/verification/identification/authentication/classification/locationing/guidance/navigation/tracking/counting of/in any of: object/objects/vehicle/machine/tool/human/baby/elderly/patient/intruder/pet presence/proximity/activity/daily-activity/well-being/breathing/vital sign/heartbeat/health condition/sleep/sleep stage/walking/location/distance/speed/acceleration/navigation/tracking/exercise/safety/danger/fall-down/intrusion/security/life-threat/emotion/movement/motion/degree/pattern/periodic/repeated/cyclo-stationary/stationary/regular/transient/sudden/suspicious motion/irregularity/trend/change/breathing/human biometrics/environment informatics/gait/gesture/room/region/zone/venue, (b) computation task, any of: signal processing/preprocess/postprocessing/conditioning/denoising/calibration/analysis/feature extraction/transformation/mapping/supervised/unsupervised/semi-supervised/discriminative/machine/deep learning/training/clustering/training/PCA/eigen-decomposition/frequency/time/functional decomposition/neural network/map-based/model-based processing/correction/geometry estimation/analytics computation, (c) IoT task, any of: smart task for venue/user/object/human/pet/house/home/office/workplace/building/facility/warehouse/factory/store/vehicle/property/structure/assembly-line/IoT/device/system, energy/power management/transfer, wireless power transfer, interacting/engage with user/object/intruder/human/animal (e.g. presence/motion/gesture/gait/activity/behavior/voice/command/instruction/query/music/sound/image/vide o/location/movement/danger/threat detection/recognition/monitoring/analysis/response/execution/synthesis, generate/retrieve/play/display/render/synthesize dialog/exchange/response/presentation/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), activating/controlling/configuring (e.g. turn on/off/control/lock/unlock/open/close/adjust/configure) a device/system (e.g. vehicle/drone/electrical/mechanical/air-conditioning/heating/lighting/ventilation/clearning/entertainment/IoT/security/siren/access system/device/door/window/garage/lift/elevator/escalator/speaker/television/light/peripheral/accessory/wearable/furniture/appliance/amenity/gadget/alarm/camera/gaming/coffee/cooking/heater/fan/housekeeping/home/office machine/device/robot/vacuum cleaner/assembly line), (d) miscellaneous task, any of: transmission/coding/encryption/storage/analysis of data/parameters/analytics/derived data, upgrading/administration/configuration/coordination/broadcasting/synchronization/networking/encryption/communication/protection/compression/storage/database/archiving/query/cloud computing/presentation/augmented/virtual reality/other processing/task. Task may be performed by some of: Type1/Type2/nearby/portable/another device, and/or hub/local/edge/cloud server.

Task may also comprise: detect/recognize/monitor/locate/interpret/analyze/record/store user/visitor/intruder/object/pet, interact/engage/converse/dialog/exchange with user/object/visitor/intruder/human/baby/pet, detect/locate/localize/recognize/monitor/analyze/interpret/learn/train/respond/execute/synthesize/generate/record/store/summarize health/well-being/daily-life/activity/behavior/pattern/exercise/food-intake/restroom visit/work/play/rest/sleep/relaxation/danger/routine/timing/habit/trend/normality/normalcy/anomaly/regularity/irregularity/change/presence/motion/gesture/gait/expression/emotion/state/stage/voice/command/instruction/question/query/music/sound/location/movement/fall-down/threat/discomfort/sickness/environment/, generate/retrieve/play/display/render/synthesize dialog/exchange/response/presentation/report/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), detect/check/monitor/locate/manage/control/adjust/configure/lock/unlock/arm/disarm/open/close/fully/partially/activate/turn on/off some system/device/object (e.g. vehicle/robot/drone/electrical/mechanical/air-conditioning/heating/ventilation/HVAC/lighting/cleaning/entertainment/IoT/security/siren/access systems/devices/items/components, door/window/garage/lift/elevator/escalator/speaker/television/light/peripheral/accessory/wearable/furniture/appliance/amenity/gadget/alarm/camera/gaming/coffee/cooking/heater/fan/housekeeping/home/office machine/device/vacuum cleaner/assembly line/window/garage/door/blind/curtain/panel/solar panel/sun shade), detect/monitor/locate user/pet do something (e.g. sitting/sleeping on sofa/in bedroom/running on treadmill/cooking/watching TV/eating in kitchen/dining room/going upstairs/downstairs/outside/inside/using rest room), do something (e.g. generate message/response/warning/clarification/notification/report) automatically upon detection, do something for user automatically upon detecting user presence, turn on/off/wake/control/adjust/dim light/music/radio/TV/HiFi/STB/computer/speaker/smart device/air-conditioning/ventilation/heating system/curtains/light shades, turn on/off/pre-heat/control coffee-machine/hot-water-pot/cooker/oven/microwave oven/another cooking device, check/manage temperature/setting/weather forecast/telephone/message/mail/system check, present/interact/engage/dialog/converse (e.g. through smart speaker/display/screen; via webpage/email/messaging system/notification system).

When user arrives home by car, task may be to, automatically, detect user/car approaching, open garage/door upon detection, turn on driveway/garage light as user approaches garage, and/or turn on air conditioner/heater/fan. As user enters house, task may be to, automatically, turn on entrance light/off driveway/garage light, play greeting message to welcome user, turn on user's favorite music/radio/news/channel, open curtain/blind, monitor user's mood, adjust lighting/sound environment according to mood/current/imminent event (e.g. do romantic lighting/music because user is scheduled to eat dinner with girlfriend soon) on user's calendar, warm food in microwave that user prepared in morning, do diagnostic check of all systems in house, check weather forecast for tomorrow/news of interest to user, check calendar/to-do list, play reminder, check telephone answering/messaging system/email, give verbal report using dialog system/speech synthesis, and/or remind (e.g. using audible tool such as speakers/HiFi/speech synthesis/sound/field/voice/music/song/dialog system, using visual tool such as TV/entertainment system/computer/notebook/tablet/display/light/color/brightness/patterns symbols, using haptic/virtual reality/gesture/tool, using smart device/appliance/material/furniture/fixture, using server/hub device/cloud/fog/edge server/home/mesh network, using messaging/notification/communication/scheduling/email tool, using UI/GUI, using scent/smell/fragrance/taste, using neural/nervous system/tool, or any combination) user of someone's birthday/call him, prepare/give report. Task may turn on air conditioner/heater/ventilation system in advance, and/or adjust temperature setting of smart thermostat in advance. As user moves from entrance to living room, task may be to turn on living room light, open living room curtain, open window, turn off entrance light behind user, turn on TV/set-top box, set TV to user's favorite channel, and/or adjust an appliance according to user's preference/conditions/states (e.g. adjust lighting, choose/play music to build romantic atmosphere).

When user wakes up in morning, task may be to detect user moving around in bedroom, open blind/curtain/window, turn off alarm clock, adjust temperature from night-time to day-time profile, turn on bedroom light, turn on restroom light as user approaches restroom, check radio/streaming channel and play morning news, turn on coffee machine, preheat water, and/or turn off security system. When user walks from bedroom to kitchen, task may be to turn on kitchen/hallway lights, turn off bedroom/restroom lights, move music/message/reminder from bedroom to kitchen, turn on kitchen TV, change TV to morning news channel, lower kitchen blind, open kitchen window, unlock backdoor for user to check backyard, and/or adjust temperature setting for kitchen.

When user leaves home for work, task may be to detect user leaving, play farewell/have-a-good-day message, open/close garage door, turn on/off garage/driveway light, close/lock all windows/doors (if user forgets), turn off appliance (e.g. stove/microwave/oven), turn on/arm security system, adjust light/air-conditioning/heating/ventilation systems to "away" profile to save energy, and/or send alerts/reports/updates to user's smart phone.

Motion may comprise any of: no-motion, motion sequence, resting/non-moving motion, movement/change in position/location, daily/weekly/monthly/yearly/repeating/activity/behavior/action/routine, transient/time-varying/fall-down/repeating/repetitive/periodic/pseudo-periodic motion/breathing/heartbeat, deterministic/non-deterministic/probabilistic/chaotic/random motion, complex/combination motion, non-/pseudo-/cyclo-/stationary random motion, change in electro-magnetic characteristics, human/animal/plant/body/machine/mechanical/vehicle/drone motion, air-/wind-/weather-/water-/fluid-/ground/sub-surface/seismic motion, man-machine interaction, normal/abnormal/dangerous/warning/suspicious motion, imminent/rain/fire/flood/tsunami/explosion/collision, head/facial/eye/mouth/tongue/neck/finger/hand/arm/shoulder/upper/lower/body/chest/abdominal/hip/leg/foot/joint/knee/elbow/skin/below-skin/subcutaneous tissue/blood vessel/intravenous/organ/heart/lung/stomach/intestine/bowel/eating/breathing/talking/ singing/dancing/coordinated motion, facial/eye/mouth expression, and/or hand/arm/gesture/gait/UI/keystroke/typing stroke.

Type1/Type2 device may comprise heterogeneous IC, low-noise amplifier (LNA), power amplifier, transmit-receive switch, media access controller, baseband radio, and/or 2.4/3.65/4.9/5/6/sub-7/over-7/28/60/76 GHz/another radio. Heterogeneous IC may comprise processor/memory/software/firmware/instructions. It may support broadband/wireless/mobile/mesh/cellular network, WLAN/WAN/MAN, standard/IEEE/3GPP/WiFi/4G/LTE/5G/6G/7G/8G, IEEE 802.11/a/b/g/n/ac/ad/af/ah/ax/ay/az/be/bf/15/16, and/or Bluetooth/BLE/NFC/Zigbee/WiMax.

Processor may comprise any of: general-/special-/purpose/embedded/multi-core processor, microprocessor/microcontroller, multi-/parallel/CISC/RISC processor, CPU/GPU/DSP/ASIC/FPGA, and/or logic circuit. Memory may comprise non-/volatile, RAM/ROM/EPROM/EEPROM, hard disk/SSD, flash memory, CD-/DVD-ROM, magnetic/optical/organic/storage system/network, network/cloud/edge/local/external/internal storage, and/or any non-transitory storage medium. Set of instructions may comprise machine executable codes in hardware/IC/software/firmware, and may be embedded/pre-loaded/loaded upon-boot-up/on-the-fly/on-demand/pre-installed/installed/downloaded.

Processing/preprocessing/postprocessing may be applied to data (e.g. TSCI/feature/characteristics/STI/MI/test quantity/intermediate/data/analytics) and may have multiple steps. Step/pre-/post-/processing may comprise any of: computing function of operands/LOS/non-LOS/single-link/multi-link/component/item/quantity, magnitude/norm/phase/feature/energy/timebase/similarity/distance/characterization score/measure computation/extraction/correction/cleaning, linear/nonlinear/FIR/IIR/MA/AR/ARMA/Kalman/particle filtering, lowpass/bandpass/highpass/median/rank/quartile/percentile/mode/selective/adaptive filtering, interpolation/intrapolation/extrapolation/decimation/subsampling/upsampling/resampling, matched filtering/enhancement/restoration/denoising/smoothing/conditioning/spectral analysis/mean subtraction/removal, linear/nonlinear/inverse/frequency/time transform, Fourier transform (FT)/DTFT/DFT/FFT/wavelet/Laplace/Hilbert/Hadamard/trigonometric/sine/cosine/DCT/power-of-2/sparse/fast/frequency transform, zero/cyclic/padding, graph-based transform/processing, decomposition/orthogonal/non-orthogonal/over-complete projection/eigen-decomposition/SVD/PCA/ICA/compressive sensing, grouping/folding/sorting/comparison/soft/hard/thresholding/clipping, first/second/high order derivative/integration/convolution/multiplication/division/addition/subtraction, local/global maximization/minimization, recursive/iterative/constrained/batch processing, least mean square/absolute error/deviation, cost function optimization, neural network/detection/recognition/classification/identification/estimation/labeling/association/tagging/mapping/remapping/training/clustering/machine/supervised/unsupervised/semi-supervised learning/network, vector/quantization/encryption/compression/matching pursuit/scrambling/coding/storing/retrieving/transmitting/receiving/time-domain/frequency-domain/normalization/scaling/expansion/representing/merging/combining/splitting/tracking/monitoring/shape/silhouette/motion/activity/analysis, pdf/histogram estimation/importance/Monte Carlo sampling, error detection/protection/correction, doing nothing, time-varying/adaptive processing, conditioning/weighted/averaging/over selected components/links, arithmetic/geometric/harmonic/trimmed mean/centroid/medoid computation, morphological/logical operation/permutation/combination/sorting/AND/OR/XOR/union/intersection, vector operation/addition/subtraction/multiplication/division, and/or another operation. Processing may be applied individually/jointly. Acceleration using GPU/DSP/coprocessor/multicore/multiprocessing may be applied.

Function may comprise: characteristics/feature/magnitude/phase/energy, scalar/vector/discrete/continuous/polynomial/exponential/logarithmic/trigonometric/transcendental/logical/piecewise/linear/algebraic/nonlinear/circular/piecewise linear/real/complex/vector-valued/inverse/absolute/indicator/limiting/floor/rounding/sign/composite/sliding/moving function, derivative/integration, function of function, one-to-one/one-to-many/many-to-one/many-to-many function, mean/mode/median/percentile/max/min/range/statistics/histogram, local/global max/min/zero-crossing, variance/variation/spread/dispersion/deviation/standard deviation/divergence/range/interquartile range/total variation/absolute/total deviation, arithmetic/geometric/harmonic/trimmed mean/square/cube/root/power, thresholding/clipping/rounding/truncation/quantization/approximation, time function processed with an operation (e.g. filtering), sine/cosine/tangent/cotangent/secant/cosecant/elliptical/parabolic/hyperbolic/game/zeta function, probabilistic/stochastic/random/ergodic/stationary/deterministic/periodic/repeated function, inverse/transformation/frequency/discrete time/Laplace/Hilbert/sine/cosine/triangular/wavelet/integer/power-of-2/sparse transform, orthogonal/non-orthogonal/eigen projection/decomposition/eigenvalue/singular value/PCA/ICA/SVD/compressive sensing, neural network, feature extraction, function of moving window of neighboring items of time series, filtering function/convolution, short-time/discrete transform/Fourier/cosine/sine/Hadamard/wavelet/sparse transform, matching pursuit, approximation, graph-based processing/transform/graph signal processing, classification/identification/class/group/category/labeling, processing/preprocessing/postprocessing, machine/learning/detection/estimation/feature extraction/learning network/feature extraction/denoising/signal enhancement/coding/encryption/mapping/vector quantization/remapping/lowpass/highpass/bandpass/matched/Kalman/particle/FIR/IIR/MA/AR/ARMA/median/mode/adaptive filtering, first/second/high order derivative/integration/zero crossing/smoothing, up/down/random/importance/Monte Carlo sampling/resampling/converting, interpolation/extrapolation, short/long term statistics/auto/cross correlation/moment generating function/time averaging/weighted averaging, special/Bessel/Beta/Gamma/Gaussian/Poisson/integral complementary error function.

Sliding time window may have time-varying width/size. It may be small/large at beginning to enable fast/accurate acquisition and increase/decrease over time to steady-state size comparable to motion frequency/period/transient motion duration/characteristics/STI/MI to be monitored. Window size/time shift between adjacent windows may be constant/adaptively/dynamically/automatically changed/adjusted/varied/modified (e.g. based on battery life/power consumption/available computing power/change in amount of targets/nature of motion to be monitored/user request/choice/instruction/command).

Characteristics/STI/MI may be determined based on characteristic value/point of function and/or associated argument of function (e.g. time/frequency). Function may be outcome of a regression. Characteristic value/point may comprise local/global/constrained/significant/first/second/i^th maximum/minimum/extremum/zero-crossing (e.g. with positive/negative time/frequency/argument) of function. Local signal-to-noise-ratio (SNR) or SNR-like parameter may be computed for each pair of adjacent local max (peak)/local min (valley) of function, which may be some function (e.g. linear/log/exponential/monotonic/power/polynomial) of fraction or difference of a quantity (e.g. power/magnitude) of local max over the quantity of local min. Local max (or min) may be significant if its SNR is greater than threshold and/or if its amplitude is greater (or smaller) than another threshold. Local max/min may be selected/identified/computed using persistence-based approach. Some significant local max/min may be selected based on selection criterion (e.g. quality criterion/condition, strongest/consistent significant peak in a range). Unselected significant peaks may be stored/monitored as "reserved" peaks for use in future selection in future sliding time windows. E.g. a particular peak (e.g. at particular argument/time/frequency) may appear consistently over time. Initially, it may be significant but not selected (as other peaks may be stronger). Later, it may become stronger/dominant consistently. When selected, it may be back-traced in time and selected in earlier time to replace previously selected peaks (momentarily strong/dominant but not persistent/consistent). Consistency of peak may be measured by trace, or duration of being significant. Alternatively, local max/min may be selected based on finite state machine (FSM). Decision thresholds may be time-varying, adjusted adaptively/dynamically (e.g. based on back-tracing timing/FSM, or data distribution/statistics).

A similarity score (SS)/component SS may be computed based on two temporally adjacent CI/CIC, of one TSCI or of two different TSCI. The pair may come from same/different sliding window(s). SS or component SS may comprise: time reversal resonating strength (TRRS), auto/cross correlation/covariance, inner product of two vectors, L1/L2/Lk/Euclidean/statistical/weighted/distance score/norm/metric/quality metric, signal quality condition, statistical characteristics, discrimination score, neural network/deep learning network/machine learning/training/discrimination/weighted averaging/preprocessing/denoising/signal conditioning/filtering/time correction/timing compensation/phase offset compensation/transformation/component-wise operation/feature extraction/FSM, and/or another score.

Any threshold may be fixed (e.g. 0, 0.5, 1, 1.5, 2), pre-determined and/or adaptively/dynamically determined (e.g. by FSM, or based on time/space/location/antenna/path/link/state/battery life/remaining battery life/available resource/power/computation power/network bandwidth). Threshold may be applied to test quantity to differentiate two events/conditions/situations/states, A and B. Data (e.g. CI/TSCI/feature/similarity score/test quantity/characteristics/STI/MI) may be collected under A/B in training situation. Test quantity (e.g. its distribution) computed based on data may be compared under A/B to choose threshold based on some criteria (e.g. maximum likelihood (ML), maximum aposterior probability (MAP), discriminative training, minimum Type 1 (or 2) error for given Type 2 (or 1) error, quality criterion, signal quality condition). Threshold may be adjusted (e.g. to achieve different sensitivity), automatically/semi-automatically/manually/adaptively/dynamically, once/sometimes/often/periodically/repeatedly/occasionally/sporadically/on-demand (e.g. based on object/movement/location direction/action/characteristics/STI/MI/size/property/trait/habit/behavior/venue/feature/fixture/furniture/barrier/material/machine/living thing/thing/boundary/surface/medium/map/constraint/model/event/state/situation/condition/time/timing/duration/state/ history/u ser/preference). An iterative algorithm may stop after N iterations, after time-out period, or after test quantity satisfies a condition (e.g. updated quantity greater than threshold) which may be fixed/adaptively/dynamically adjusted.

Searching for local extremum may comprise constrained/minimization/maximization, statistical/dual/constraint/convex/global/local/combinatorial/infinite-dimensional/multi-objective/multi-modal/non-differentiable/particle-swarm/simulation-based optimization, linear/nonlinear/quadratic/higher-order regression, linear/nonlinear/stochastic/constraint/dynamic/mathematical/disjunctive/convex/semidefinite/conic/cone/interior/fractional/integer/sequential/quadratic programming, conjugate/gradient/subgradient/coordinate/reduced descent, Newton's/simplex/iterative/point/ellipsoid/quasi-Newton/interpolation/memetic/genetic/evolutionary/pattern-/gravitational-search method/algorithm, constraint satisfaction, calculus of variations, optimal control, space mapping, heuristics/meta-heuristics, numerical analysis, simultaneous perturbation stochastic approximation, stochastic tunneling, dynamic relaxation, hill climbing, simulated annealing, differential evolution, robust/line/Tabu/reactive search/optimization, curve fitting, least square, variational calculus, and/or variant. It may be associated with an objective/loss/cost/utility/fitness/energy function.

Regression may be performed using regression function to fit data, or function (e.g. ACF/transform/mapped) of data, in regression window. During iterations, length/location of regression window may be changed. Regression function may be linear/quadratic/cubic/polynomial/another function. Regression may minimize any of: mean/weighted/absolute/square deviation, error, aggregate/component/weighted/mean/sum/absolute/square/high-order/another error/cost (e.g. in projection domain/selected axes/orthogonal axes), robust error (e.g. first error (e.g. square) for smaller error magnitude, second error (e.g. absolute) for larger error magnitude), and/or weighted sum/mean of multiple errors (e.g. absolute/square error). Error associated with different links/path may have different weights (e.g. link with less noise may have higher weight). Regression parameter (e.g. time-offset associated with max/min regression error of regression function in regression window, location/width of window) may be initialized and/or updated during iterations (e.g. based on target value/range/profile, characteristics/STI/MI/test quantity, object motion/quantity/count/location/state, past/current trend, location/amount/distribution of local extremum in previous windows, carrier/subcarrier frequency/bandwidth of signal, amount of antennas associated with the channel, noise characteristics, histogram/distribution/central/F-distribution, and/or threshold). When converged, current time offset may be at center/left/right (or fixed relative location) of regression window.

In presentation, information may be displayed/presented (e.g. with venue map/environmental model). Information may comprise: current/past/corrected/approximate/map/location/speed/acceleration/zone/region/area/segmentation/coverage-area, direction/path/trace/history/traffic/summary, frequently-visited areas, customer/crowd event/distribution/behavior, crowd-control information, acceleration/speed/vital-sign/breathing/heart-rate/activity/emotion/sleep/state/rest information, motion-statistics/MI/STI, presence/absence of motion/people/pets/object/vital sign, gesture (e.g. hand/arm/foot/leg/body/head/face/mouth/eye)/meaning/control (control of devices using gesture), location-based gesture-control/motion-interpretation, identity/identifier (ID) (e.g. of object/person/user/pet/zone/region, device/ machine/vehicle/drone/car/boat/bicycle/TV/air-con/fan/, self-guided machine/device/vehicle), environment/weather information, gesture/gesture control/motion trace, earthquake/explosion/storm/rain/fire/temperature, collision/impact/vibration, event/door/window/open/close/fall-down/accident/burning/freezing/water-/wind-/air-movement event, repeated/pseudo-periodic event (e.g. running on treadmill, jumping up/down, skipping rope, somersault), and/or vehicle event. Location may be one/two/three dimensional (e.g. expressed/represented as 1D/2D/3D rectangular/polar coordinates), relative (e.g. w.r.t. map/environmental model) or relational (e.g. at/near/distance—from a point, halfway between two points, around corner, upstairs, on table top, at ceiling, on floor, on sofa).

Information (e.g. location) may be marked/displayed with some symbol. Symbol may be time-varying/flashing/pulsating with changing color/intensity/size/orientation. Symbol may be a number reflecting instantaneous quantity (e.g. analytics/gesture/state/status/action/motion/breathing/heart rate, temperature/network traffic/connectivity/remaining power). Symbol/size/orientation/color/intensity/rate/characteristics of change may reflect respective motion. Information may be in text or presented visually/verbally (e.g. using pre-recorded voice/voice synthesis)/mechanically (e.g. animated gadget, movement of movable part).

User device may comprise smart phone/tablet/speaker/camera/display/TV/gadget/vehicle/appliance/device/IoT, device with UI/GUI/voice/audio/record/capture/sensor/playback/display/animation/VR/AR (augmented reality)/voice (assistance/recognition/synthesis) capability, and/or tablet/laptop/PC.

Map/floor plan/environmental model (e.g. of home/office/building/store/warehouse/facility) may be 2-/3-/higher-dimensional. It may change/evolve over time (e.g. rotate/zoom/move/jump on screen). Walls/windows/doors/entrances/exits/forbidden areas may be marked. It may comprise multiple layers (overlays). It may comprise maintenance map/model comprising water pipes/gas pipes/wiring/cabling/air ducts/crawl-space/ceiling/underground layout.

Venue may be segmented/subdivided/zoned/grouped into multiple zones/regions/sectors/sections/territories/districts/precincts/localities/neighborhoods/areas/stretches/expance such as bedroom/living/dining/rest/storage/utility/warehouse/conference/work/walkway/kitchen/foyer/garage/first/second floor/offices/reception room/area/regions. Segments/regions/areas may be presented in map/floor plan/model with presentation characteristic (e.g. brightness/intensity/luminance/color/chrominance/texture/animation/flashing/rate).

An example of disclosed system/apparatus/method. Stephen and family want to install disclosed wireless motion detection system to detect motion in their 2000 sqft two-storey town house in Seattle, Washington. Because his house has two storeys, Stephen decides to use one Type2 device (named A) and two Type1 devices (named B and C) in ground floor. His ground floor has three rooms: kitchen, dining and living rooms arranged in straight line, with dining room in middle. He put A in dining room, and B in kitchen and C in living room, partitioning ground floor into 3 zones (dining room, living room, kitchen). When motion is detected by AB pair and/or AC pair, system would analyze TSCI/feature/characteristics/STI/MI and associate motion with one of 3 zones.

When Stephen and family go camping in holiday, he uses mobile phone app (e.g. Android phone app or iPhone app) to turn on motion detection system. If system detects motion, warning signal is sent to Stephen (e.g. SMS, email, push message to mobile phone app). If Stephen pays monthly fee (e.g. $10/month), a service company (e.g. security company) will receive warning signal through wired (e.g. broadband)/wireless (e.g. WiFi/LTE/5G) network and perform security procedure (e.g. call Stephen to verify any problem, send someone to check on house, contact police on behalf of Stephen).

Stephen loves his aging mother and cares about her well-being when she is alone in house. When mother is alone in house while rest of family is out (e.g. work/shopping/vacation), Stephen turns on motion detection system using his mobile app to ensure mother is ok. He uses mobile app to monitor mother's movement in house. When Stephen uses mobile app to see that mother is moving around house among the three regions, according to her daily routine, Stephen knows that mother is ok. Stephen is thankful that motion detection system can help him monitor mother's well-being while he is away from house.

On typical day, mother would wake up at 7 am, cook her breakfast in kitchen for 20 minutes, eat breakfast in dining room for 30 minutes. Then she would do her daily exercise in living room, before sitting down on sofa in living room to watch favorite TV show. Motion detection system enables Stephen to see timing of movement in 3 regions of house. When motion agrees with daily routine, Stephen knows roughly that mother should be doing fine. But when motion pattern appears abnormal (e.g. no motion until 10 am, or in kitchen/motionless for too long), Stephen suspects something is wrong and would call mother to check on her. Stephen may even get someone (e.g. family member/neighbor/paid personnel/friend/social worker/service provider) to check on mother.

One day Stephen feels like repositioning a device. He simply unplugs it from original AC power plug and plugs it into another AC power plug. He is happy that motion detection system is plug-and-play and the repositioning does not affect operation of system. Upon powering up, it works right away.

Sometime later, Stephen decides to install a similar setup (i.e. one Type2 and two Type1 devices) in second floor to monitor bedrooms in second floor. Once again, he finds that system set up is extremely easy as he simply needs to plug Type2 device and Type1 devices into AC power plug in second floor. No special installation is needed. He can use same mobile app to monitor motion in both ground/second floors. Each Type2 device in ground/second floors can interact with all Type1 devices in both ground/second floors. Stephen has more than double capability with combined systems.

Disclosed system can be applied in many applications. Type1/Type2 devices may be any WiFi-enabled devices (e.g. smart IoT/appliance/TV/STB/speaker/refrigerator/stove/oven/microwave/fan/heater/air-con/router/phone/computer/tablet/accessory/plug/pipe/lamp/smoke detector/furniture/fixture/shelf/cabinet/door/window/lock/sofa/table/chair/piano/utensil/wearable/watch/tag/key/ticket/belt/wallet/pen/hat/necklace/implantable/phone/eyeglasses/glass panel/gaming device) at home/office/facility, on table, at ceiling, on floor, or at wall. They may be placed in conference room to count people. They may form a well-being monitoring system to monitor daily activities of older adults and detect any sign of symptoms (e.g. dementia, Alzheimer's disease). They may be used in baby monitors to monitor vital signs (breathing) of babies. They may be placed in bedrooms to monitor sleep quality and detect any sleep apnea. They may be placed in cars to monitor well-being of passengers and drivers, detect sleepy drivers or babies left in hot cars. They may be used in logistics to prevent human trafficking by monitoring any human hidden in trucks/containers. They may be deployed by emergency service at disaster area to search for trapped victims in debris. They may be deployed in security systems to detect intruders.

Device-free indoor object detection and localization are essential for success of smart homes. Traditional vision/acoustic/radar-based approaches face operational constraints that limit their effectiveness and scalability. Most existing approaches show inadequate performance in typical residential settings, due to the limited WiFi bandwidth and the resulting low spatial resolution. One purpose of the present disclosure is to introduce a novel system using commodity WiFi that can accurately determine the specific room where the person is, i.e., room-level localization. The system employs a novel multipath selection technique to concentrate on a limited set of multipaths predominated by the proximate motions to the device. Based on the technique, a spatial feature leveraging multiple antennas to enhance the spatial resolution is disclosed for more refined detection coverage. Combining the spatial feature with time and frequency-domain features, the system outperforms state-of-art methods by more than 20% and shows its potential for real-world applications.

With the swift advancement of Internet of Things (IoT) devices, indoor intelligent applications have been spurred to improve the quality of life. These applications include smart homes, security systems, elderly care, etc. A crucial element of these applications is indoor object detection and localization aiming to identify human presence in specific areas of interest, so as to achieve better energy efficiency in smart homes, and provide location-specific context for security systems and elderly monitoring. Compared to device-based/active localization which requires users to carry a device, device-free/passive indoor object detection and localization is of greater interest, as the latter is more practical and user friendly.

Existing passive indoor object detection and localization systems are mostly vision-based, acoustic-based, infrared-based, and radar-based. However, the limitation of these methods leads to significant operational constraints that restrict their effectiveness and scalability. Vision-based methods raise privacy concerns and may fail in poor lighting conditions while acoustic methods are susceptible to ambient noise. Infrared-based methods can only work in line-of-sight (LOS) scenarios, and radar-based approaches demand specialized hardware that is typically expensive. Some WiFi-based approaches often need either labor-intensive fingerprinting, dedicated calibration, or multiple transceivers arranged in a specific geometric pattern, which are not realistic. Furthermore, these methods require LOS conditions and suffer a notable performance degradation in indoor non-LOS (NLOS) multi-room scenarios. Further, these methods often perform poorly due to broad coverage and are thus not robust in multi-room residential settings.

The present disclosure discloses a novel passive WiFi-based system capable of accurately detecting and locating a moving human across multiple rooms (room-level localization) through walls. To achieve such a system, several critical challenges will be addressed.

Firstly, it is challenging to derive reliable motion features from WiFi signals for both LOS and NLOS settings. The multipath propagation especially under NLOS complicates human detection due to weaker reflections from the human body. In addition, using all multipath components (MPCs) for localization leads to broad coverage and can reduce the accuracy of localization. To overcome the challenge, a novel multipath selection method is disclosed for key feature extraction by selecting a subset of MPCs mainly affected by proximate movements to differentiate between proximate and distant movements under both LOS and NLOS based on a rich-scattering model.

Secondly, the limited bandwidth of commodity WiFi devices leads to coarse spatial resolution making room-level localization difficult. To enhance the spatial resolution, multiple antennas are used to extract the primary paths with principal component analysis (PCA) on the concatenated channel state information (CSI) from all antennas and a useful spatial-domain feature is disclosed to effectively refine the sensing coverage.

Thirdly, systems relying on a single feature for localization are often not robust. As such, a disclosed system incorporates multidimensional features with the above spatial-domain feature and utilizes a lightweight kernel-based support vector machine (SVM) classifier to distinguish between no human presence and the specific room occupied.

CSI can characterize the transmission of radio signals through various MPCs within a certain environment. Given a pair of TX and RX, the CSI at time t and frequency f can be expressed as:

$$H(t, f) = \sum_{i=1}^{L} \alpha_i(t) e^{(\frac{-j2\pi f d_i(t)}{c})} + n(t, f), \tag{1}$$

where $\alpha_i(t)$ represents the amplitude attenuation, $d_i(t)$ is the propagation length of the $i^{th}$ path, c corresponds to the speed of light, L is the total number of MPCs, and n(t, f) denotes the additive white Gaussian noise (AWGN).

Considering the dynamic scatterers (e.g., moving individuals or objects) and static scatterers (e.g., floors, walls, furniture), Eqn. (1) can be further expressed as:

$$H(t, f) = \underbrace{\sum_{i \in \Omega_D(t)} a_i(t) e^{\frac{-j2\pi f d_i(t)}{c}}}_{dynamic\ paths} + \underbrace{\sum_{i \in \Omega_S(t)} a_i(t) e^{\frac{-j2\pi f d_i(t)}{c}}}_{static\ paths} + n(t, f) = \tag{2}$$

$$H_D(t, f) + H_S(t, f) + n(t, f),$$

where $\Omega_D(t)$ and $\Omega_S(t)$ represent the set of dynamic and static scatterers, and $H_D(t, f)$ and $H_S(t, f)$ are the contribution of the dynamic and static scatters, respectively. Within a sufficiently short time duration, the static paths can be assumed nearly constant. By mean subtraction, the time varying fluctuation of CSI, $\tilde{H}(t, f)$, can be expressed as:

$$\tilde{H}(t, f) = H_D(t, f) + n(t, f) \tag{3}$$

In WiFi systems with $N_s$ subcarriers, there are $N_s$ CSI estimates at any given t, i.e., $$\tilde{H}(t, f_i) = H_D(t, f_i) + n(t, f_i), i = 1, \ldots, N_s. \tag{4}$$

$\tilde{H}(t, f_i)$ exhibits noticeable changes over time in the presence of human movements, based on which one can derive various features for motion detection and localization.

FIG. 1 illustrates an example scenario where a motion/event/activity (e.g. fall/abrupt/impulsive/transient/impactful motion, motion that generates sound/vibration/pressure change, or target motion) is detected (or monitored) based on wireless signal or auxiliary signal or both in a venue, according to some embodiments of the present disclosure. For example, as shown in FIG. 1, the system can include a single TX/RX 101 and multiple RXs/TXs 110~160, each of which is placed in a different room or area of interest. The number of devices may depend on the total number of rooms being monitored.

In the example shown in FIG. 1, the TX/RX 101 (e.g. Origin or Type2 device) is placed in room 0, while the multiple RXs/TXs (e.g. Bots or Type1 devices) 110~160 are placed in rooms 1~6 of an apartment 100, respectively. During a motion/event/activity (e.g. a person 102 is present or moving in room 4), the Bot 140 can transmit a wireless (sounding/probe) signal to the Origin 101, which can obtain channel information of a wireless multipath channel based on the wireless signal. A motion information (MI) or radio-based MI (RMI) can be computed based on the channel information.

If an object motion/activity is detected based on wireless signals transmitted by any one of the Bots 110~160, localization may be performed such that a location of the activity/motion/event or the object (e.g. person/user) may be determined in one of the rooms. For example, if detection is based only on wireless signals transmitted by Bot 110, the location may be determined to be in the room 1. If detection is based only on wireless signals transmitted by Bot 140, the location may be determined in the room 4. If target motion/event/activity cannot be detected based on wireless signals transmitted by any Bot, then it may be determined that nobody and no object is in the apartment 100.

Figure 2:
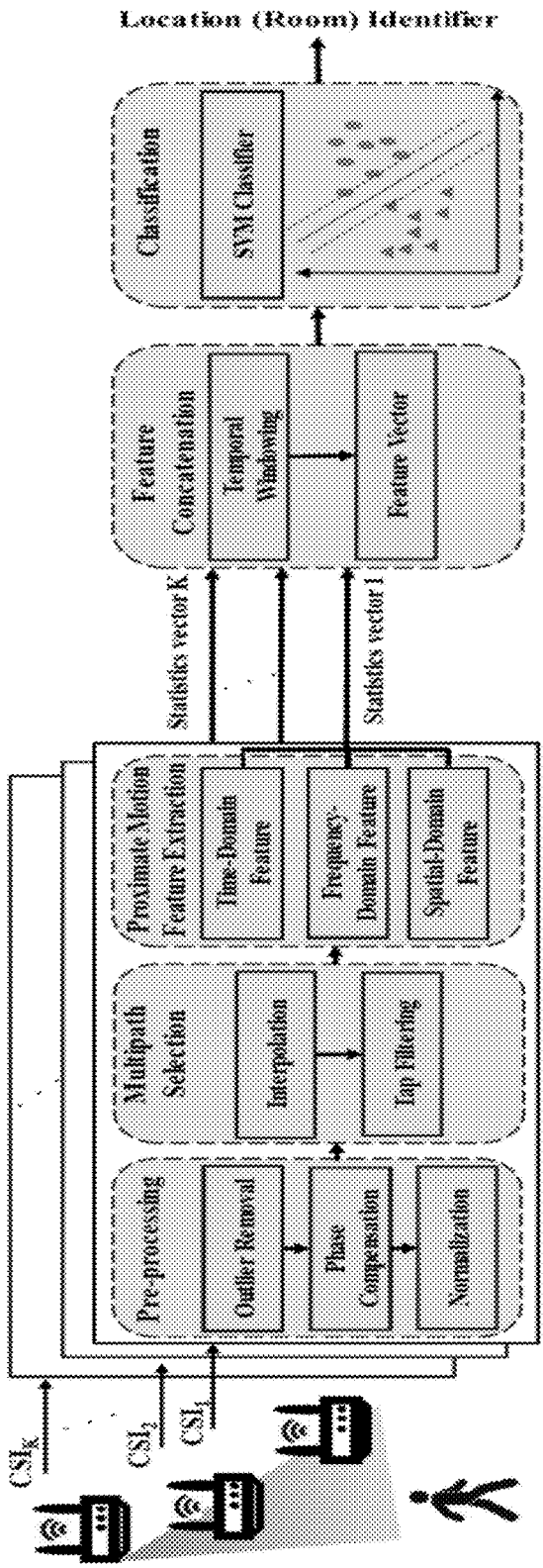
FIG. 2 illustrates an example framework of a system for wireless localization, according to some embodiments of the present disclosure.

FIG. 2 illustrates an example framework of a system 200 for wireless localization, according to some embodiments of the present disclosure. As illustrated in FIG. 2, the system 200 mainly includes the following five modules: (1) Preprocessing, where the CSI measurements of each TX-RX pair are processed to obtain the sanitized CSI through outlier removal, phase compensation, and normalization for the subsequent multipath selection; (2) Multipath Selection, where the sanitized CSI is first interpolated and then a filtering procedure is applied to narrow the detection coverage by choosing the MPCs only influenced by the human movements near the devices; (3) Proximate Motion Feature Extraction, where multidimensional motion features relevant to the moving subject across time-, frequency-, and spatial-domains are extracted; (4) Feature Concatenation, where the multidimensional features of each TX-RX pair are processed with a predetermined temporal window to eliminate temporary fluctuations, and then concatenated to form a comprehensive feature vector for the subsequent SVM classifier; and (5) Classification, where a lightweight kernel-based SVM is utilized to determine the boundaries between classes of no presence and the occupied room based on the feature vector.

In some embodiments, for Preprocessing, CSIs can be affected by noise and hardware imperfections, RX auto gain control, and asynchronous clocks, all leading to noisy measurements. To improve CSI quality, on each link, the system can first apply a median filter on each subcarrier to remove the outliers, and then utilize a linear compensation technique to remove random phase noise, followed by a normalization of the phase-aligned CSI $\tilde{H}^{(m)}(t, f_i)$ on link m over subcarriers as $$\overline{H}^{(m)}(t, f_i) = \frac{\tilde{H}^{(m)}(t, f_i)}{\sqrt{\sum_{j=1}^{N_s} \left| \tilde{H}^{(m)}(t, f_j) \right|^2}}, \tag{5}$$

where $\tilde{H}^{(m)}(t, f_i)$ is the sanitized CSI on link m at time t and frequency $f_i$.

In some embodiments, for Multipath Selection, due to the limited WiFi bandwidth, the spatial resolution of WiFi sensing is often not sufficient for high accuracy motion localization. For instance, a 80 MHz bandwidth yields a time resolution of 12.5 ns, and the corresponding spatial resolution is 3.75 m. The typical maximum excess delay, representing the maximum delay of a noticeable MPC, a.k.a. the largest path length, is usually less than 500 ns. This means only about the first 40 channel impulse response (CIR) taps contain the significant MPCs and the rest are barely relevant to localization. However, relying solely on these 40 CIR taps for proximate motion feature extraction still poses challenges in achieving precise room-level localization in typical residential environments, because only a limited subset of these taps contains significant MPCs affected by proximate motion and the remaining taps usually contain MPCs affected by multiple reflections throughout the entire house. To further refine detection coverage, the system may focus on a subset of the MPCs to capture more localized reflections/scattering only affected by motion close to a device (TX/RX) to improve the localization accuracy. One example multipath selection method is detailed as follows.

First, the system can employ interpolation techniques on the channel frequency response (CFR) and take $N_s$-point inverse fast Fourier transform (IFFT) to reconstruct the CIR to increase the detection precision. This is because not all subcarriers are accessible due to implementation constraints in WiFi systems.

Second, for each snapshot at t, the system may determine the index $\tau_0$ of the dominant tap (i.e., the tap with the highest energy). The system may apply a truncated window $N_c$ to limit the range of CIR taps so as to confine the area of interest, where $N_c$ can be experimentally chosen. To be specific, the truncated CIR can be written as $$h_{trun}^{(m)}(t; v) = \begin{cases} h^{(m)}(t; v), & v \in [\tau_0, \tau_0 + N_c] \\ 0, & o.w., \end{cases} \tag{6}$$

where $$h^{(m)}(t; v) = \frac{1}{N_s} \sum_{i=0}^{N_s-1} \overline{H}^{(m)}(t, f_i) e^{j\frac{2\pi}{N_s} iv},$$

representing the CIR computed by taking the $N_s$-point IFFT of CFR and $v = 1 \sim N_s$.

Then, the system may convert the truncated CIR back to the frequency domain using $N_s$-point FFT to obtain the smoothed CSI, denoted as $$\overline{H}_c^{(m)}(t, f_i),$$

where $i = 1, \ldots, N_s$.

Figure 3A:
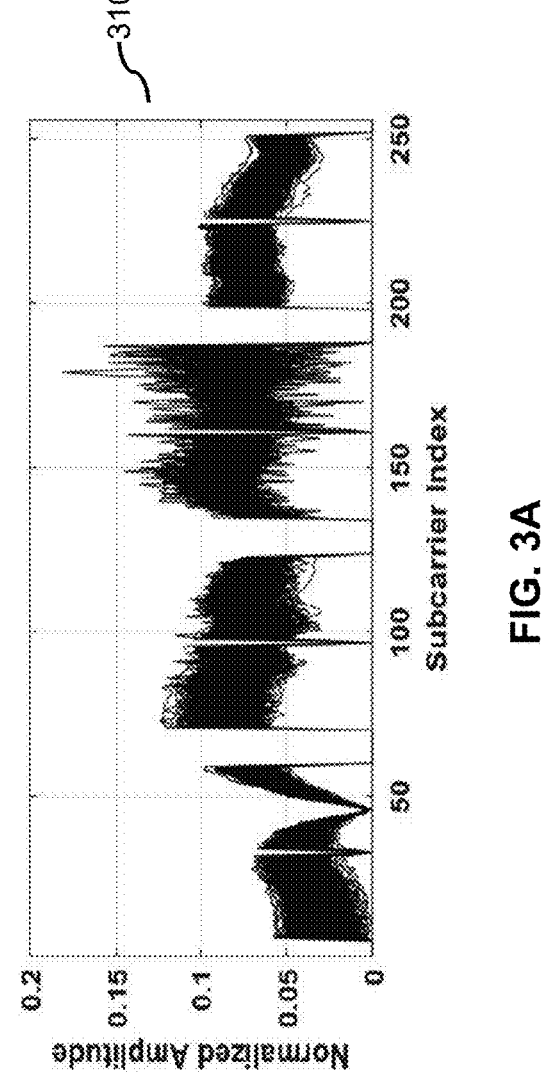
FIG. 3A and FIG. 3B illustrate an example multipath selection filtering, according to some embodiments of the present disclosure.
Figure 3B:
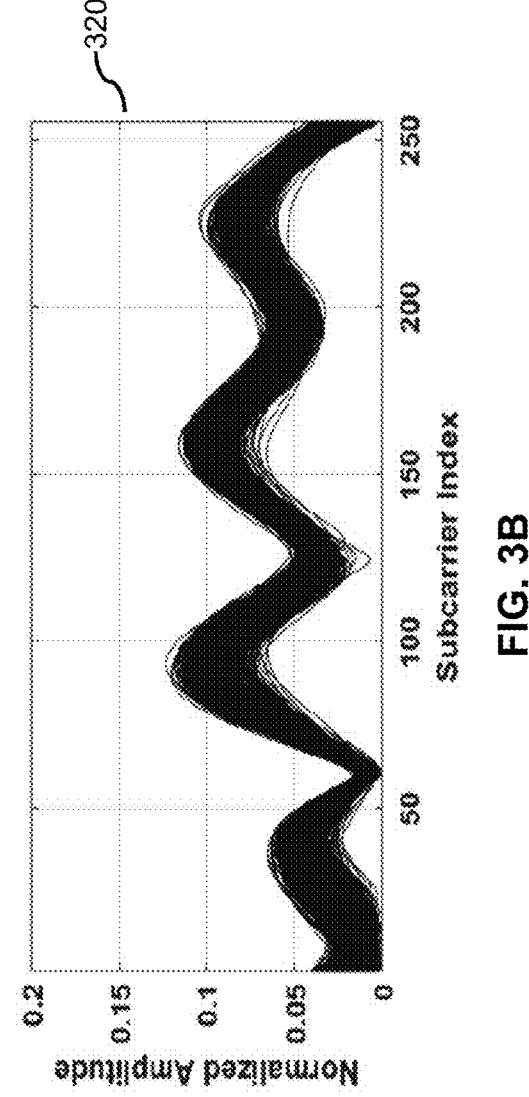

FIG. 3A and FIG. 3B illustrate an example multipath selection filtering, according to some embodiments of the present disclosure. In this example, an original CSI 310 obtained from 80 MHz WiFi packets is shown in FIG. 3A; and a corresponding filtered CSI 320 after applying the multipath selection is shown in FIG. 3B. In some embodiments, the filtering process interpolates amplitudes in the guard interval and effectively reduces fluctuations in the CSI amplitudes caused by the MPCs which experience multiple reflections throughout the house.

In some embodiments, for Proximate Motion Feature Extraction, the system may use the statistical multidimensional features of the CSI from time-, frequency-, and spatial-domains (TD/FD/SD) for each TX-RX pair.

In some embodiments, to quantify the intensity of proximate motion in a certain environment, one can define a motion statistics that is environment-independent using the filtered $$CSI|\overline{H}_c^{(m)}(t, f_i)|.$$

Denote $$\rho_i^{(m)}(\tau)$$

as the motion statistics for the subcarrier with frequency $f_i$ on link m, it can be calculated as the autocorrelation function (ACF) of CSI power response evaluated at a time lag of $\tau=1/F_s$, with $F_s$ being the sounding rate, as $$\rho_i^{(m)}(\tau)\Big|_{\tau=\frac{1}{F_s}} = \frac{\text{cov}\{|\overline{H}_c^{(m)}(t, f_i)|, |\overline{H}_c^{(m)}(t+\tau, f_i)|\}}{\text{cov}\{|\overline{H}_c^{(m)}(t, f_i)|, |\overline{H}_c^{(m)}(t, f_i)|\}}\Bigg|_{\tau=\frac{1}{F_s}}, \quad (7)$$

where COV is the covariance operator. When no motion is present, $$\rho_i^{(m)}(1/F_s) \approx 0 \text{ while } \rho_i^{(m)}(1/F_s) > 0$$

if there is motion.

In some examples, one can define the TD feature, $\xi$, as the averaged motion statistics over all subcarriers and links, i.e., $$\xi = E[\rho_i^{(m)}(1/F_s)] \approx \frac{\sum_{m=1}^{N_tN_r}\sum_{i=1}^{N_s}\rho_i^{(m)}(1/F_s)}{N_tN_rN_s}, \quad (8)$$

where E is the expectation operator, and $N_t$ and $N_r$ are the number of TX and RX antennas, respectively.

In some examples, an experiment can be conducted to demonstrate how the multipath selection technique affects the TD feature and its ability to detect motions near the device (TX/RX). An experiment setup can show the TD features captured as a tester walks within an area at different distances from a single pair of WiFi devices in an open area. During the test, the tester walks in the way for two minutes in each of Areas #1 to #6, with Areas #1 and #2 designated as the detection zones of interest. The test shows a clear drop in $\xi$ as the movement is farther away from the devices, while using all multipaths keeps $\xi$ high, illustrating the effectiveness of the TD feature with multipath selection in distinguishing proximate motions.

In some embodiments, besides the TD feature, one can also employ a proximate motion metric in frequency dimension, which is based on the correlation of CSI amplitudes over subcarriers. The insight is that correlation between neighboring subcarriers is high when movement is near the device, but it drops to nearly zero when the movement is distant. This is because when the motion is near the device, the human body primarily causes significant disturbances in signal propagation across subcarriers. These disturbances manifest as consistent fluctuations in CSI amplitudes among neighboring subcarriers, resulting in high correlation between them, especially the adjacent subcarriers. Conversely, the movement farther away from the device induces fluctuations not only from the human body but also multiple environmental reflections. This may lead to more varied fluctuations in the CSI amplitude and thus lower correlation across subcarriers. This effect can be shown as a correlation matrix of the CSI amplitudes when a person moves at different distances from the device. When the person moves near the device, the correlation of CSI amplitudes among neighboring subcarriers becomes more pronounced, particularly those that are near-diagonal. In contrast, the correlation among neighboring subcarriers is nearly zero when the person moves far from the device. Inspired by this, the system may define the FD feature, $\kappa$, as the mean correlation coefficient of CSI amplitudes across adjacent subcarrier over antenna pairs as $$\kappa = E[r^{(m)}(f_i, f_{i+1})] = \frac{\sum_{m=1}^{N_tN_r}\sum_{i=1}^{N_s-1}r^{(m)}(f_i, f_{i+1})}{N_tN_r(N_s-1)}, \quad (9)$$

where $r^{(m)}(f_i, f_{i+1})$ is the correlation coefficient between the CSI amplitudes of adjacent subcarriers on link m.

In some embodiments, TD and FD features are not sufficient to provide satisfactory performance for residential environments due to the limited spatial resolution. The system may utilize the multiple antennas to enhance the spatial resolution by employing PCA on the concatenated CSI. By stacking the CSI amplitudes from all the subcarriers over all the antenna pairs, drawing inspiration from super-resolution techniques, this approach enhances resolution of the time of arrival and path difference, which is observable in the primary PCA components. These components can more accurately characterize the initial reflections from the human body and are less influenced by distant movements because those primary components have shorter paths and are thus mainly influenced by human motions near the device. In some examples, one can define the SD feature as the moving variance of the first PCA component within a certain sliding window.

Figure 4A:
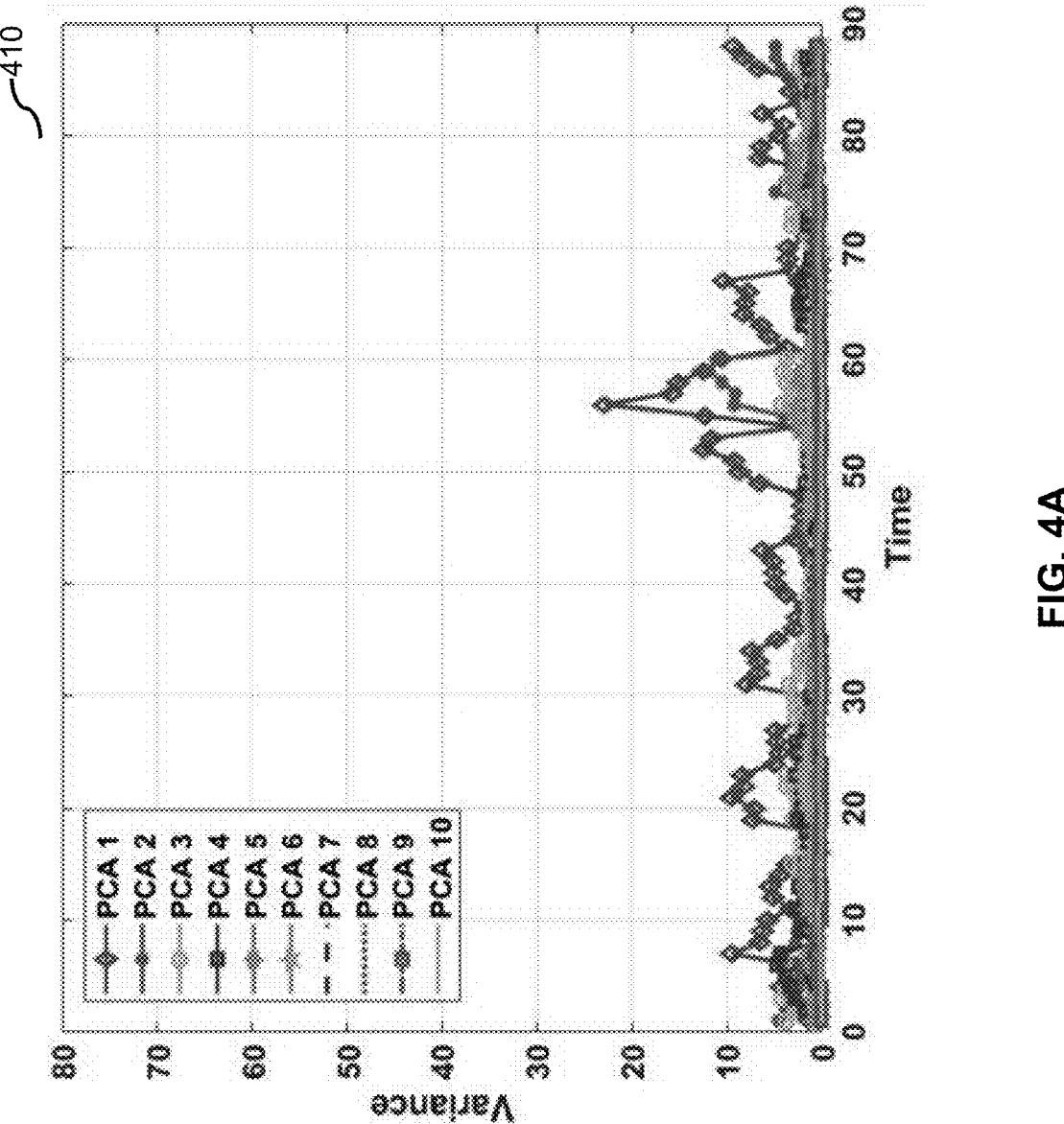
FIG. 4A and FIG. 4B illustrate example performances of moving variances of PCA components over CSI packets, according to some embodiments of the present disclosure.
Figure 4B:
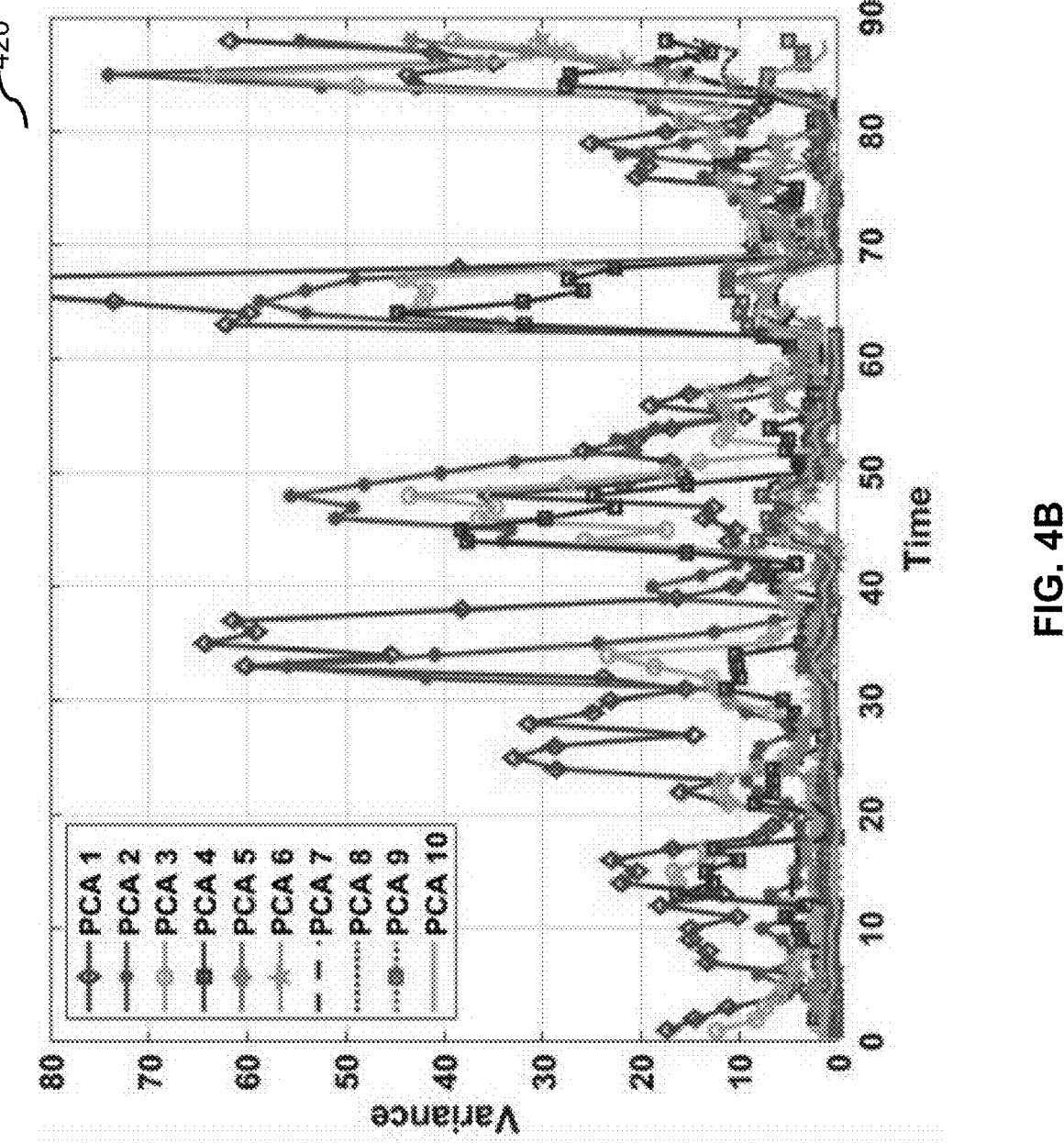

FIG. 4A and FIG. 4B illustrate example performances of moving variances of PCA components over CSI packets, according to some embodiments of the present disclosure. FIG. 4A shows the moving variance of the first 10 PCA components across CSI packets for stationary case 410, while FIG. 4B shows the moving variance of the first 10 PCA components across CSI packets for human motion case 420. One can see much more substantial fluctuations for the human motion case 420 compared to the stationary case 410.

In some embodiments, for Feature Concatenation, the system may first apply a temporal windowing on the above features to mitigate the temporal fluctuations. The features from each pair are then concatenated to form a single comprehensive feature vector for the classifier. Specifically, for a setup with K TXs, the feature vector consists of 3K features, i.e., $$v = [\xi_1, \kappa_1, SV_1, \ldots, \xi_i, \kappa_i, SV_i, \ldots, \xi_K, \kappa_K, SV_K], \qquad (10)$$

where the subscript denotes the pair index, and SV denote the SD feature.

In some embodiments, Classification is performed because it is challenging to select a suitable set of feature thresholds for presence detection and localization, due to different room sizes and room separation. Therefore, the system can utilize kernel-based SVM, a lightweight classification model, to automatically "determine" the boundary of each room with the comprehensive feature vector obtained above. The classes include empty for no human presence and specific rooms where presence is detected. The SVM model may be trained with various kernels, where the optimal model was determined through an exhaustive grid search with 5-fold cross-validation. Once the SVM model is trained, it will be fixed without any further parameter tuning or re-training, according to one embodiment.

Figure 5:
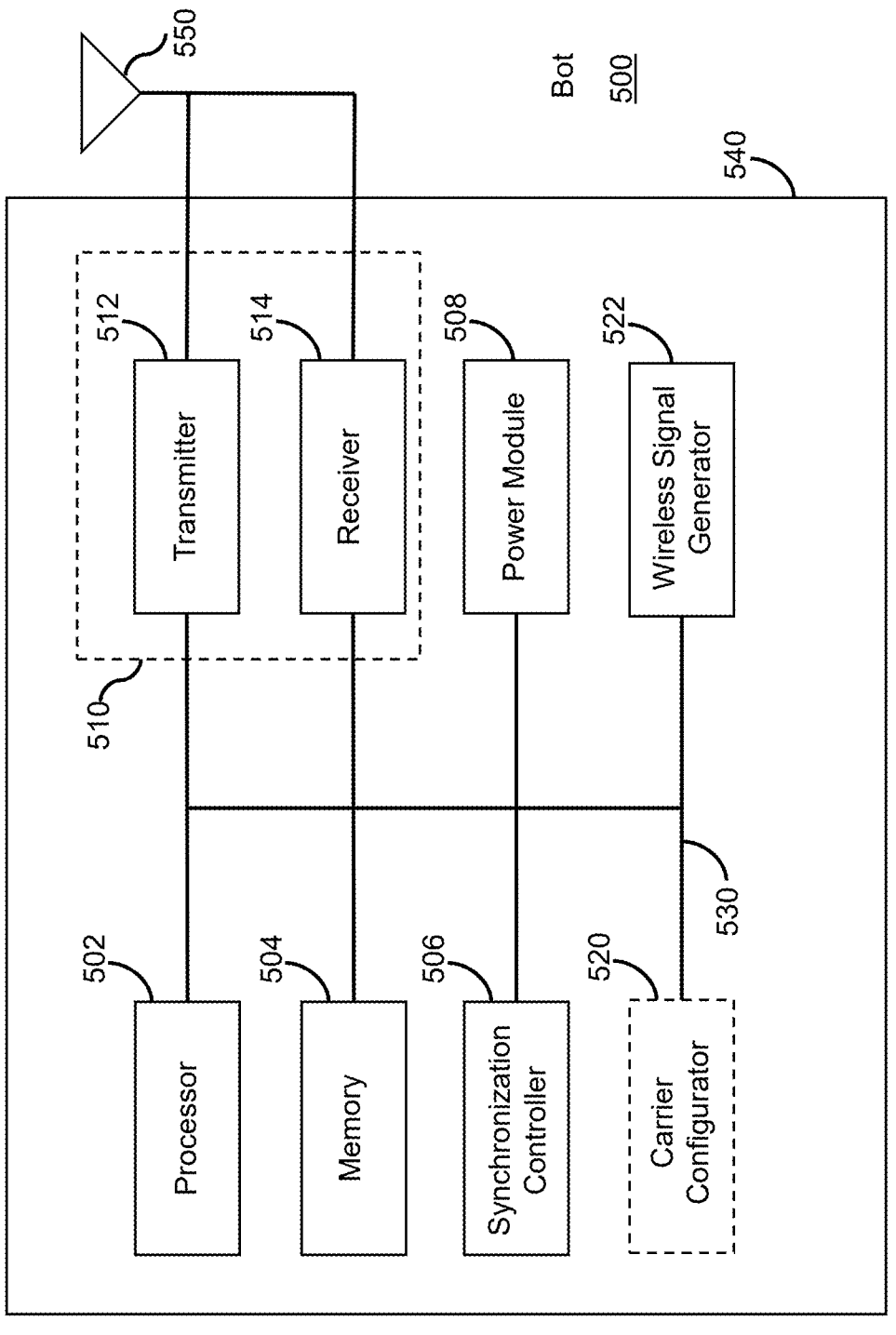
FIG. 5 illustrates an example block diagram of a first wireless device of a system for wireless sensing, according to some embodiments of the present disclosure.

FIG. 5 illustrates an example block diagram of a first wireless device, e.g. a Bot 500, of a wireless sensing system, according to one embodiment of the present teaching. The Bot 500 is an example of a device that can be configured to implement the various methods described herein. As shown in FIG. 5, the Bot 500 includes a housing 540 containing a processor 502, a memory 504, a transceiver 510 comprising a transmitter 512 and receiver 514, a synchronization controller 506, a power module 508, an optional carrier configurator 520 and a wireless signal generator 522.

In this embodiment, the processor 502 controls the general operation of the Bot 500 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 504, which can include both read-only memory (ROM) and random access memory (RAM), can provide instructions and data to the processor 502. A portion of the memory 504 can also include non-volatile random access memory (NVRAM). The processor 502 typically performs logical and arithmetic operations based on program instructions stored within the memory 504. The instructions (a.k.a., software) stored in the memory 504 can be executed by the processor 502 to perform the methods described herein. The processor 502 and the memory 504 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 510, which includes the transmitter 512 and receiver 514, allows the Bot 500 to transmit and receive data to and from a remote device (e.g., an Origin or another Bot). An antenna 550 is typically attached to the housing 540 and electrically coupled to the transceiver 510. In various embodiments, the Bot 500 includes (not shown) multiple transmitters, multiple receivers, and multiple transceivers. In one embodiment, the antenna 550 is replaced with a multi-antenna array 550 that can form a plurality of beams each of which points in a distinct direction. The transmitter 512 can be configured to wirelessly transmit signals having different types or functions, such signals being generated by the processor 502. Similarly, the receiver 514 is configured to receive wireless signals having different types or functions, and the processor 502 is configured to process signals of a plurality of different types.

The Bot 500 in this example may serve as any of the Bots 110~160 in FIG. 1 for detecting object motion in a venue. For example, the wireless signal generator 522 may generate and transmit, via the transmitter 512, a wireless signal through a wireless multipath channel impacted by a motion of an object in the venue. The wireless signal carries information of the channel. Because the channel was impacted by the motion, the channel information includes motion information that can represent the motion of the object. As such, the motion can be indicated and detected based on the wireless signal. The generation of the wireless signal at the wireless signal generator 522 may be based on a request for motion detection from another device, e.g. an Origin, or based on a system pre-configuration. That is, the Bot 500 may or may not know that the wireless signal transmitted will be used to detect motion.

The synchronization controller 506 in this example may be configured to control the operations of the Bot 500 to be synchronized or un-synchronized with another device, e.g. an Origin or another Bot. In one embodiment, the synchronization controller 506 may control the Bot 500 to be synchronized with an Origin that receives the wireless signal transmitted by the Bot 500. In another embodiment, the synchronization controller 506 may control the Bot 500 to transmit the wireless signal asynchronously with other Bots. In another embodiment, each of the Bot 500 and other Bots may transmit the wireless signals individually and asynchronously.

The carrier configurator 520 is an optional component in Bot 500 to configure transmission resources, e.g. time and carrier, for transmitting the wireless signal generated by the wireless signal generator 522. In one embodiment, each CI of the time series of CI has one or more components each corresponding to a carrier or sub-carrier of the transmission of the wireless signal. The detection of the motion may be based on motion detections on any one or any combination of the components.

The power module 508 can include a power source such as one or more batteries, and a power regulator, to provide regulated power to each of the above-described modules in FIG. 5. In some embodiments, if the Bot 500 is coupled to a dedicated external power source (e.g., a wall electrical outlet), the power module 508 can include a transformer and a power regulator.

The various modules discussed above are coupled together by a bus system 530. The bus system 530 can include a data bus and, for example, a power bus, a control signal bus, and/or a status signal bus in addition to the data bus. It is understood that the modules of the Bot 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 502 can implement not only the functionality described above with respect to the processor 502, but also implement the functionality described above with respect to the wireless signal generator 522. Conversely, each of the modules illustrated in FIG. 5 can be implemented using a plurality of separate components or elements.

Figure 6:
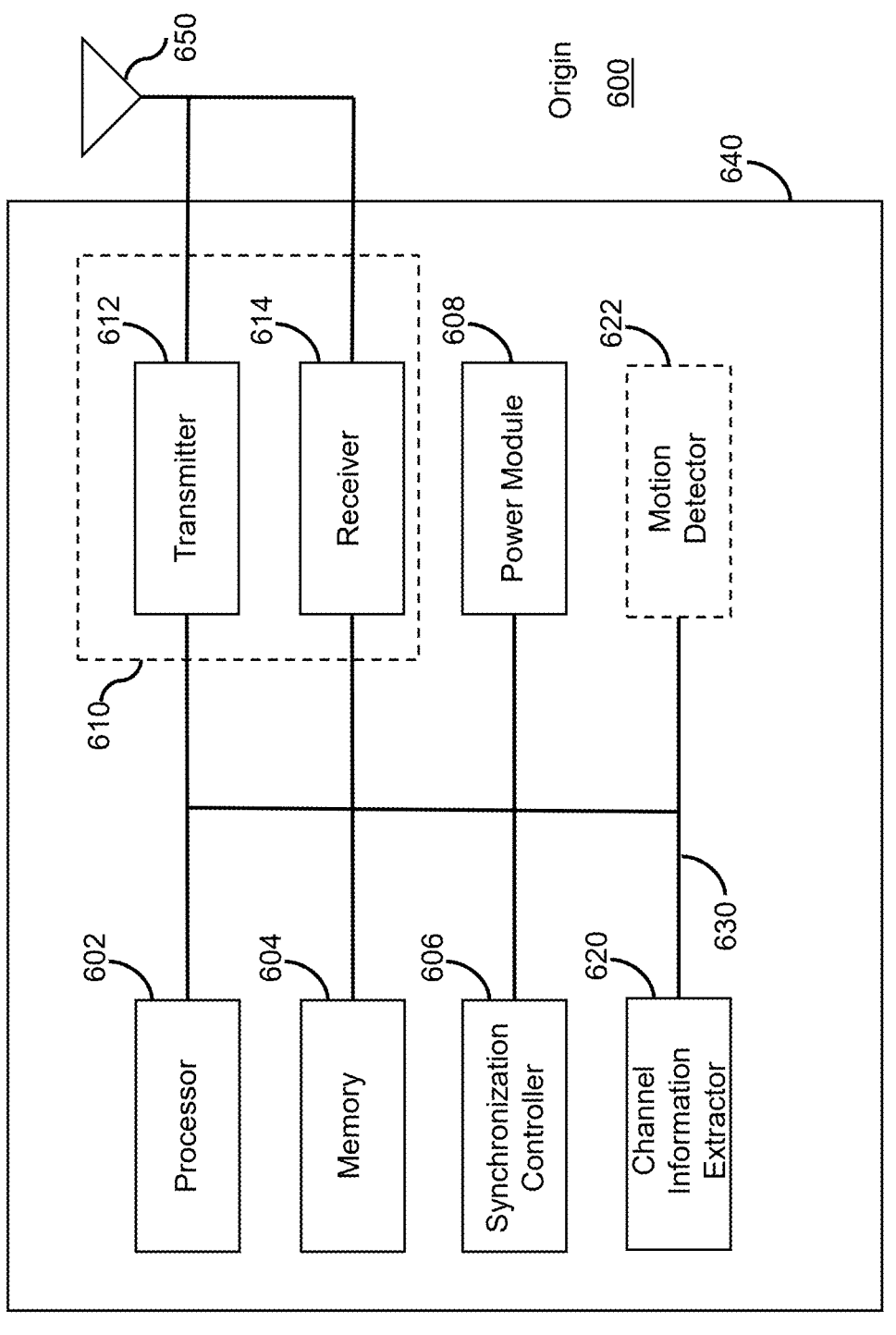
FIG. 6 illustrates an example block diagram of a second wireless device of a system for wireless sensing, according to some embodiments of the present disclosure.

FIG. 6 illustrates an example block diagram of a second wireless device, e.g. an Origin 600, of a wireless sensing system, according to one embodiment of the present teaching. The Origin 600 is an example of a device that can be configured to implement the various methods described herein. The Origin 600 in this example may serve as Origin 101 in FIG. 1 for detecting object motion in a venue. As shown in FIG. 6, the Origin 600 includes a housing 640 containing a processor 602, a memory 604, a transceiver 610 comprising a transmitter 612 and a receiver 614, a power module 608, a synchronization controller 606, a channel information extractor 620, and an optional motion detector 622.

In this embodiment, the processor 602, the memory 604, the transceiver 610 and the power module 608 work similarly to the processor 502, the memory 504, the transceiver 510 and the power module 508 in the Bot 500. An antenna 650 or a multi-antenna array 650 is typically attached to the housing 640 and electrically coupled to the transceiver 610.

The Origin 600 may be a second wireless device that has a different type from that of the first wireless device (e.g. the Bot 500). In particular, the channel information extractor 620 in the Origin 600 is configured for receiving the wireless signal through the wireless multipath channel impacted by the motion of the object in the venue, and obtaining a time series of channel information (CI) of the wireless multipath channel based on the wireless signal. The channel information extractor 620 may send the extracted CI to the optional motion detector 622 or to a motion detector outside the Origin 600 for detecting object motion in the venue.

The motion detector 622 is an optional component in the Origin 600. In one embodiment, it is within the Origin 600 as shown in FIG. 6. In another embodiment, it is outside the Origin 600 and in another device, which may be a Bot, another Origin, a cloud server, a fog server, a local server, and an edge server. The optional motion detector 622 may be configured for detecting the motion of the object in the venue based on motion information related to the motion of the object. The motion information associated with the first and second wireless devices is computed based on the time series of CI by the motion detector 622 or another motion detector outside the Origin 600.

The synchronization controller 606 in this example may be configured to control the operations of the Origin 600 to be synchronized or un-synchronized with another device, e.g. a Bot, another Origin, or an independent motion detector. In one embodiment, the synchronization controller 606 may control the Origin 600 to be synchronized with a Bot that transmits a wireless signal. In another embodiment, the synchronization controller 606 may control the Origin 600 to receive the wireless signal asynchronously with other Origins. In another embodiment, each of the Origin 600 and other Origins may receive the wireless signals individually and asynchronously. In one embodiment, the optional motion detector 622 or a motion detector outside the Origin 600 is configured for asynchronously computing respective heterogeneous motion information related to the motion of the object based on the respective time series of CI.

The various modules discussed above are coupled together by a bus system 630. The bus system 630 can include a data bus and, for example, a power bus, a control signal bus, and/or a status signal bus in addition to the data bus. It is understood that the modules of the Origin 600 can be operatively coupled to one another using any suitable techniques and mediums.

Although a number of separate modules or components are illustrated in FIG. 6, persons of ordinary skill in the art will understand that one or more of the modules can be combined or commonly implemented. For example, the processor 602 can implement not only the functionality described above with respect to the processor 602, but also implement the functionality described above with respect to the channel information extractor 620. Conversely, each of the modules illustrated in FIG. 6 can be implemented using a plurality of separate components or elements.

In one embodiment, in addition to the Bot 500 and the Origin 600, the system may also comprise: an assistance device, a third wireless device, e.g. another Bot, configured for transmitting an additional heterogeneous wireless signal through an additional wireless multipath channel impacted by the motion of the object in the venue, or a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 622 or a motion detector outside the Origin 600 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

In some embodiments, the present teaching discloses systems and methods for wireless sensing with transformed component selection.

Figure 7:
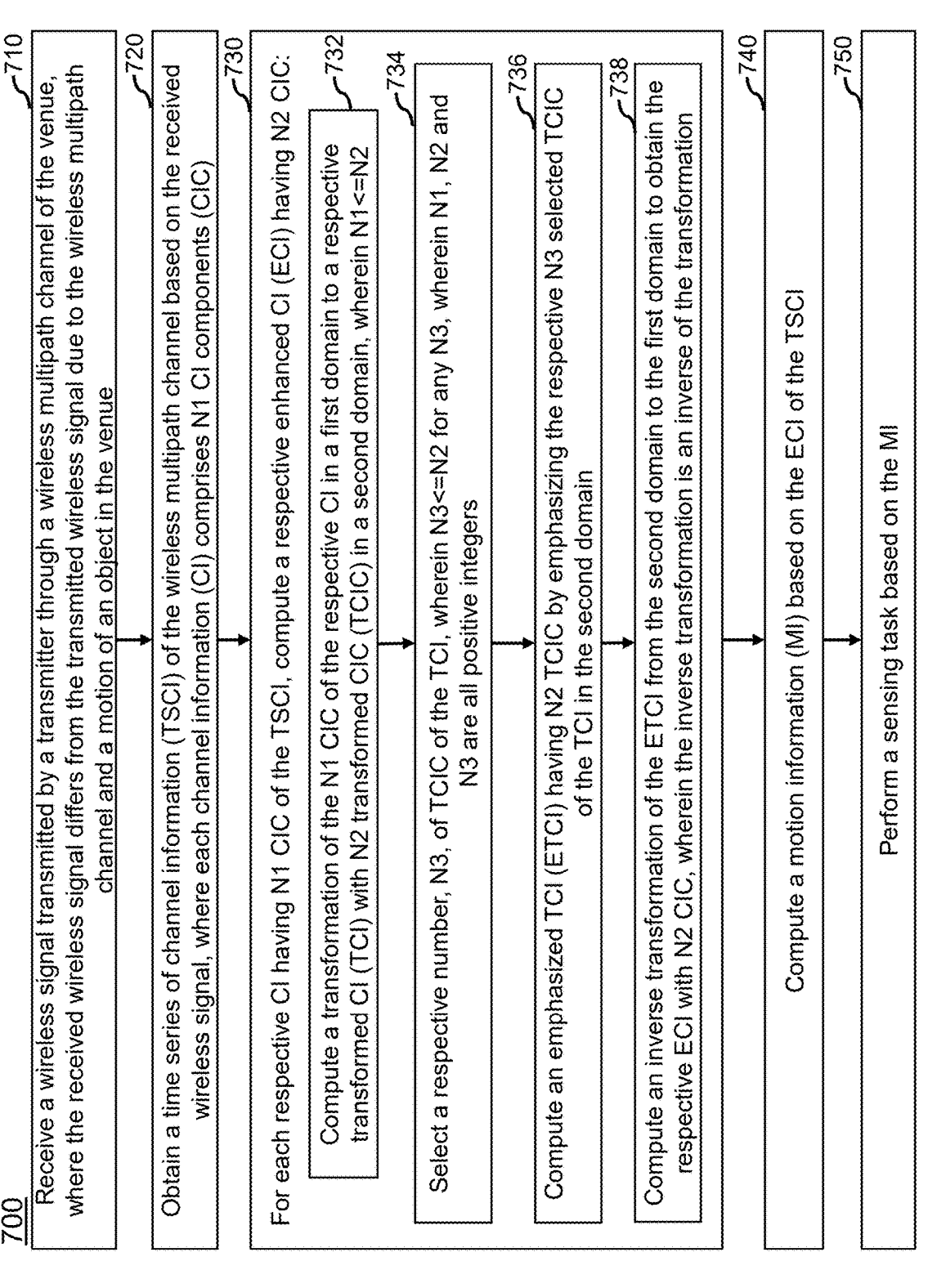
FIG. 7 illustrates a flow chart of an example method for performing wireless sensing with transformed component selection, according to some embodiments of the present disclosure.

FIG. 7 illustrates a flow chart of an example method 700 for performing wireless sensing with transformed component selection, according to some embodiments of the present disclosure. In various embodiments, the method 700 can be performed by the systems disclosed above. At operation 710, a wireless signal transmitted by a transmitter is received through a wireless multipath channel of the venue. The received wireless signal differs from the transmitted wireless signal due to the wireless multipath channel and a motion of an object in the venue. At operation 720, a time series of channel information (TSCI) of the wireless multipath channel is obtained based on the received wireless signal, where each channel information (CI) comprises N1 CI components (CIC).

The operation 730 in this example includes multiple sub-operations 732~738 to compute a respective enhanced CI (ECI) having N2 CIC for each respective CI having N1

CIC of the TSCI. At sub-operation 732, a transformation of the N1 CIC of the respective CI in a first domain to a respective transformed CI (TCI) with N2 transformed CIC (TCIC) in a second domain is computed, wherein N1<=N2. A respective number, N3, of TCIC of the TCI is selected at sub-operation 734, wherein N3<=N2 for any N3, wherein N1, N2 and N3 are all positive integers. At sub-operation 736, an emphasized TCI (ETCI) having N2 TCIC is computed by emphasizing the respective N3 selected TCIC of the TCI in the second domain. An inverse transformation of the ETCI from the second domain to the first domain is computed at sub-operation 738 to obtain the respective ECI with N2 CIC. The inverse transformation is an inverse of the transformation. At operation 740, a motion information (MI) is computed based on the ECI of the TSCI. At operation 750, a sensing task is performed based on the MI.

FIG. 8 illustrates a flow chart of an example method 800 for transforming N1-component CI to N2-component TCI, according to some embodiments of the present disclosure. In various embodiments, the method 800 can be performed by the systems disclosed above. The operation 810 in this example includes multiple sub-operations 812~816 to construct a temporary vector with N2 components based on the CI. At sub-operation 812, N1 of the N2 components of the temporary vector are aligned with the N1 CIC of the CI. At sub-operation 814, the N1 aligned components of the temporary vector are constructed by copying each of the N1 aligned components of the temporary vector from respective aligned CIC of the CI. At sub-operation 816, values are generated for the remaining N2-N1 components of the temporary vector. At operation 820, the N2 TCIC of the TCI in the second domain are computed by performing a transformation on the N2 components of the temporary vector.

FIG. 9 illustrates a flow chart of an example method 900 for selecting N3 TCIC from N2 components of TCI, according to some embodiments of the present disclosure. In various embodiments, the method 900 can be performed by the systems disclosed above. At operation 910, a respective particular TCIC of the respective CI with dominant characteristics is identified among the multiple TCIC of the respective CI. At operation 920, a search is performed for the respective particular TCIC of the respective CI among the TCIC of the respective CI within a search range of TCIC indices. The search range of TCIC indices may comprise a neighborhood around another TCIC index associated with an additional particular TCIC, if the additional particular TCIC is available. At operation 930, the respective number of selected TCIC for the respective CI is selected as a number of neighboring TCIC of the respective particular TCIC.

FIG. 10 illustrates a flow chart of an example method 1000 for emphasizing N3 selected TCIC and deemphasizing N2-N3 un-selected TCIC, according to some embodiments of the present disclosure. In various embodiments, the method 1000 can be performed by the systems disclosed above. At operation 1010, each of the respective N3 selected TCIC of the TCI in the second domain is emphasized by scaling with a respective scaling factor greater than or equal to one, or adding a respective non-negative offset. At operation 1020, each of the respective remaining N2-N3 un-selected TCIC of the TCI in the second domain is de-emphasized by scaling with a respective scaling factor less than or equal to one, or adding a respective non-positive offset.

FIG. 11A and FIG. 11B illustrate a flow chart of an example method 1100 for computing task results using enhanced CI, according to some embodiments of the present disclosure. In various embodiments, the method 1100 can be performed by the systems disclosed above. The operation 1101 in this example includes multiple sub-operations 1110~1150 for each pair of a respective transmitter and a respective receiver, where the respective receiver is configured to perform the sub-operations 1110~1150. At sub-operation 1110, a respective wireless signal transmitted by the respective transmitter is received through the wireless multipath channel of the venue. The respective received wireless signal differs from the respective transmitted wireless signal due to the wireless multipath channel and the motion of the object in the venue. At sub-operation 1120, a respective number of TSCI of the wireless multipath channel is obtained based on the respective received wireless signal. Each CI of all of the respective number of TSCI comprises a respective number, N1, of CI components (CIC). At sub-operation 1130, a respective N2-component enhanced CI is computed for each CI of any of the respective number of TSCI. At sub-operation 1140, a respective individual MI is computed based on the respective N2-component enhanced CI of each of the respective number of TSCI. At sub-operation 1150, a combined MI is computed based on the respective number of individual MI and the respective N2-component enhanced CI of each of the respective number of TSCI.

The sub-operation 1130 in this example includes multiple steps 1132~1138. At step 1132, a transformation of the N1 CIC of the respective CI to a respective transformed CI (TCI) with a respective number, N2, of TCI components (TCIC) is computed. At step 1134, a respective number, N3, of TCIC of the TCI are selected. At step 1136, the respective N3 selected TCIC of the TCI are emphasized. At step 1138, an inverse transformation of the N2 TCIC of the TCI is computed to obtain the respective N2-component enhanced CI.

At operation 1102, a joint MI is computed based on all of the combined MI. At operation 1104, the sensing task is performed based on the joint MI, the number of combined MI, and any individual MI. At operation 1106, a location associated with the object and the motion of the object are computed based on any of: any TSCI, enhanced CI of any TSCI, the joint MI, the number of combined MI and any individual MI. The location is computed based on any of: support vector machine (SVM), kernel-based SVM, neural network (NN), deep neural network (DN), convolutional NN (CNN), recurrent NN (RNN), long short-term memory network (LSTM), deep belief network (DBN), denoising auto-encoder (DAE), generative adversarial network (GAN), transformer, neural radiance field, radial basis function network, multilayer perceptron (MLP), or self organizing map (SOM).

FIG. 12 illustrates a flow chart of an example method 1200 for computing task results based on multiple domain-based analytics, according to some embodiments of the present disclosure. In various embodiments, the method 1200 can be performed by the systems disclosed above. At operation 1210, multiple analytics are computed based on the enhanced CI of any TSCI. In this example, the multiple analytics comprise at least one of: a time-domain analytics 1212 computed based on a temporal correlation between a CIC of a first enhanced CI at a first time and a corresponding CIC of a second enhanced CI at a second time, a component-domain analytics 1214 computed based on a component-wise correlation between a first CIC associated with a first CIC index of a common enhanced CI and a second CIC associated with a second CIC index of the common enhanced CI, a transformed-component-domain analytics

1216 computed based on a component-wise correlation between a first TCIC of an enhanced CI associated with a first TCIC index and a second TCIC of the enhanced CI associated with a second TCIC index, and a spatial-domain analytics 1218 computed based on a variational characteristics associated with spatial diversity between the transmitter and the receiver. At operation 1210, the location is computed based on the multiple analytics.

FIG. 13 illustrates a flow chart of an example method 1300 for constructing a spatially-diverse vector to generate spatial-domain analytics, according to some embodiments of the present disclosure. In various embodiments, the method 1300 can be performed by the systems disclosed above. At operation 1310, more than one TSCI of the wireless multipath channel is obtained based on the received wireless signal. Each TSCI associated with a respective spatial diversity is associated with a respective antenna link between the transmitter and the receiver. At operation 1320, a spatially-diverse vector is computed by concatenating respective N2 CIC of multiple contemporaneous enhanced CI of the more than one TSCI. At operation 1330, the spatially-diverse vector is processed by one of: principal component analysis (PCA), eigen-decomposition, singular value decomposition (SVD), or independent component analysis (ICA). At operation 1340, a significant vector and an associated characteristic value are computed based on the processing. At operation 1350, the spatial-domain analytics is computed by computing variational characteristics of the significant vector or the characteristic value. The variational characteristics comprise at least one of: variance, standard deviation, dispersion, divergence, absolute deviation, range, total variation, total deviation, spread, entropy, regularity measure, or variance-to-mean ratio.

In some embodiments, the disclosed system can be evaluated using off-the-shelf WiFi devices employing a WiFi module at carrier frequency 5.21 GHz with a sounding rate of 30 Hz and a bandwidth of 80 MHz with 256 subcarriers. The TXs are each equipped with a single omnidirectional antenna, and paired with the RX which has four omnidirectional antennas. The experiments may be conducted in two unique indoor environments of compact single family houses, with different room sizes. This contrasts with most existing studies, which often rely on idealized settings featuring large separations between rooms and consistent room dimensions.

In some embodiments, two scenarios are used for evaluation. Scenario I is a single-family house divided into 5 zones, while Scenario II includes 7 zones. In each scenario, one TX is deployed in every zone while the RX is placed at a typical location of an access point. For scenario II, two settings are evaluated regarding the overlapping sensing coverage of the pairs: with less overlapping coverage and with more substantial overlap. The devices were positioned at heights ranging from 0.3 meters to 1 meter.

In some examples, one may collect data in two cases: (1) no human presence, and (2) an individual moving around within each room, over a period of a month with 4 volunteers. During each data collection session, a participant was instructed to walk at his/her normal pace within each room. For each topology, one can accumulate about 55 minutes of data per room per participant and around 60 minutes of empty case. The data may be segmented into 5-second instances, yielding roughly 660 instances with walking motion for each room per person and 720 instances for the empty case. The amount of data for each room is approximately equal to ensure a fair evaluation.

In some embodiments, one can use the following metrics for the performance evaluation: Accuracy that represents the overall correctness of the model predicting the presence of a human in the correct room; True positive rate (TPR) that denotes the likelihood that the presence of a moving human is accurately identified in the specified room; and Positive predictive value (PPV) that indicates the likelihood that a moving human identified in a specified room is actually in that room.

As such, the disclosed system can be tested with off-the-shelf WiFi devices in various indoor settings, including single-family houses with different floor plans. The evaluation results show that the disclosed method outperforms other state-of-the-art methods by more than 20%.

In some embodiments, the system can utilize respiration detection as an indicator of a static person. For example, the system can compare the strength of the breathing pattern captured by the devices to infer the room where the static person is located. The system can also explore the selection of subcarriers that are sensitive to subtle CSI changes caused by a static person for the feature extraction.

A multi-person localization is a practical use case in real-life scenarios but poses significant challenges due to limited WiFi bandwidth. The system can be used for multi-person scenarios. In some embodiments, the system can be used based on deep neural networks to accommodate the complex cases of multi-person.

Accordingly, the present disclosure discloses a device-free WiFi-based multi-room human detection and localization system that leverages time-, frequency-, and spatial-domain features. The system may utilize a novel multipath selection method that selects a subset of multipaths to distinguish between nearby and distant movements, facilitating key feature extraction. The system may use effective spatial-domain feature by utilizing the spatial diversity of multiple antennas to boost the spatial resolution for more refined sensing coverage. The system may utilize multidimensional features from time-, frequency-, and spatial-domains to enhance the robustness and the adaptability in diverse indoor settings. The system may use an innovative technique for selecting MPCs that discerns between proximate and distant motion, facilitating the extraction of key features, and may also use multiple antennas to derive a useful feature via PCA to improve the spatial resolution. The system's performance has been evaluated across various indoor environments and its effectiveness in real-world scenarios is verified.

In some embodiments, a novel system is disclosed to use commodity WiFi that measures high dimensional wireless channel characteristics with embedded information of object motions and use it to perform a wireless sensing task. In a particular example, the system accurately determines the specific room where the person is, i.e., room-level localization. While the multi-component wireless channel characteristics suffers from puncturing and mis-alignment due to missing components during sampling, the system employs a novel measurement enhancement technique comprising rectifying and transforming the channel measurements, selecting important/key transformed components, and emphasizing the selected transform components to significantly enhance the wireless channel characteristics in order to perform superior wireless sensing. The transform component emphasis highlights/enhances a limited set of selected transformed components reflective of the object motions, while suppressing the other components. Based on the enhanced wireless measurements, a spatial feature leveraging multiple antennas to enhance the spatial resolution is computed for more refined detection coverage. The spatial feature is combined with time and frequency-domain features to achieve good overall test accuracy, good true positive rate, and good positive predictive value.

In some embodiments, an object (or more than one objects) is located in a venue comprising K1 regions/zones (e.g. rooms) by computing a zone-level/region-level/room-level location of the object (i.e. being present at one of the K1 zones/regions, or being absent/not present). Any object may be moving in the venue. There may be K2 wireless devices forming K3 pairs of devices. Out of the K2 devices, up to (K2!)/(K2−2)!/2!=K2 (K2−1)/2 pairs may be formed/constructed/identified/designated/configured such that K3<=K2 (K2−1)/2.

In some embodiments, within each pair of wireless devices, one device may function as a Type1 heterogeneous wireless device (wireless transmitter/TX) and the other device may function as a Type2 heterogeneous wireless device (wireless receiver/RX). A respective wireless signal may be transmitted from the Type1 device to the Type2 device in each of the pairs and a time series of channel information (TSCI) may be obtained in the Type2 device based on the received wireless signal. In each pair, when multiple antennas are used in the Type1 device and/or the Type2 device, more than one TSCI may be obtained in the Type2 device based on the received wireless signal, each TSCI being associated with a respective antenna link (spatial diversity) between the Type1 device and the Type2 device.

In some embodiments, a sensing task may be performed based on the TSCI. Each CI may have imperfection/distortion/corruption/noise. Preprocessing may be applied to the TSCI. The preprocessing may comprise outlier removal, phase compensation and/or normalization. Further, each CI may have missing component/omitted info. For example, if CI is channel frequency response (CFR), some frequency components of the CFR may be missing in CFR due to some reason (e.g. guard band not sampled). In one example, the CFR of a 40 MHz channel may have some missing component at 0 Mhz, some missing at 20 MHz and some missing around 40 MHz. The CFR of a 80 MHz channel may have missing components at 0 MHz, 20 MHz, 40 MHz, 60 MHz, 80 MHz.

In some embodiments, for an example of missing components of a CI (e.g. CFR), a genuine/true CFR should be a vector with N2 components (e.g. resembling N2=256 components for an 80 MHz band in FIG. 3). However, due to guard bands at the beginning and/or end of each 20 MHz band such that some CFR components are missing (e.g. at 0, 64, 128 and 256 in FIG. 3A, shown as zero). The sampled/available (non-zero) CFR components are packed/pushed/concatenated together to form an N1-component vector (N1<N2). In next step (measurement enhancement), the N1-component CFR (or CI) is enhanced to give/obtain/get a N2-component enhanced CFR (CI).

In some embodiments, measurement enhancement is a step to preprocess/process/refine/enhance/restore/extend/expand/improve/enrich/complement/reinforce/supplement/augment/boost/upgrade/improve the measurement (e.g. CI/TSCI) to obtain/give/generate enhanced measurement (e.g. enhanced CI/TSCI, preprocessed/processed/refined/enhanced/restored/extended/expanded/improved/enriched/complemented/reinforced/supplemented/augmented/boosted/upgraded/improved CI/TSCI) that resemble/approximate/approach/estimate the genuine/true measurement. The sensing task may then be performed based on the enhanced measurement (e.g. enhanced CI/TSCI). The measurement enhancement may firstly align/ re-align/map/restore the N1-component CI to a N2-component temporary vector (shown in part (a) of FIG. 3), transform (e.g. Fourier/inverse Fourier transform) the N2-component temporary vector to the N2-component transformed CI (TCI), select/emphasize some N3 of the N2 components of TCI (N3<N2), inverse transform (e.g. inverse Fourier/Fourier transform respectively) the resulting emphasized TCI (ETCI) to generate/give/obtain enhanced CI (ECI) (as shown in FIG. 3B).

In some embodiments, the key step to enhance the CI/TSCI may comprise "transformed CI component selection" (e.g. multipath selection) in which (a) N1 CI components (i.e. N1 CIC) of a N1-component CI are transformed to generate a N2-component transformed CI (TCI), (b) some TCI components (N3 TCIC, N3<N2) of TCI are selected, (c) the N3 selected TCIC of TCI are emphasized to generate a N2-component emphasized TCI (ETCI), (d) the N2 components of ETCI are inverse transformed to form/generate/give a N2-component enhanced CI (ECI). The sensing task is performed based on the enhanced CI. Each CI may have multiple components (e.g. frequency components such as subcarrier, time components such as taps). Some components of the CI may be missing/unreliable/distorted/corrupted/zero-ed. The missing/unreliable/distorted/corrupted/zero-ed components may be constructed/reconstructed/restored/enhanced/refined/reinforced (based on the available CIC).

For example, each "genuine"/"true" CI should be a CFR or a CIR of the wireless channel with N2 components (e.g. N2 frequency components of CFR, or N2 time components of CIR). As some components of the genuine/true CI may be missing/unavailable/not sampled, only N1 "available components" or "measured components" of genuine/true CI may be available/provided/sampled/produced. The N1 available components may be packed/concatenated in a N1-component sampled/available/provided CI vector/array (e.g. from firmware), where N1<=N2. This is the N1-component CI with N1 CIC.

In some embodiments, in the process of the packing/concatenation, the indices of the N1 available components in the provided CI vector may be shifted/misaligned/unevenly sampled with respect to the correct indices in the N2-component genuine/true CI (i.e. the correct index of an available component of the genuine/true CI may be different from its CIC index in the provided CI vector). Correction may be applied to the N1-component CI to obtain a N2-component temporary vector (a corrected CI). The CIC indices of the available N1 CIC may be corrected by realigning/rectifying/correcting/restoring them to the respective correct indices in the genuine/true CI (e.g. based on a mapping of actual component indices as specified/provided by firmware provider/chip manufacturer). In particular, the N1 (available) CIC of the N1-component CI may be copied to the respective entries/components at the respective corrected CIC indices of a N2-component temporary vector, with zeros inserted into the missing entries/components not mapped to any CIC of the CI. There may be (N2-N1) zeros inserted. Transformation may be applied to the N2-component corrected CI to generate a N2-component transformed CI (TCI).

In some embodiments, in (a) of the key step (measurement enhancement), transformation may be applied to each N1-component CI (or, the N2-component corrected CI). For example, inverse Fourier transform may be applied to CFR; Fourier transform/trigonometric transform/wavelet transform may be applied to CIR. The transformation of the CI transforms the CI from its N1 CIC in a first domain (frequency domain of CFR or time domain of CIR) to N2 transformed CIC (TCIC) in a second domain (time domain of channel impulse response (CIR), or frequency domain of CFR/trigonometric transform, or time-frequency domain of wavelet transform). N2 may be larger than, same as, or smaller than N1. The transformation may comprise two sub-steps: (a1) extending/expanding/re-aligning the N1 CIC of the CI to N2 components of a temporary vector (the corrected CI), and (a2) transforming the N2 components of the corrected CI to a N2-component transformed CI (TCI) with N2 TCI components (TCIC).

In some embodiments, in (b) of the key step (measurement enhancement), a number (N3) of TCIC may be selected from the N2 TCIC. The quantity N3 may be a pre-determined number, or may be adaptively determined. The quantity N3 (and/or the TCIC indices of the N3 selected TCIC) may be same/different (and/or changed/unchanged) over time (e.g. among a number of temporally adjacent CI of the TSCI). The quantity N3 (and/or the TCIC indices of the N3 selected TCIC) may be same/different (and/or changed/unchanged) over different antenna links between a pair of Type1/TX device and Type2/RX device. The quantity N3 (and/or the TCIC indices of the N3 selected TCIC) may be same/different (and/or changed/unchanged) over different pairs of Type1/TX device and Type2/RX device.

In some embodiments, a particular TCIC with a particular TCIC index may be identified. The particular TCIC may be a dominant TCIC. The dominant TCIC may have a maximum magnitude among the N2 TCIC. The dominant TCIC may have a maximum (or almost max) magnitude among the N2 TCIC of multiple consecutive CI (e.g. CI at time t, t−1, t−2, . . . , t+1, t+2, . . . ). For example the dominant TCIC with the particular TCIC index may have a maximum weighted average of magnitude of respective TCIC of the multiple consecutive CI with the particular TCIC index. The dominant TCIC may have a magnitude among the top P1 percentage magnitude of the N2 TCIC (e.g. top 10%). The dominant TCIC may have a magnitude within P2 percent of the maximum magnitude among the N2 TCIC (e.g. 95%<= (P2/max magnitude)<=100%). The N3 selected TCIC may be selected based on the particular TCIC and/or the particular TCIC indices. The N3 selected TCIC may comprise the particular TCIC. The TCIC indices of the N3 selected TCIC may comprise the particular TCIC indices.

In some embodiments, one or more additional particular TCIC with respective additional particular TCIC index may also be identified. The one or more additional particular TCIC may comprise additional dominant TCIC. The additional dominant TCIC may comprise a second (and/or third, fourth, . . . ) maximum magnitude among the N2 TCIC. The additional dominant TCIC may have a second (and/or third, fourth, . . . ) maximum magnitude among the N2 TCIC of multiple consecutive CI (e.g. CI at time t, t−1, t−2, . . . , t+1, t+2, . . . ). For example the additional dominant TCIC with the particular TCIC index may have a second (and/or third, fourth, . . . ) maximum weighted average of magnitude of respective TCIC of the multiple consecutive CI with the particular TCIC index. The dominant TCIC may have a magnitude among the top P3 percentage magnitude of the N2 TCIC (e.g. top 15%). The dominant TCIC may have a magnitude within P4 percent of the maximum magnitude among the N2 TCIC (e.g. 90%<=P2<=100%).

In some embodiments, the N3 selected TCIC may be selected based on the one or more additional particular TCIC and/or the one or more additional particular TCIC indices. The N3 selected TCIC may comprise the one or more additional particular TCIC. The TCIC indices of the N3 selected TCIC may comprise the one or more additional particular TCIC indices.

In some embodiments, the N3 selected TCIC may have consecutive TCIC indices. The indices of the N3 selected TCIC may form a contiguous interval of TCIC indices. If the TCIC index of the particular TCIC is k, the indices of the N3 selected TCIC may comprise the interval of [k−N5, k+N6], wherein N5+N6+1=N3. Both N5 and N6 may be non-negative integers. N6 may be greater than or equal to N5. N5 may be zero.

In some embodiments, each of the N3 selected TCIC may have a magnitude among the top P4 percentage magnitude of the N2 TCIC (e.g. top 10% or top 20%). The quantity N3 may be adaptively determined/selected to include most, if not all, of the top P4 percentage magnitude of the N2 TCIC. The quantity P4 may be adaptively determined/selected such that the resulting N3 (determined based on P4, or determined to encompass all of top P4 percentage magnitude) is within a certain range (greater than a first threshold, and/or less than a second threshold).

In some embodiments, the quantity N3 may be adaptively determined/selected to include most, if not all, of the top P5 percentage magnitude of the N2 TCIC of multiple consecutive CI. The quantity P5 may be adaptively determined/selected such that the resulting N3 (determined based on P5, or determined to encompass all of top P5 percentage magnitude) is within a certain range (greater than a first threshold, and/or less than a second threshold).

In some embodiments, there may be multiple antenna links between a Type1/TX device and a Type2/RX device. A wireless signal may be transmitted from Type1/TX device to Type2/RX device. Multiple TSCI may be obtained based on the received wireless signal, each TSCI associated with a respective antenna link. In particular, at a common time stamp, a CI of respective TSCI may be obtained from the wireless signal. Each of the CI at the common time stamp may be enhanced by the key step: (a), (b), (c) and (d). In (a), N1 CIC of each CI may be transformed to N3 TCIC. In (b), a respective number of TCIC of each CI may be selected. At the common time, a respective particular TCIC of each CI with a respective particular TCIC index may be selected. Each respective particular TCIC may be selected independently for the CI. Alternatively, the respective particular TCIC of each CI may be selected jointly for all the CI at the common time stamp. The respective particular TCIC index of different CI may be same or different. Same or different amount/quantity/number of TCIC may be selected for different CI. In (c) of the key step (measurement enhancement), the N3 selected TCIC of a CI may be emphasized. The rest of the N2 TCIC other than the N3 selected TCIC (i.e. the N2-N3 TCIC that are not selected, or the "un-selected TCIC") may be de-emphasized. A TCIC may be emphasized by either scaling/multiplying the TCIC with a respective scaling factor greater than one and/or adding a respective offset to generate a respective emphasized TCIC. A TCIC may be de-emphasized by either scaling/multiplying the TCIC with a respective scaling factor less than one and/or subtracting a respective offset to generate a respective de-emphasized TCIC (e.g. "deemphasized TCIC" may also be called "emphasized TCIC").

In some embodiments, the scaling factor of different selected TCIC may be same/different (and/or changed/unchanged) over time/different antenna link/different TX/RX pair. The scaling factor of different un-selected TCIC may be same/different (and/or changed/unchanged over time). All TCIC of a CI may be scaled by a common scaling factor (e.g.

greater/less than one) before (or after) emphasizing the N3 selected TCIC and de-emphasizing the N2-N3 un-selected TCIC.

In some embodiments, the N3 selected TCIC of a CI may be emphasized by multiplying all the N2 TCIC $x(i)$ by a weighting function $w(i)$ to get emphasized TCIC $y(i)$, where $i$ is the associated TCIC index. The $w(i)$ may be greater than or equal to 1 for any $i$ of the N3 selected TCIC. The N2-N3 un-selected TCIC of the CI may be de-emphasized by multiplying all the N2-N3 TCIC $x(i)$ by a weighting function $w2(i)$ to get de-emphasized TCIC $y(i)$, where $i$ is the associated TCIC index, and the $w2(i)$ may be less than or equal to 1 for any $i$ of the un-selected TCIC.

In an example, the N3 selected TCIC may be retained as they are (scaled by a factor of one, or adding an offset of zero). The N2-N3 unselected TCIC may be zero-ed (scaled by a factor of zero, or subtracting itself). This is equivalent to $w(i)$ being 1 for any $i$ of the N3 selected TCIC and 0 for any $i$ of the un-selected TCIC, which is effectively the indicator function of the N3 selected TCIC.

In another example, each of the N3 selected TCIC may be scaled by a respective scaling factor that is computed as a decreasing function of a distance of the respective selected TCIC from the particular selected TCIC (e.g. the dominant TCIC). In other words, $w(i\_max+k2){<=}w(i\_max+k1)$, for $0{<=}k1{<}k2$, where $i\_max$ is the TCIC index of the particular selected TCIC. Similarly, $w(i\_max-k2){<=}w(i\_max-k1)$, for $0{<=}k1{<}k2$. Note that the function may/may not be symmetric (i.e. $w(i\_max+k1){=}w(i\_max-k1)$ for some $k1$, and $w(i\_max+k1){<}{>}w(i\_max-k1)$ for some other $k1$).

In an example, each of the N2-N3 unselected TCIC may be scaled by a respective scaling factor that is computed as a decreasing function of a distance of the respective unselected TCIC from a respective nearest selected TCIC. The distance between two TCIC is a difference between their respective TCIC indices. The decreasing function may be a monotonic decreasing (or non-increasing) function, such as linear, piecewise linear, exponential, etc.

The following numbered clauses provide examples for wireless sensing with transformed component selection.

Clause 1. A method/system/device/software of wireless sensing with transformed component selection, comprising: transmitting a wireless signal by a Type1 heterogeneous wireless device to a Type2 heterogeneous wireless device through a wireless multipath channel of a venue; receiving the wireless signal by the Type2 device, wherein the received wireless signal differs from the transmitted wireless signal due to the wireless multipath channel and a motion of an object in the venue; obtaining a time series of channel information (TSCI) of the wireless multipath channel based on the received wireless signal, wherein each channel information (CI) comprises N1 CI components (CIC); for each N1-component CI of the TSCI, computing a respective N2-component enhanced CI (ECI) by: computing a transformation of the N1 CIC of the respective CI in a first domain to a respective N2-component transformed CI (TCI) with N2 transformed CIC (TCIC) in a second domain, wherein $N1{<=}N2$, selecting a respective number, N3, of TCIC of the TCI, wherein $N3{<=}N2$ for any N3, computing an N2-component emphasized TCI (ETCI) by emphasizing the respective N3 selected TCIC of the TCI in the second domain, computing an inverse transformation of the emphasized TCI from the second domain to the first domain to obtain the respective enhanced CI with N2 components, wherein the inverse transformation is an inverse of the transformation; computing a motion information (MI) based on the enhanced CI of the TSCI; performing a sensing task based on the MI.

In some embodiments, N3 TCIC of TCI are selected, where a particular TCIC is important because the selected TCIC are selected based on the particular TCIC. It may be dominant (with dominant feature/characteristics/magnitude).

Clause 2. The method/system/device/software of wireless sensing with transformed component selection of clause 1, wherein computing the respective enhanced CI for the CI further comprises: identifying a respective particular TCIC of the CI with a dominant characteristics among the multiple TCIC of the CI; selecting the respective number of selected TCIC for the CI based on the respective particular TCIC of the CI.

In some embodiments, the particular TCIC may have a maximum magnitude among the multiple TCIC of the CI.

Clause 3. The method/system/device/software of wireless sensing with transformed component selection of clause 2: wherein the respective particular TCIC of the CI has a maximum magnitude among the multiple TCIC of the CI.

In some embodiments, the particular TCIC index (associated with the particular TCIC) may have a jointly dominant characteristics (dominant in a "jointed" way, e.g. with dominant aggregate characteristics, or with dominant characteristics in most/all CI) among the multiple TCIC of one or more other CI. An example of aggregate characteristics is weighted sum/mean (e.g. arithmetic/geometric/harmonic mean) of respective TCIC magnitude among the CI and the at least one other CI.

Clause 4. The method/system/device/software of wireless sensing with transformed component selection of clause 2: wherein the respective particular TCIC of the CI has a jointly dominant characteristics among the multiple TCIC of the CI and multiple TCIC of at least one other CI.

In some embodiments, other CI may be/comprise temporally adjacent CI (e.g. past CI, future CI) in the TSCI. The particular TCIC index may have a dominant joint/combined/aggregated characteristics (e.g. max weighted average magnitude) in several consecutive CI in the TSCI. Alternatively, the particular TCIC index may be associated with dominant characteristics (e.g. max magnitude) in each of several consecutive CI in the TSCI.

Clause 5. The method/system/device/software of wireless sensing with transformed component selection of clause 4: wherein the at least one other CI comprises a temporally adjacent CI in the TSCI.

In some embodiments, other CI may comprise temporally adjacent CI (e.g. past CI, future CI) in another TSCI.

Clause 6. The method/system/device/software of wireless sensing with transformed component selection of clause 4: wherein the at least one other CI comprises a temporally adjacent CI of another TSCI.

In some embodiments, the another TSCI may be associated with another antenna link between the Type1 device and Type2 device (spatial diversity).

Clause 7. The method/system/device/software of wireless sensing with transformed component selection of clause 6: wherein the another TSCI of the wireless multipath channel is obtained by the Type2 device based on the received wireless signal from the Type1 device; where the TSCI and the another TSCI are associated with different antenna link between the Type1 device and the Type2 device.

In some embodiments, the jointly dominant characteristics may comprise/be a max aggregate of magnitude of sets of TCIC of the CI and other CI. The sets of TCIC may comprise one TCIC of CI and one TCIC of each other CI. The sets of TCIC at a "current" TCIC index may comprise a few TCIC of CI (e.g. 5 consecutive TCIC of the CI around the current TCIC index) and another few TCIC of the other CI (e.g. 3 consecutive TCIC of the other CI around the current TCIC index). Some possible aggregate (e.g. weighted mean) are listed.

Clause 8. The method/system/device/software of wireless sensing with transformed component selection of any of clauses 4 to 7: wherein the jointly dominant characteristics comprise a maximum aggregate of magnitude of respective set of TCIC of the CI and respective set of TCIC of the at least one other CI; wherein the aggregate comprise one of these statistical aggregates: a sum, a weighted sum, a product, a weighted product, a mean, a weighted mean, an arithmetic mean, a geometric mean, a harmonic mean, a median, a mode, or a percentile.

In some embodiments, an aggregate may be an aggregate over TCIC with same TCIC index. In other words, the sets of TCIC may comprise only 1 TCIC of CI and only 1 TCIC of the other CI, both TCIC with the same TCIC index.

Clause 9. The method/system/device/software of wireless sensing with transformed component selection of clause 8: wherein the maximum magnitude comprise a maximum aggregate of magnitude of a respective TCIC of the CI and a respective TCIC of the at least one other CI with a same TCIC index; wherein each TCIC is associated with a respective TCIC index in the second domain.

In some embodiments, when there are multiple antenna links (spatial diversity), respective particular TCIC may be computed/identified for respective CI in each antenna link. The particular TCIC of some (or all) CI at same (or contemporaneous) time may be computed independently, sequentially (i.e. particular TCIC of a CI may be computed based on another particular TCIC of another CI) or jointly (simultaneously, together).

Clause 10. The method/system/device/software of wireless sensing with transformed component selection of any of clauses 2 to 9, wherein computing the respective enhanced CI for the CI further comprises: identifying another particular TCIC of another CI in the TSCI with the dominant characteristics among the multiple TCIC of the another CI; identifying the respective particular TCIC of the CI based on the another particular TCIC.

In some embodiments, the particular TCIC may be computed by searching for the dominant characteristics, e.g. domain characteristics may be maximum magnitude, and a search for max magnitude may be performed among the TCIC of the CI.

Clause 11. The method/system/device/software of wireless sensing with transformed component selection of any of clauses 2 to 10, wherein computing the respective enhanced CI for the CI further comprises: performing a search for the respective particular TCIC of the CI among the TCIC of the CI within a search range of TCIC indices.

In some embodiments, a search range may be defined in the search for the particular TCIC of the TCI. The dominant characteristics of temporally adjacent CI (or TCI) of multiple TSCI (e.g. multiple TSCI associated with multiple wireless links between a pair of Type1 device and Type2 device) may happen at similar TCIC indices of respective TCI. Thus if the dominant characteristic has been found for a first CI of a first TSCI (e.g. by searching a large TCIC range), a reduced/predictive search range (of TCIC indices) for a second CI (contemporaneous to first CI, with similar/ nearby time stamps) of a second TSCI may be defined based on the predictor, which is the TCIC index of the dominant characteristics of the first TCI/CI. And a reduced search or predictive search can be performed.

Clause 12. The method/system/device/software of wireless sensing with transformed component selection of clause 11: wherein the search range of TCIC indices comprises a neighborhood around another TCIC index associated with the another particular TCIC.

In some embodiments, after the particular TCIC (associated with a particular TCIC index) is identified/found, a number of neighboring TCIC (with neighboring TCIC indices) may be selected as the selected TCIC.

Clause 13. The method/system/device/software of wireless sensing with transformed component selection of any of clauses 2 to 12, wherein computing the respective enhanced CI for the CI further comprises: selecting the respective number of selected TCIC for the CI as a number of neighboring TCIC of the respective particular TCIC.

In some embodiments, for a particular CI, the selected CI may have the property that their magnitude is at least a percentage (e.g. 95% or 90% or 80% or 70%) of the maximum magnitude (of the particular TCIC).

Clause 14. The method/system/device/software of wireless sensing with transformed component selection of clause 13, wherein computing the respective enhanced CI for the CI further comprises: selecting the respective number of selected TCIC for the CI as the number of neighboring TCIC of the respective particular TCIC such that all the selected TCIC have magnitude greater than or equal to a threshold, the threshold being a percentage of the magnitude of the respective particular TCIC.

In some embodiments, the amount of selected TCIC may be different for different CI in the TSCI, and/or for CI across multiple TSCI associated with different antenna links. The amount for any CI may be chosen so as to encompass all the directly connected (or immediately neighboring) TCIC with magnitude reaching the percentage of max magnitude.

Clause 15. The method/system/device/software of wireless sensing with transformed component selection of clause 14, wherein computing the respective enhanced CI for the CI further comprises: selecting the respective number of selected TCIC for the CI as the number of neighboring TCIC of the respective particular TCIC to encompass all neighboring TCIC of the CI (a) with magnitude greater than or equal to the threshold and (b) being immediately neighboring to the respective particular TCIC or another selected TCIC.

In some embodiments, to encompass all the directly connected (or immediately neighboring) TCIC with magnitude reaching the percentage of max magnitude, one may start from the particular TCIC (i.e. the max magnitude, a local max), descent from the local max on both positive side and negative side, include all TCIC as selected TCIC until the next TCIC fails the acceptance criterion (it fails when its magnitude is less than the percentage of max magnitude).

Clause 16. The method/system/device/software of wireless sensing with transformed component selection of clause 15, wherein computing the respective enhanced CI for the CI further comprises: selecting the respective number of selected TCIC for the CI as the number of neighboring TCIC of the respective particular TCIC by starting from the respective particular TCIC and selecting all the immediately neighboring TCIC until encountering a first TCIC with magnitude less than the threshold.

In some embodiments, the percentage may be 80%, or higher.

Clause 17. The method/system/device/software of wireless sensing with transformed component selection of any of clauses 14 to 16, wherein the percentage is greater than or equal to 80%.

In some embodiments, the amount of selected TCIC may be fixed/same for two consecutive CI in the TSCI. The amount of selected TCIC may be fixed/same for contemporaneous CI across multiple TSCI associated with different antenna links.

Clause 18. The method/system/device/software of wireless sensing with transformed component selection of any of clauses 4 to 17: wherein same amount of selected TCIC are selected for the CI and the at least one other CI.

In some embodiments, the amount and TCIC indices of selected TCIC may be same for two consecutive CI in the TSCI. For contemporaneous CI across multiple TSCI, the corresponding TCIC indices of selected TCIC may be identical, or slightly different. Actually, the corresponding particular TCIC may be identical or slightly different.

Clause 19. The method/system/device/software of wireless sensing with transformed component selection of any of clauses 4 to 18: wherein indices of the selected TCIC for the CI and the at least one other CI are identical.

In some embodiments, the TCIC indices of the selected TCIC may form a continuous interval $[k-M1, k+M2]$. Both M1 and M2 are nonnegative. M2 may be greater than M1. M1 may be zero.

Clause 20. The method/system/device/software of wireless sensing with transformed component selection of any of clauses 2 to 19, wherein computing the respective enhanced CI for the CI further comprises: selecting the respective number of selected TCIC for the CI as a contiguous interval of neighboring TCIC of the respective particular TCIC.

Clause 21. The method/system/device/software of wireless sensing with transformed component selection of any of clauses 2 to 20, wherein: each TCIC is associated with a respective TCIC index in the second domain; a particular TCIC index k is associated with the respective particular TCIC; the respective number of selected TCIC comprises all the TCIC with indices spanning from $k-M1$ to $k+M2$, both M1 and M2 are non-negative integers.

Clause 22. The method/system/device/software of wireless sensing with transformed component selection of clause 21, wherein: M2 is greater than or equal to M1.

Clause 23. The method/system/device/software of wireless sensing with transformed component selection of any of clauses 21 to 22, wherein: M1 is zero.

In some embodiments, emphasizing N3 selected TCIC of TCI. The selected TCIC may be emphasized by (a) scaling by a factor greater or equal to 1, and/or (b) adding a non-negative offset.

Clause 24. The method/system/device/software of wireless sensing with transformed component selection of any of clauses 1 to 23, further comprising: for each N1-component CI of the TSCI, computing the respective N2-component enhanced CI further by: emphasizing each of the respective N3 selected TCIC of the TCI in the second domain by scaling with a respective scaling factor greater than or equal to one, or adding a respective non-negative offset.

In some embodiments, the scaling factor may be a decreasing function of TCIC index away from the TCIC index of the particular TCIC (e.g. of max TCIC).

Clause 25. The method/system/device/software of wireless sensing with transformed component selection of clause 24: wherein among all the scaling factors associated with the CI: the scaling factor for a particular TCIC index, i_max, associated with the respective particular TCIC is a maximum among all scaling factors applied to the respective N3 selected TCIC of the TCI, the scaling factor is a non-increasing function of TCIC indices away from the particular TCIC index, i_max.

In some embodiments, the decreasing function of the scaling factor, in mathematic form.

Clause 26. The method/system/device/software of wireless sensing with transformed component selection of clause 25, wherein: i_max is the TCIC index associated with the respective particular TCIC of the TCI, w(i) is the scaling factor for TCIC index i; wherein the scaling factor w(i) is a monotonic non-increase, or monotonic decreasing, function of the absolute value of $i-i\_max$ such that: $w(i\_max+k2) <= w(i\_max+k1)$, for $0 <= k1 < k2$, $w(i\_max-k2) <= w(i\_max-k1)$, for $0 <= k1 < k2$.

In some embodiments, the scaling factor for all selected TCIC may be identical for each CI (or for a number of neighboring CI in a TSCI, or for contemporaneous/temporally neighboring CI of multiple TSCI.

Clause 27. The method/system/device/software of wireless sensing with transformed component selection of any of clauses 24 to 26: for each N1-component CI of the TSCI, computing the respective N2-component enhanced CI further by: (a) scaling all of the respective N3 selected TCIC with a respective common scaling factor greater than or equal to one, or (b) adding to all of the respective N3 selected TCIC a respective common non-negative offset.

In some embodiments, the not-selected (or un-selected) TCIC may be de-emphasized (or "emphasized") by (a) scaling by a factor less or equal to 1, and/or (b) adding a non-positive offset. For example, they may be scaled by 0 (i.e. forced to zero, or discarded/not used in inverse transformation). The scaling factors (or offsets) may be identical/common for all the un-selected TCIC of the TCI.

Clause 28. The method/system/device/software of wireless sensing with transformed component selection of any of clauses 1 to 27, further comprising: for each N1-component CI of the TSCI, computing the respective N2-component enhanced CI further by: de-emphasizing each of the respective remaining N2-N3 un-selected TCIC of the TCI in the second domain by scaling with a respective scaling factor less than or equal to one, or adding a respective non-positive offset.

In some embodiments, a transformation of N1-component CI to N2-component TCI is computed. If some components are not available and/or the available components may be misaligned, then the misaligned available component may be aligned and some values may be generated for the unavailable components. A "proper CI" associated with a CI should have N2 components (i.e. there should be N2 CIC), but only N1 components may be available (i.e. the N1 CIC of the CI). And N2-N1 components may not be available (i.e. N2-N1 CIC unavailable) and may be generated. The N1 components of the CI (CIC) are simply N1 of the N2 components of the proper. The N2 components may be "punctured" by the N1 components (e.g. some components in the middle may be missing, here and there). A temporary vector may be constructed to imitate the proper CI by copying the N1 components from the CI and by generating the N2-N1 unavailable components. The N1 components of CI may be mapped/aligned to the proper locations/components among the N2 components. The N2-N1 unavailable components may be generated as zeros, interpolated values, and/or random numbers.

Clause 29. The method/system/device/software of wireless sensing with transformed component selection of any of clauses 1 to 28: for each N1-component CI of the TSCI:

constructing a temporary vector with N2 components based on the CI by: aligning N1 of the N2 components of the temporary vector with the N1 CIC of the CI, constructing the N1 aligned components of the temporary vector by copying each of the N1 aligned components of the temporary vector from respective aligned CIC of the CI, generating values for the remaining N2-N1 components of the temporary vector, computing the N2 TCIC of the TCI in the second domain by performing the transformation on the N2 components of the temporary vector.

In some embodiments, first domain may be frequency domain. Second domain may be time domain. Transformation may be inverse frequency transform (e.g. inverse Fourier transform).

Clause 30. The method/system/device/software of wireless sensing with transformed component selection of any of clauses 1 to 29: wherein the transformation comprises one of: an inverse frequency transformation, or an inverse Fourier transform; wherein the first domain is a frequency domain; wherein the second domain is a time domain.

In some embodiments, first domain may be time domain. Second domain may be frequency domain. Transformation may be frequency transform (e.g. Fourier transform, wavelet transform, trigonometric transform, sin transform, cosine transform, Hadamard transform, Haar transform).

Clause 31. The method/system/device/software of wireless sensing with transformed component selection of any of clauses 1 to 29: wherein the transformation comprises one of: a frequency transformation, a Fourier transform, a wavelet transform, or a trigonometric transform, wherein the first domain is a time domain; wherein the second domain is a frequency domain.

In some embodiments, more than one TSCI associated with different wireless links between Type1 and Type2 devices.

Clause 32. The method/system/device/software of wireless sensing with transformed component selection of any of clauses 1 to 31, further comprising: wherein at least one of the Type1 device and Type2 device comprise more than one antennas; obtaining more than one TSCI of the wireless multipath channel based on the received wireless signals, each TSCI associated with a respective antenna of the Type 1 device and a respective antenna of the Type2 device, each CI of any TSCI comprising N1 CI components (CIC); for each CI of any of the more than one TSCI, computing a respective enhanced CI by: computing a transformation of the N1 CIC of the respective CI in the first domain to a respective transformed CI (TCI) with N2 TCI components (TCIC) in the second domain, selecting a respective number, N3, of TCIC of the TCI, emphasizing the respective N3 selected TCIC of the TCI, and computing inverse transformation of the N2 TCIC of the TCI to obtain the respective enhanced CI with N2 CI components; computing a respective individual MI based on the enhance CI of each of the more than one TSCI; computing a combined MI based on the more than one individual MI and the enhanced CI of each of the more than one TSCI; performing the sensing task based on the combined MI and the more than one individual MI.

In some embodiments, more than one pairs of Type1 and Type2 devices. For different pairs, different bandwidth may be used by respective wireless signal such that the respective CI of respective TSCI may have respective N1 components (e.g. one may use 80 MHz while another may use 40 MHz). The N1, N2 and/or N3 may be different for different TSCI. For example, CI of a first TSCI may have 220 components while CI of a second TSCI may have 110 components. And the respective N2 may be N2=256 for first TSCI and N2=128 for second TSCI.

Clause 33. The method/system/device/software of wireless sensing with transformed component selection of any of clauses 1 to 32: wherein there are a plurality of Type1 devices and Type2 devices in the venue; forming a number of pairs based on the plurality of Type1 devices and Type2 devices, each pair comprising a Type1 device and a Type2 device; for each pair of Type1 device and Type2 device: transmitting a respective wireless signal by the respective Type1 heterogeneous wireless device of the pair to the respective Type2 heterogeneous wireless device of the pair through the wireless multipath channel of the venue, receiving the respective wireless signal by the respective Type2 device, wherein the respective received wireless signal differs from the respective transmitted wireless signal due to the wireless multipath channel and the motion of the object in the venue, obtaining a respective number of TSCI of the wireless multipath channel based on the respective received wireless signal, each CI of all of the respective number of TSCI comprising a respective number, N1, of CI components (CIC), for each CI of any of the respective number of TSCI, computing a respective N2-component enhanced CI by: computing a transformation of the N1 CIC of the respective CI to a respective transformed CI (TCI) with a respective number, N2, of TCI components (TCIC), selecting a respective number, N3, of TCIC of the TCI, emphasizing the respective N3 selected TCIC of the TCI, and computing inverse transformation of the N2 TCIC of the TCI to obtain the enhanced CI with N2 components, computing a respective individual MI based on the enhanced CI of each of the respective number of TSCI, and computing a combined MI based on the respective number of individual MI and the enhanced CI of each of the respective number of TSCI; combining a joint MI based on all the combined MI; performing the sensing task based on the joint MI, the number of combined MI, and any individual MI.

In some embodiments, location (e.g. room-level location) is computed based on individual/combined/joint MI computed based on enhanced CI.

Clause 34. The method/system/device/software of wireless sensing with transformed component selection of clause 33, further comprising: computing a location associated with the object and the motion of the object based on any of: any TSCI, enhanced CI of any TSCI, the joint MI, the number of combined MI and any individual MI.

In some embodiments, location is computed based on any of: SVM, or neural network, etc.

Clause 35. The method/system/device/software of wireless sensing with transformed component selection of clause 34, further comprising: computing the location based on any of: support vector machine (SVM), kernel-based SVM, neural network (NN), deep neural network (DN), convolutional NN (CNN), recurrent NN (RNN), long short-term memory network (LSTM), deep belief network (DBN), denoising autoencoder (DAE), generative adversarial network (GAN), transformer, neural radiance field, radial basis function network, multilayer perceptron (MLP), or self organizing map (SOM).

In some embodiments, location may be computed based on more than one analytics and a vector formed by concatenating multiple analytics, or using them as input to the SVM, neural network, etc.

Clause 36. The method/system/device/software of wireless sensing with transformed component selection of any of clauses 1 to 35, further comprises: computing more than one analytics based on the enhanced CI of any TSCI; computing a vector of the MI based on a concatenation of the more than one analytics; computing the location based on the vector and the more than one analytics.

In some embodiments, time-domain analytics are in Eqn. (7) and Eqn. (8). Component-domain analytics are in Eqn. (9) based on CIC of each CI. Transformed-component-domain analytics is similar, but computed based on TCIC (instead of CIC) of the CI.

Clause 37. The method/system/device/software of wireless sensing with transformed component selection of clause 36: wherein the more than one analytics comprise at least one of: a time-domain analytics computed based on a temporal correlation between a CIC of a first enhanced CI at a first time and a corresponding CIC of a second enhanced CI at a second time, a component-domain analytics computed based on a component-wise correlation between a first CIC associated with a first CIC index of a common enhanced CI and a second CIC associated with a second CIC index of the common enhanced CI, a transformed-component-domain analytics computed based on a component-wise correlation between a first TCIC of an enhanced CI associated with a first TCIC index and a second TCIC of the enhanced CI associated with a second TCIC index, or a spatial-domain analytics computed based on a variational characteristics associated with spatial diversity between the Type1 device and the Type2 device.

In some embodiments, multiple TSCI associated with multiple antenna links (spatial diversity) may be obtained. CI from multiple TSCI may be concatenated into a vector. PCA/SVD/ICA/eigen-decomposition may be performed to extract a significant vector (e.g. PCA component with maximum magnitude). Variational characteristics (e.g. variance) of the significant vector may be computed. An example of spatial domain analytics is the spatial-domain feature (variance of PCA component of significant vector).

Clause 38. The method/system/device/software of wireless sensing with transformed component selection of clause 37: obtaining more than one TSCI of the wireless multipath channel based on the received wireless signal, each TSCI associated with a respective spatial diversity associated with a respective antenna link between the Type1 device and the Type2 device; computing a spatially-diverse vector by concatenating CIC of contemporaneous CI of the more than one TSCI; processing the spatially-diverse vector by one of: principal component analysis (PCA), eigen-decomposition, singular value decomposition (SVD), or independent component analysis (ICA); computing a significant vector and an associated characteristic value based on the processing; computing the spatial-domain analytics by computing a variational characteristics of the significant vector or the characteristic value, wherein the variational characteristics comprise any of: variance, standard deviation, dispersion, divergence, absolute deviation, range, total variation, total deviation, spread, entropy, regularity measure, or variance-to-mean ratio.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method for wireless sensing with transformed component selection, comprising:

receiving, by a receiver, a wireless signal transmitted by a transmitter through a wireless multipath channel of a venue, wherein the received wireless signal differs from the transmitted wireless signal due to the wireless multipath channel and a motion of an object in the venue;

obtaining a time series of channel information (TSCI) of the wireless multipath channel based on the received wireless signal, wherein each channel information (CI) comprises N1 CI components (CIC);

for each respective CI having N1 CIC of the TSCI, computing a respective enhanced CI (ECI) having N2 CIC by:

computing a transformation of the N1 CIC of the respective CI in a first domain to a respective transformed CI (TCI) with N2 transformed CIC (TCIC) in a second domain, wherein N1<=N2, selecting a respective number, N3, of TCIC of the TCI in the second domain, wherein N3<=N2 for any N3, wherein N1, N2 and N3 are all positive integers, computing an emphasized TCI (ETCI) having N2 TCIC based at least by:

scaling each of the respective N3 selected TCIC of the TCI in the second domain with a respective scaling factor greater than or equal to one or adding a respective non-negative offset to the selected TCIC, and scaling each of the respective remaining N2-N3 un-selected TCIC of the TCI in the second domain with a respective scaling factor less than or equal to one, or adding a respective non-positive offset to the un-selected TCIC, computing an inverse transformation of the ETCI from the second domain to the first domain to obtain the respective ECI with N2 CIC, wherein the inverse transformation is an inverse of the transformation;

computing a motion information (MI) based on the ECI of the TSCI; and performing a sensing task based on the MI.

2. The method of claim 1, further comprising, for each CI having N1 CIC of the TSCI:

constructing a temporary vector with N2 components based on the CI by:

aligning N1 of the N2 components of the temporary vector with the N1 CIC of the CI, constructing the N1 aligned components of the temporary vector by copying each of the N1 aligned components of the temporary vector from respective aligned CIC of the CI, and generating values for the remaining N2-N1 components of the temporary vector; and computing the N2 TCIC of the TCI in the second domain by performing a transformation on the N2 components of the temporary vector.

3. The method of claim 2, wherein computing the respective enhanced CI for the respective CI further comprises:

identifying a respective particular TCIC of the respective CI with a dominant characteristics among the multiple TCIC of the respective CI; and selecting the respective number of selected TCIC for the respective CI based on the respective particular TCIC of the respective CI.

4. The method of claim 3, wherein:

the respective particular TCIC of the respective CI has a jointly dominant characteristics among the multiple TCIC of the respective CI and multiple TCIC of at least one other CI.

5. The method of claim 4, wherein:

the at least one other CI comprises a temporally adjacent CI in either the TSCI or an additional TSCI;

the additional TSCI of the wireless multipath channel is obtained by the receiver based on the received wireless signal from the transmitter; and the TSCI and the additional TSCI are associated with different antenna links between transmitter and the receiver.

6. The method of claim 4, wherein:

the respective particular TCIC of the respective CI has either a maximum magnitude among the multiple TCIC of the respective CI or a maximum aggregate of magnitudes of a respective TCIC of the respective CI and a respective TCIC of the at least one other CI with a same TCIC index;

the jointly dominant characteristics comprise a maximum aggregate of magnitudes of a respective set of TCIC of the respective CI and a respective set of TCIC of the at least one other CI;

the aggregate comprises one of: a sum, a weighted sum, a product, a weighted product, a mean, a weighted mean, an arithmetic mean, a geometric mean, a harmonic mean, a median, a mode, or a percentile; and each TCIC is associated with a respective TCIC index in the second domain.

7. The method of claim 3, wherein computing the respective enhanced CI for the respective CI further comprises:

identifying an additional particular TCIC of an additional CI in the TSCI with the dominant characteristics among the multiple TCIC of the additional CI;

identifying the respective particular TCIC of the respective CI based on the additional particular TCIC.

8. The method of claim 3, wherein computing the respective enhanced CI for the respective CI further comprises:

performing a search for the respective particular TCIC of the respective CI among the TCIC of the respective CI within a search range of TCIC indices, wherein the search range of TCIC indices comprises a neighborhood around another TCIC index associated with the additional particular TCIC.

9. The method of claim 3, wherein computing the respective enhanced CI for the respective CI further comprises:

selecting the respective number of selected TCIC for the respective CI as a number of neighboring TCIC of the respective particular TCIC.

10. The method of claim 9, wherein computing the respective enhanced CI for the respective CI further comprises:

selecting the respective number of selected TCIC for the respective CI as the number of neighboring TCIC of the respective particular TCIC such that all the selected TCIC have magnitudes greater than or equal to a threshold, the threshold being a percentage of a magnitude of the respective particular TCIC.

11. The method of claim 10, wherein computing the respective enhanced CI for the respective CI further comprises:

selecting the respective number of selected TCIC for the respective CI as the number of neighboring TCIC of the respective particular TCIC to encompass all neighboring TCIC (a) with magnitudes greater than or equal to the threshold and (b) being immediately neighboring to the respective particular TCIC or another selected TCIC, by:

starting from the respective particular TCIC, and selecting all the immediately neighboring TCIC until encountering a first TCIC with a magnitude less than the threshold.

12. The method of claim 11, wherein computing the respective enhanced CI for the respective CI further comprises:

selecting the respective number of selected TCIC for the respective CI as a contiguous interval of neighboring TCIC of the respective particular TCIC, wherein:

each TCIC is associated with a respective TCIC index in the second domain, a particular TCIC index k is associated with the respective particular TCIC, the respective number of selected TCIC comprises all TCIC with indices spanning from k–M1 to k+M2, both M1 and M2 are non-negative integers.

13. The method of claim 12, wherein:

a particular TCIC index, i_max, is associated with the respective particular TCIC;

among all scaling factors applied to the respective N3 selected TCIC of the TCI, a scaling factor w (i) for any TCIC index i is a maximum at i=i_max such that w(i_max)>=w(i);

the scaling factor w(i) is a non-increasing function of abs(i–i_max), which is an absolute value of a difference between i and i_max, such that:

$$w(\text{i\_max} + k2) <= w(\text{i\_max} + k1), \text{ for } 0 <= k1 < k2, \text{ and}$$

$$w(\text{i\_max} - k2) <= w(\text{i\_max} - k1), \text{ for } 0 <= k1 < k2.$$

14. The method of claim 12, wherein:

at least one of the transmitter and the receiver comprises multiple antennas; and the method further comprises:

obtaining multiple TSCI of the wireless multipath channel based on the received wireless signals, each of the multiple TSCI being associated with a respective antenna of the transmitter and a respective antenna of the receiver, each CI of any of the multiple TSCI comprising N1 CIC;

for each CI of any of the multiple TSCI, computing a respective enhanced CI by:

computing a transformation of the N1 CIC of the respective CI in the first domain to a respective transformed CI (TCI) with N2 TCI components (TCIC) in the second domain, selecting a respective number, N3, of TCIC of the TCI, emphasizing the respective N3 selected TCIC of the TCI, and computing an inverse transformation of the N2 TCIC of the TCI to obtain the respective enhanced CI with N2 CI components;

computing a respective individual MI based on the enhance CI of each of the multiple TSCI;

computing a combined MI based on the multiple individual MI and the enhanced CI of each of the multiple TSCI;

performing the sensing task based on the combined MI and the multiple individual MI.

15. The method of claim 14, wherein:

there are a plurality of transmitters and receivers in the venue; and the method further comprises:

forming a number of pairs based on the plurality of transmitters and receivers, each pair being formed by a transmitter and a receiver;

for each pair of a respective transmitter and a respective receiver:

receiving, by a respective receiver of the pair, a respective wireless signal transmitted by the respective transmitter of the pair through the wireless multipath channel of the venue, wherein the respective received wireless signal differs from the respective transmitted wireless signal due to the wireless multipath channel and the motion of the object in the venue, obtaining a respective number of TSCI of the wireless multipath channel based on the respective received wireless signal, each CI of all of the respective number of TSCI comprising a respective number, N1, of CI components (CIC), for each CI of any of the respective number of TSCI, computing a respective N2-component enhanced CI by:

computing a transformation of the N1 CIC of the respective CI to a respective transformed CI (TCI) with a respective number, N2, of TCI components (TCIC), selecting a respective number, N3, of TCIC of the TCI, emphasizing the respective N3 selected TCIC of the TCI, and computing an inverse transformation of the N2 TCIC of the TCI to obtain the respective N2-component enhanced CI, computing a respective individual MI based on the respective N2-component enhanced CI of each of the respective number of TSCI, and computing a combined MI based on the respective number of individual MI and the respective N2-component enhanced CI of each of the respective number of TSCI;

combining a joint MI based on all of the combined MI; and performing the sensing task based on the joint MI, the number of combined MI, and any individual MI.

16. The method of claim 15, further comprising:

computing a location associated with the object and the motion of the object based on any of: any TSCI, enhanced CI of any TSCI, the joint MI, the number of combined MI and any individual MI; and computing the location based on any of: support vector machine (SVM), kernel-based SVM, neural network (NN), deep neural network (DN), convolutional NN (CNN), recurrent NN (RNN), long short-term memory network (LSTM), deep belief network (DBN), denoising autoencoder (DAE), generative adversarial network (GAN), transformer, neural radiance field, radial basis function network, multilayer perceptron (MLP), or self organizing map (SOM).

17. The method of claim 16, further comprising:

computing multiple analytics based on the enhanced CI of any TSCI, the multiple analytics comprising at least one of:

a time-domain analytics computed based on a temporal correlation between a CIC of a first enhanced CI at a first time and a corresponding CIC of a second enhanced CI at a second time, a component-domain analytics computed based on a component-wise correlation between a first CIC associated with a first CIC index of a common enhanced CI and a second CIC associated with a second CIC index of the common enhanced CI, a transformed-component-domain analytics computed based on a component-wise correlation between a first TCIC of an enhanced CI associated with a first TCIC index and a second TCIC of the enhanced CI associated with a second TCIC index, or a spatial-domain analytics computed based on a variational characteristics associated with spatial diversity between the transmitter and the receiver; and computing the location based on the multiple analytics.

18. The method of claim 17, further comprising:

obtaining more than one TSCI of the wireless multipath channel based on the received wireless signal, each TSCI associated with a respective spatial diversity associated with a respective antenna link between the transmitter and the receiver;

computing a spatially-diverse vector by concatenating respective N2 CIC of multiple contemporaneous enhanced CI of the more than one TSCI;

processing the spatially-diverse vector by one of: principal component analysis (PCA), eigen-decomposition, singular value decomposition (SVD), or independent component analysis (ICA);

computing a significant vector and an associated characteristic value based on the processing; and computing the spatial-domain analytics by computing a variational characteristics of the significant vector or the characteristic value, wherein the variational characteristics comprise at least one of: variance, standard deviation, dispersion, divergence, absolute deviation, range, total variation, total deviation, spread, entropy, regularity measure, or variance-to-mean ratio.

19. A system for wireless sensing, comprising:

a transmitter configured to transmit a wireless signal through a wireless multipath channel of a venue; and a receiver configured to:

receive the wireless signal through the wireless multipath channel of the venue, wherein the received wireless signal differs from the transmitted wireless signal due to the wireless multipath channel and a motion of an object in the venue, obtain a time series of channel information (TSCI) of the wireless multipath channel based on the received wireless signal, wherein each channel information (CI) comprises N1 CI components (CIC), for each respective CI having N1 CIC of the TSCI, compute a respective enhanced CI (ECI) having N2 CIC by:

computing a transformation of the N1 CIC of the respective CI in a first domain to a respective transformed CI (TCI) with N2 transformed CIC (TCIC) in a second domain, wherein N1<=N2, selecting a respective number, N3, of TCIC of the TCI in the second domain, wherein N3<=N2 for any N3, wherein N1, N2 and N3 are all positive integers, computing an emphasized TCI (ETCI) having N2 TCIC based at least by:

scaling each of the respective N3 selected TCIC of the TCI in the second domain with a respective scaling factor greater than or equal to one or adding a respective non-negative offset to the selected TCIC, and scaling each of the respective remaining N2-N3 un-selected TCIC of the TCI in the second domain with a respective scaling factor less than or equal to one, or adding a respective non-positive offset to the un-selected TCIC, computing an inverse transformation of the ETCI from the second domain to the first domain to obtain the respective ECI with N2 CIC, wherein the inverse transformation is an inverse of the transformation, compute a motion information (MI) based on the ECI of the TSCI, and perform a sensing task based on the MI.

20. The system of claim 19, wherein the receiver is further configured to, for each CI having N1 CIC of the TSCI:

construct a temporary vector with N2 components based on the CI by:

aligning N1 of the N2 components of the temporary vector with the N1 CIC of the CI, constructing the N1 aligned components of the temporary vector by copying each of the N1 aligned components of the temporary vector from respective aligned CIC of the CI, and generating values for the remaining N2-N1 components of the temporary vector; and compute the N2 TCIC of the TCI in the second domain by performing a transformation on the N2 components of the temporary vector.

21. The system of claim 20, wherein the respective enhanced CI is computed further by:

identifying a respective particular TCIC of the respective CI with a dominant characteristics among the multiple TCIC of the respective CI;

performing a search for the respective particular TCIC of the respective CI among the TCIC of the respective CI within a search range of TCIC indices, wherein the search range of TCIC indices comprises a neighborhood around another TCIC index associated with the additional particular TCIC; and selecting the respective number of selected TCIC for the respective CI as a number of neighboring TCIC of the respective particular TCIC.

22. The system of claim 20, further comprising a plurality of transmitters and receivers in the venue, wherein:

a number of pairs are formed based on the plurality of transmitters and receivers, each pair being formed by a transmitter and a receiver; and for each pair of a respective transmitter and a respective receiver:

the respective transmitter of the pair is configured to transmit a respective wireless signal through the wireless multipath channel of the venue, the respective receiver of the pair is configured to:

receive the respective wireless signal through the wireless multipath channel of the venue, wherein the respective received wireless signal differs from the respective transmitted wireless signal due to the wireless multipath channel and the motion of the object in the venue, obtain a respective number of TSCI of the wireless multipath channel based on the respective received wireless signal, each CI of all of the respective number of TSCI comprising a respective number, N1, of CI components (CIC), for each CI of any of the respective number of TSCI, compute a respective N2-component enhanced CI by:

computing a transformation of the N1 CIC of the respective CI to a respective transformed CI (TCI) with a respective number, N2, of TCI components (TCIC), selecting a respective number, N3, of TCIC of the TCI, emphasizing the respective N3 selected TCIC of the TCI, and computing an inverse transformation of the N2 TCIC of the TCI to obtain the respective N2-component enhanced CI, compute a respective individual MI based on the respective N2-component enhanced CI of each of the respective number of TSCI, and compute a combined MI based on the respective number of individual MI and the respective N2-component enhanced CI of each of the respective number of TSCI, a joint MI is computed based on all of the combined MI, and the sensing task is performed based on the joint MI, the number of combined MI, and any individual MI, a location associated with the object and the motion of the object is computed based on any of: any TSCI, enhanced CI of any TSCI, the joint MI, the number of combined MI and any individual MI; and the location is computed based on any of: support vector machine (SVM), kernel-based SVM, neural network (NN), deep neural network (DN), convolutional NN (CNN), recurrent NN (RNN), long short-term memory network (LSTM), deep belief network (DBN), denoising autoencoder (DAE), generative adversarial network (GAN), transformer, neural radiance field, radial basis function network, multilayer perceptron (MLP), or self organizing map (SOM).

23. The system of claim 22, wherein the location is computed based on:

obtaining more than one TSCI of the wireless multipath channel based on the received wireless signal, each TSCI associated with a respective spatial diversity associated with a respective antenna link between the transmitter and the receiver;

computing a spatially-diverse vector by concatenating respective N2 CIC of multiple contemporaneous enhanced CI of the more than one TSCI;

processing the spatially-diverse vector by one of: principal component analysis (PCA), eigen-decomposition, singular value decomposition (SVD), or independent component analysis (ICA);

computing a significant vector and an associated characteristic value based on the processing;

computing a spatial-domain analytics by computing a variational characteristics of the significant vector or the characteristic value, wherein the variational characteristics comprise at least one of: variance, standard deviation, dispersion, divergence, absolute deviation, range, total variation, total deviation, spread, entropy, regularity measure, or variance-to-mean ratio;

computing multiple analytics based on the enhanced CI of any TSCI, the multiple analytics comprising the spatial-domain analytics and at least one of:

a time-domain analytics computed based on a temporal correlation between a CIC of a first enhanced CI at a first time and a corresponding CIC of a second enhanced CI at a second time, a component-domain analytics computed based on a component-wise correlation between a first CIC associated with a first CIC index of a common enhanced CI and a second CIC associated with a second CIC index of the common enhanced CI, or a transformed-component-domain analytics computed based on a component-wise correlation between a first TCIC of an enhanced CI associated with a first TCIC index and a second TCIC of the enhanced CI associated with a second TCIC index; and computing the location based on the multiple analytics.

24. A wireless device in a venue, comprising:

a receiver configured to receive a wireless signal transmitted by a transmitting device through a wireless multipath channel of the venue, wherein the received wireless signal differs from the transmitted wireless signal due to the wireless multipath channel and a motion of an object in the venue;

a memory; and a processor communicatively coupled to the memory and configured to:

obtain a time series of channel information (TSCI) of the wireless multipath channel based on the received wireless signal, wherein each channel information (CI) comprises N1 CI components (CIC), for each respective CI having N1 CIC of the TSCI, compute a respective enhanced CI (ECI) having N2 CIC by:

computing a transformation of the N1 CIC of the respective CI in a first domain to a respective transformed CI (TCI) with N2 transformed CIC (TCIC) in a second domain, wherein $N1<=N2$, selecting a respective number, N3, of TCIC of the TCI in the second domain, wherein $N3<=N2$ for any N3, wherein N1, N2 and N3 are all positive integers, computing an emphasized TCI (ETCI) having N2 TCIC based at least by:

scaling each of the respective N3 selected TCIC of the TCI in the second domain with a respective scaling factor greater than or equal to one or adding a respective non-negative offset to the selected TCIC, and scaling each of the respective remaining N2-N3 un-selected TCIC of the TCI in the second domain with a respective scaling factor less than or equal to one, or adding a respective non-positive offset to the un-selected TCIC, computing an inverse transformation of the ETCI from the second domain to the first domain to obtain the respective ECI with N2 CIC, wherein the inverse transformation is an inverse of the transformation, compute a motion information (MI) based on the ECI of the TSCI, and perform a sensing task based on the MI.

25. The wireless device of claim 24, wherein the processor is further configured to, for each CI having N1 CIC of the TSCI:

construct a temporary vector with N2 components based on the CI by:

aligning N1 of the N2 components of the temporary vector with the N1 CIC of the CI, constructing the N1 aligned components of the temporary vector by copying each of the N1 aligned components of the temporary vector from respective aligned CIC of the CI, and generating values for the remaining N2-N1 components of the temporary vector; and compute the N2 TCIC of the TCI in the second domain by performing a transformation on the N2 components of the temporary vector.

26. The wireless device of claim 25, wherein the respective enhanced CI is computed further by:

identifying a respective particular TCIC of the respective CI with a dominant characteristics among the multiple TCIC of the respective CI;

performing a search for the respective particular TCIC of the respective CI among the TCIC of the respective CI within a search range of TCIC indices, wherein the search range of TCIC indices comprises a neighborhood around another TCIC index associated with the additional particular TCIC; and selecting the respective number of selected TCIC for the respective CI as a number of neighboring TCIC of the respective particular TCIC.

* * * * *